US010178329B2

(12) United States Patent
Vogelsang et al.

(10) Patent No.: US 10,178,329 B2
(45) Date of Patent: Jan. 8, 2019

(54) OVERSAMPLED HIGH DYNAMIC-RANGE IMAGE SENSOR

(71) Applicant: Rambus Inc., Sunnyvale, CA (US)

(72) Inventors: Thomas Vogelsang, Mountain View, CA (US); Craig M. Smith, Spencerport, NY (US)

(73) Assignee: Rambus Inc., Sunnyvale, CA (US)

( * ) Notice: Subject to any disclaimer, the term of this patent is extended or adjusted under 35 U.S.C. 154(b) by 54 days.

(21) Appl. No.: 15/312,778

(22) PCT Filed: May 21, 2015

(86) PCT No.: PCT/US2015/032006
§ 371 (c)(1),
(2) Date: Nov. 21, 2016

(87) PCT Pub. No.: WO2015/183693
PCT Pub. Date: Dec. 3, 2015

(65) Prior Publication Data
US 2017/0195596 A1 Jul. 6, 2017

Related U.S. Application Data

(60) Provisional application No. 62/003,279, filed on May 27, 2014.

(51) Int. Cl.
*H04N 5/355* (2011.01)
*H04N 5/347* (2011.01)
(Continued)

(52) U.S. Cl.
CPC ......... *H04N 5/35581* (2013.01); *G06T 7/248* (2017.01); *H04N 5/2351* (2013.01);
(Continued)

(58) Field of Classification Search
CPC ................................................. H04N 5/35581
(Continued)

(56) References Cited

U.S. PATENT DOCUMENTS 7,492,400 B2   2/2009   El Gamal et al.
7,884,871 B2   2/2011   Smith et al.
(Continued)

OTHER PUBLICATIONS

ISR—Notification of Transmittal of the International Search Report and the Written Opinion of the International Searching Authority dated Oct. 26, 2015 re Intl. Appln. No. PCT.US2015/032006. 20 Pages.
(Continued)

*Primary Examiner* — Joel W Fosselman
(74) *Attorney, Agent, or Firm* — Charles Shemwell

(57) ABSTRACT

In an integrated-circuit image sensor having a pixel array, a first subframe readout policy is selected from among a plurality of subframe readout policies, each of the subframe readout policies specifying a first number of subframes of image data to be readout from the pixel array for each output image frame and respective exposure durations for each of the first number of subframes of image data, wherein a shortest one of the exposure durations is uniform for each of the subframe readout policies. Each of the first number of subframes of image data is read out from the pixel array following the respective exposure durations thereof while applying a respective analog readout gain. The analog readout gain applied during readout of at least a first subframe of the first number of subframes is scaled according to a ratio of the shortest one of the exposure durations to the exposure duration of the first subframe.

20 Claims, 43 Drawing Sheets

(51) Int. Cl.
  *H04N 5/3745* (2011.01)
  *H04N 5/378* (2011.01)
  *H04N 9/04* (2006.01)
  *G06T 7/246* (2017.01)
  *H04N 5/232* (2006.01)
  *H04N 5/235* (2006.01)
  *H04N 5/343* (2011.01)

(52) U.S. Cl.
  CPC ......... *H04N 5/23232* (2013.01); *H04N 5/343* (2013.01); *H04N 5/347* (2013.01); *H04N 5/378* (2013.01); *H04N 5/37457* (2013.01); *H04N 9/045* (2013.01); *H04N 5/23245* (2013.01)

(58) Field of Classification Search
  USPC ....................................................... 348/230.1
  See application file for complete search history.

(56) References Cited

U.S. PATENT DOCUMENTS

| | | | |
|---|---|---|---|
| 7,885,536 B1 | 2/2011 | Richards et al. | |
| 7,889,253 B2 | 2/2011 | Kawahito | |
| 7,889,273 B2 | 2/2011 | Ward | |
| 8,022,994 B2 | 9/2011 | Luo et al. | |
| 8,031,237 B2 | 10/2011 | Kirisawa | |
| 8,228,400 B2 | 7/2012 | Liu et al. | |
| 8,248,481 B2 | 8/2012 | Savidge | |
| 8,373,767 B2 | 2/2013 | Chang et al. | |
| 8,390,698 B2 | 3/2013 | Shimizu et al. | |
| 8,497,927 B2 | 7/2013 | Vitsnudel et al. | |
| 8,525,900 B2 | 9/2013 | Garten | |
| 2008/0316347 A1 | 12/2008 | Gamal et al. | |
| 2011/0309462 A1 | 12/2011 | Sargent et al. | |
| 2012/0002082 A1 | 1/2012 | Johnson et al. | |
| 2012/0081579 A1 | 4/2012 | Doepke | |
| 2012/0194686 A1 | 8/2012 | Lin et al. | |
| 2012/0274822 A1 | 11/2012 | Smith et al. | |
| 2012/0318867 A1 | 12/2012 | Havens et al. | |
| 2013/0028509 A1 | 1/2013 | Moon et al. | |
| 2013/0100314 A1 | 4/2013 | Li et al. | |
| 2013/0222645 A1 | 8/2013 | Bilcu | |
| 2013/0250150 A1 | 9/2013 | Malone et al. | |
| 2013/0286242 A1 | 10/2013 | Cote et al. | |
| 2013/0342739 A1 | 12/2013 | Yanowitz et al. | |
| 2014/0125854 A1 | 5/2014 | Bechtel et al. | |

OTHER PUBLICATIONS

Notification Concerning Transmittal of the International Preliminary Report on Patentability dated Dec. 6, 2016 re: Int'l Appln. No. PCT/US2015/032006. 8 Pages.

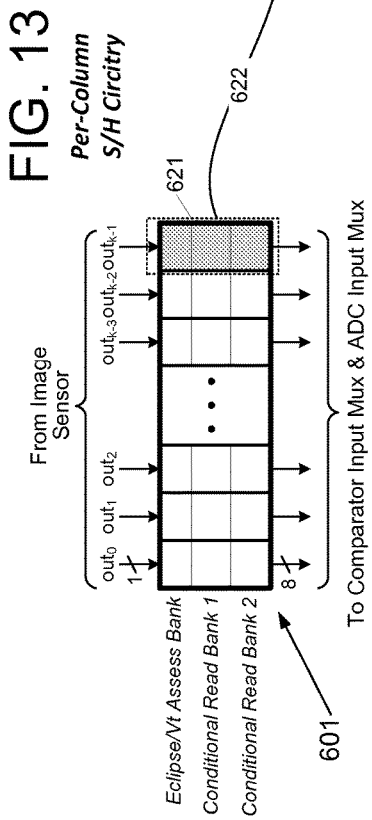
FIG. 13
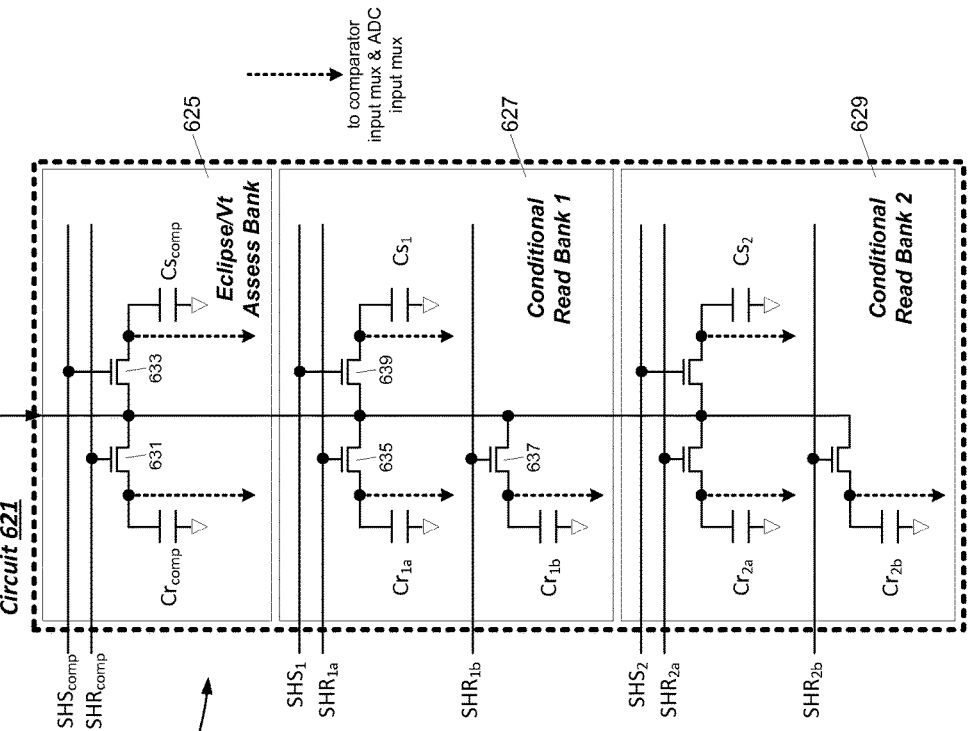
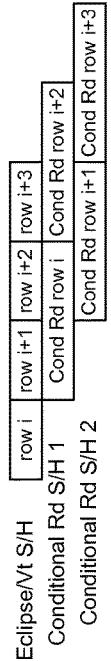
FIG. 14
Sample & Hold Pipeline

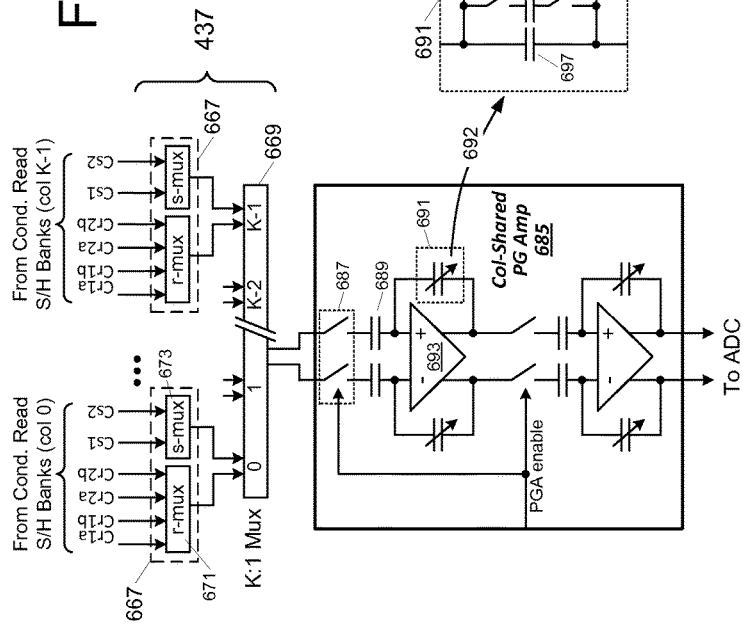
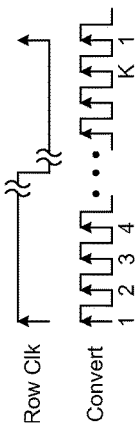
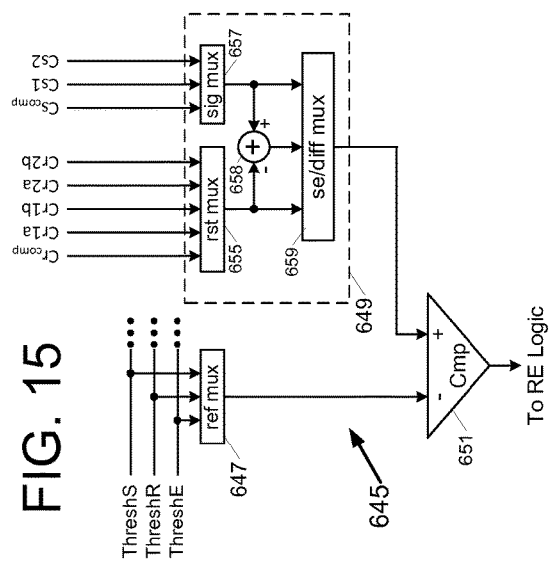
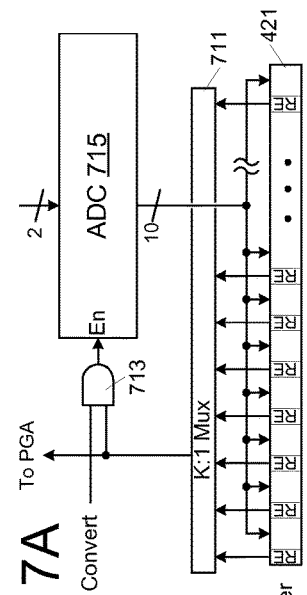

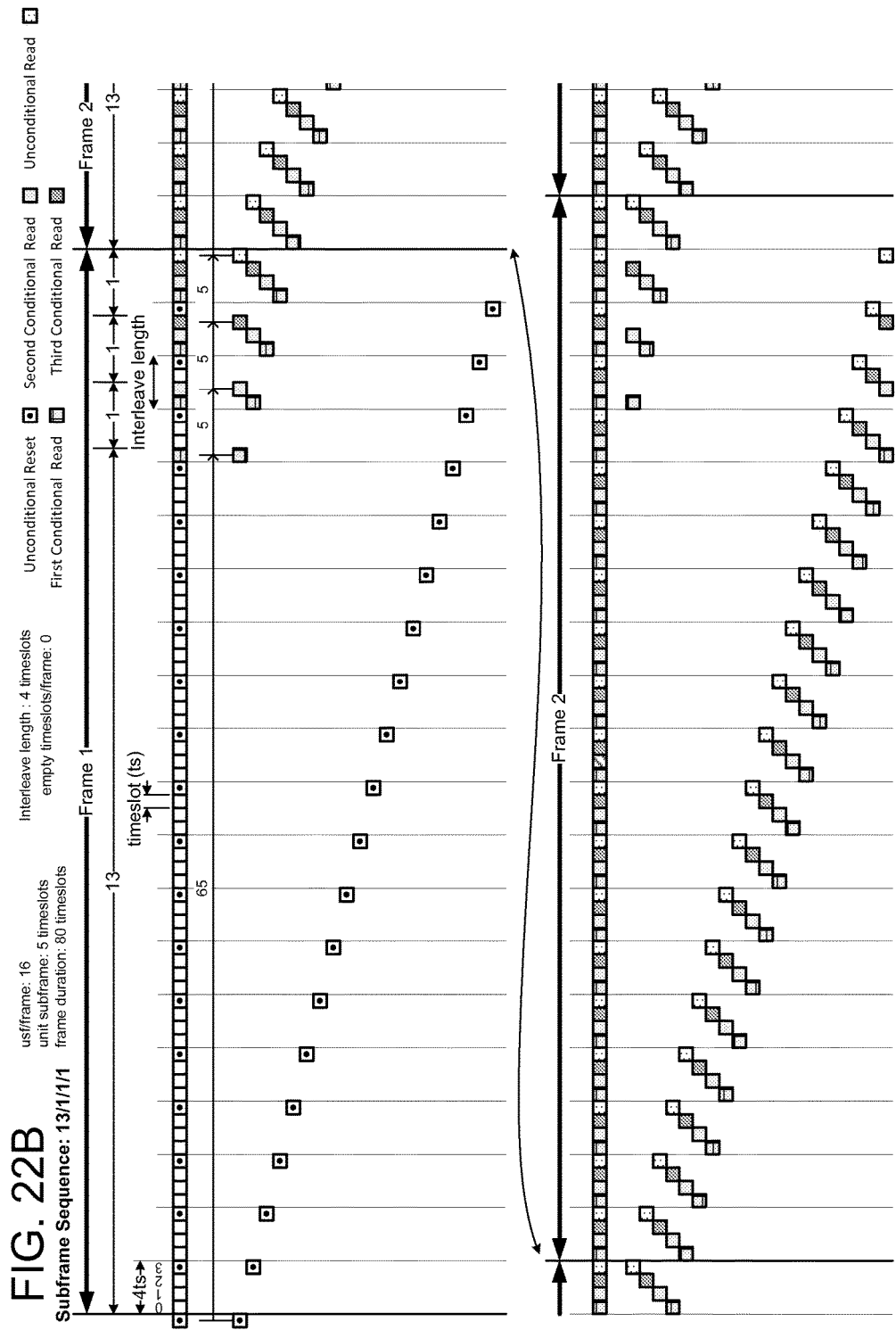

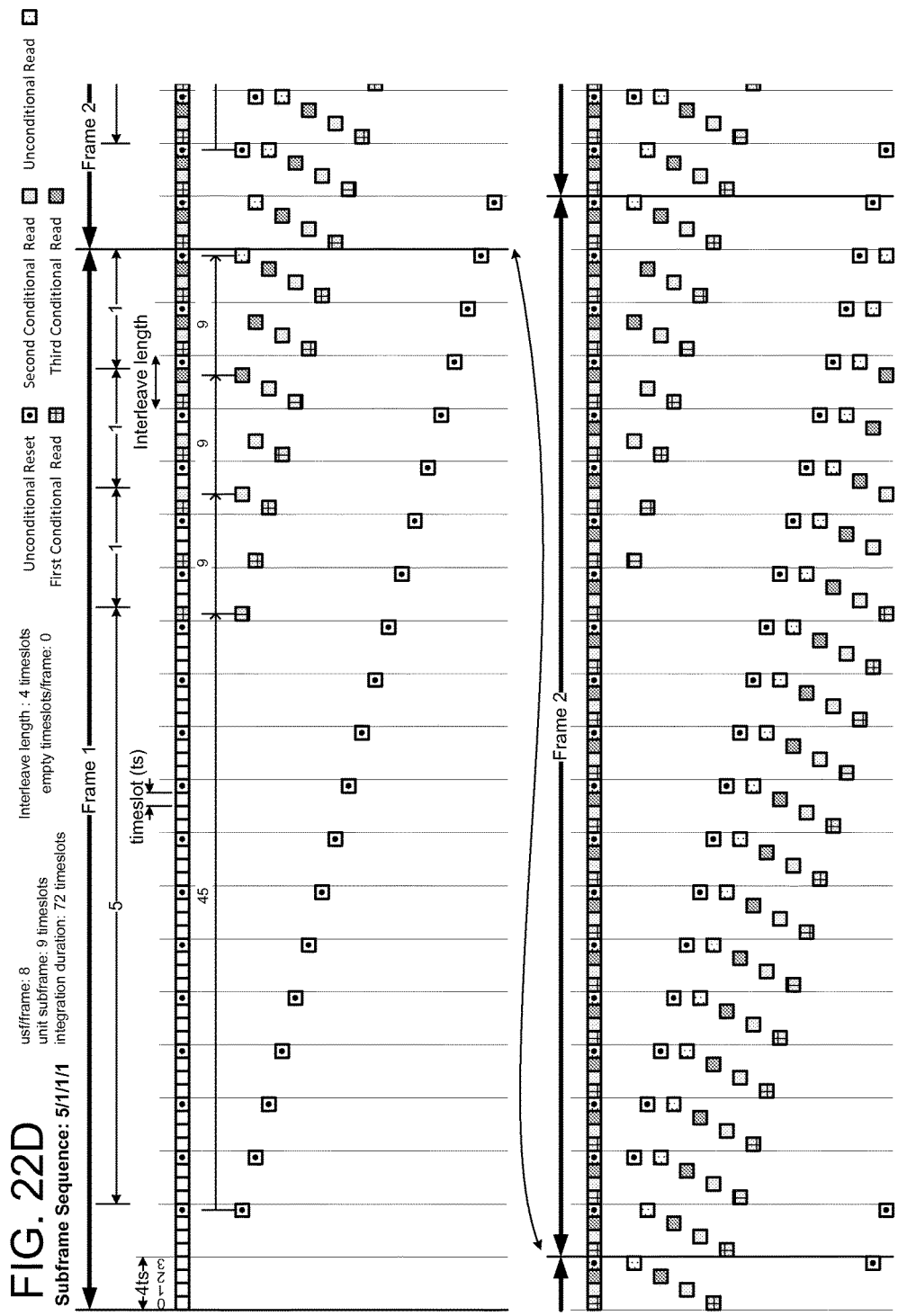

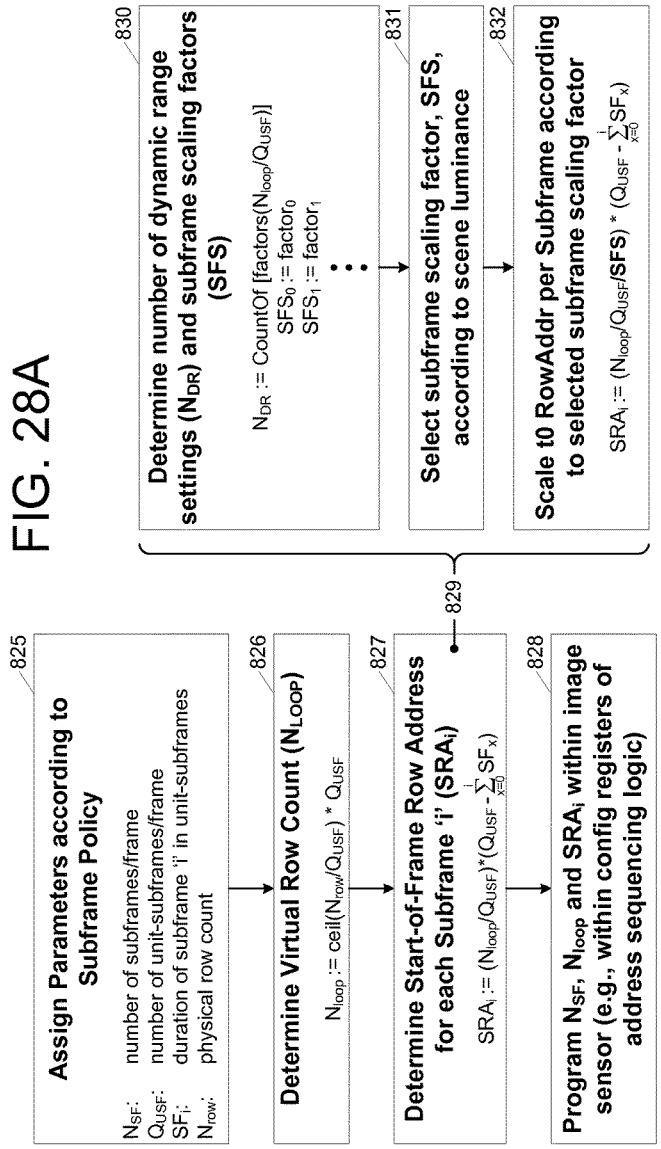

FIG. 28A

Assign Parameters according to Subframe Policy — 825

- $N_{SF}$: number of subframes/frame
- $Q_{USF}$: number of unit-subframes/frame
- $SF_i$: duration of subframe 'i' in unit-subframes
- $N_{row}$: physical row count

Determine Virtual Row Count ($N_{LOOP}$) — 826

$N_{loop} := ceil(N_{row}/Q_{USF}) * Q_{USF}$

Determine Start-of-Frame Row Address for each Subframe 'i' ($SRA_i$) — 827

$SRA_i := (N_{loop}/Q_{USF}) * (Q_{USF} - \sum_{x=0}^{i} SF_x)$

— 829

Determine number of dynamic range settings ($N_{DR}$) and subframe scaling factors (SFS) — 830

$N_{DR} := CountOf [factors(N_{loop}/Q_{USF})]$
$SFS_0 := factor_0$
$SFS_1 := factor_1$
• • •

Select subframe scaling factor, SFS, according to scene luminance — 831

Scale t0 RowAddr per Subframe according to selected subframe scaling factor — 832

$SRA_i := (N_{loop}/Q_{USF}/SFS) * (Q_{USF} - \sum_{x=0}^{i} SF_x)$

Program $N_{SF}$, $N_{loop}$ and $SRA_i$ within image sensor (e.g., within config registers of address sequencing logic) — 828

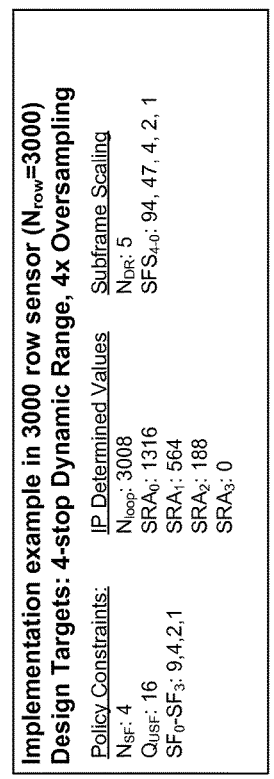

FIG. 28B

Implementation example in 3000 row sensor ($N_{row}$=3000)
Design Targets: 4-stop Dynamic Range, 4x Oversampling

| Policy Constraints: | IP Determined Values | Subframe Scaling |
|---|---|---|
| $N_{SF}$: 4 | $N_{loop}$: 3008 | $N_{DR}$: 5 |
| $Q_{USF}$: 16 | $SRA_0$: 1316 | $SFS_{4-0}$: 94, 47, 4, 2, 1 |
| $SF_0$-$SF_3$: 9,4,2,1 | $SRA_1$: 564 | |
| | $SRA_2$: 188 | |
| | $SRA_3$: 0 | |

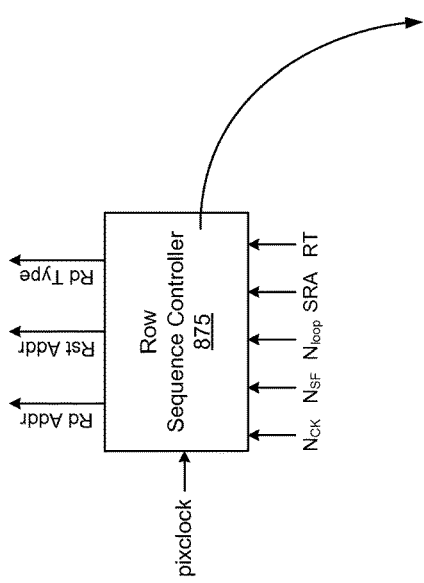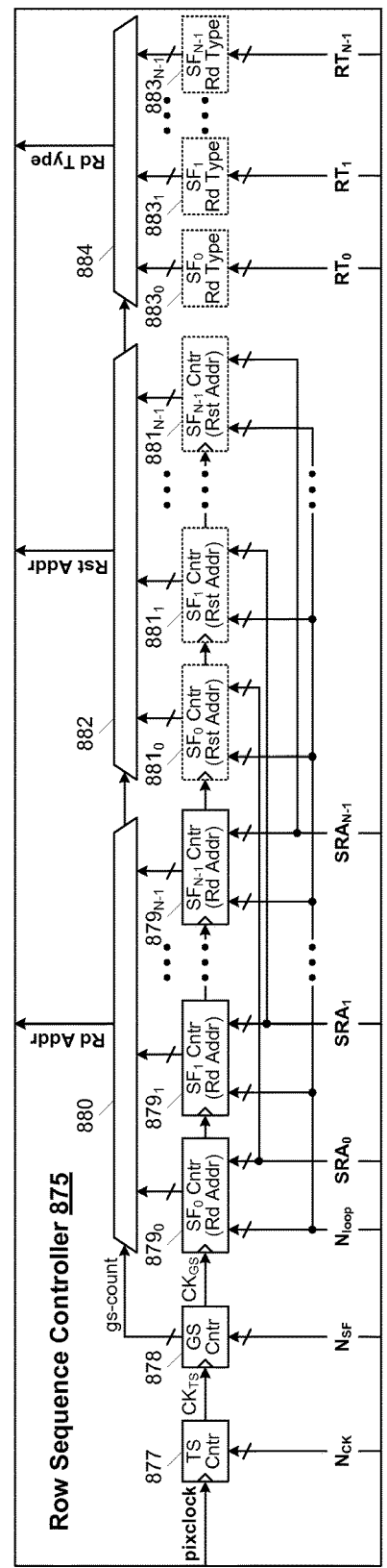
FIG. 34

Partial Binning to improve low-light SNR without compromising spatial resolution

FIG. 40

951 — generate forecasts of full-resolution read-out value for each pixel in bin group based on subframe read-out results 953 — assign pro-rata portion of binned read-out value to each pixel in bin group set according to forecast of full-res read-out value

961 — overthresh in condional-read SF?
yes → 963 — determine charge accumulation rate (CAR) from cond read-out value(s)
no → 965 — estimate CAR on based on assumed charge level at conclusion of penultimate SF
→ 967 — generate predicted full-res read-out based on CAR and charge-accumulation interval (e.g., $CAR^*t_{acc}$); $t_{acc}$

Voltage-Binned within switchably-coupled SH element
Charge-Binned within common floating-diffusion
CFA Fragment 170

Component (Full-Res) Pixels
V-Bin Pixel
Bin Group (930)
Low-Light Decision Kernel (932)
Bin-group-bounded pixel set (933)

Full-Res Pixel 925
928
Color-Plane Neighbors (929)
Color-Plane Neighbors (929)

Fig. 39

Selective Reconstruction
941 — Over-threshold determination in non-final subframe for any pixel within low-light decision kernel?
No (Dark) → 943 — generate pixel value for each full-res pixel through bi-linear interpolation between surrounding binned pixel values
Yes (Bright) → 945 — generate pixel value for each full-res pixel based on unbinned read-out(s) and estimated contribution to binned read-out

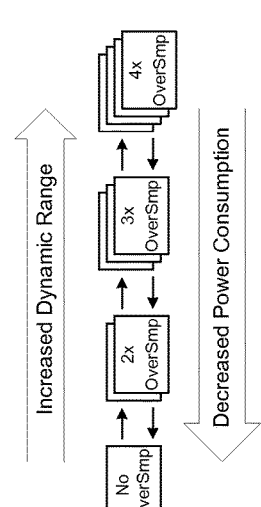
FIG. 46
Dynamically Selected Subframe Sequencing
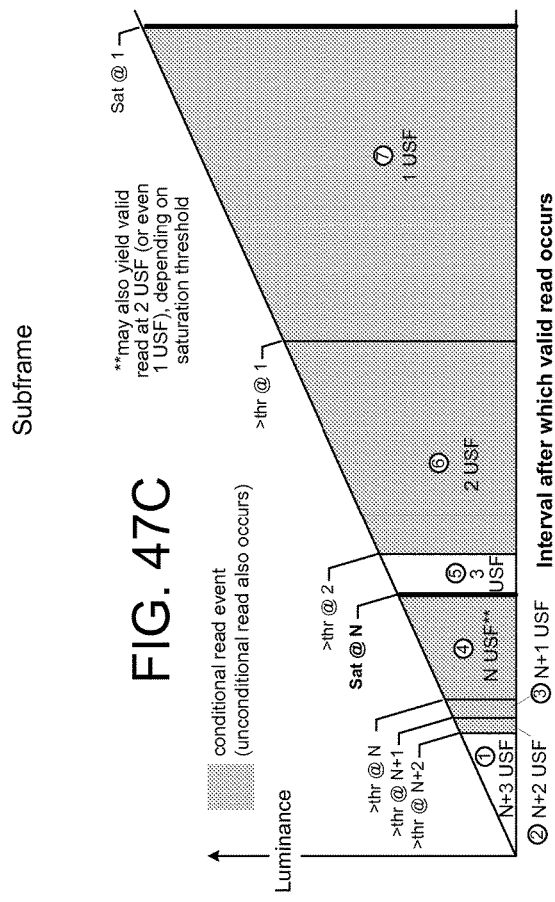
FIG. 47B
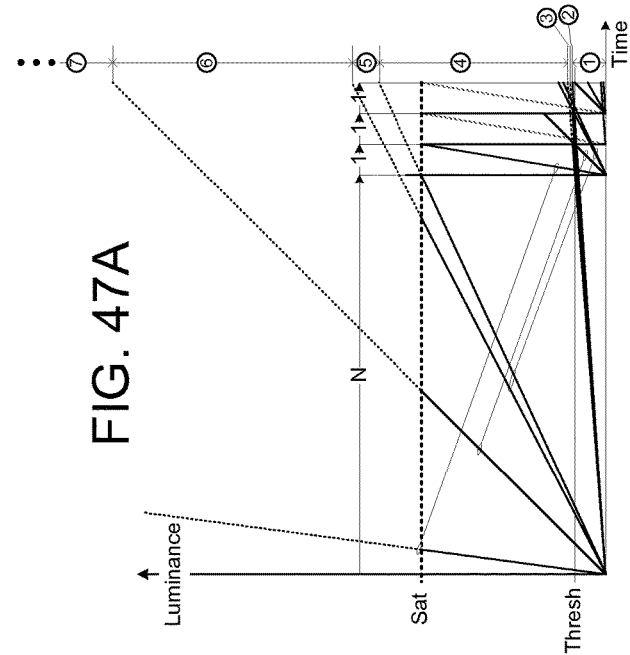
FIG. 47A
FIG. 47C

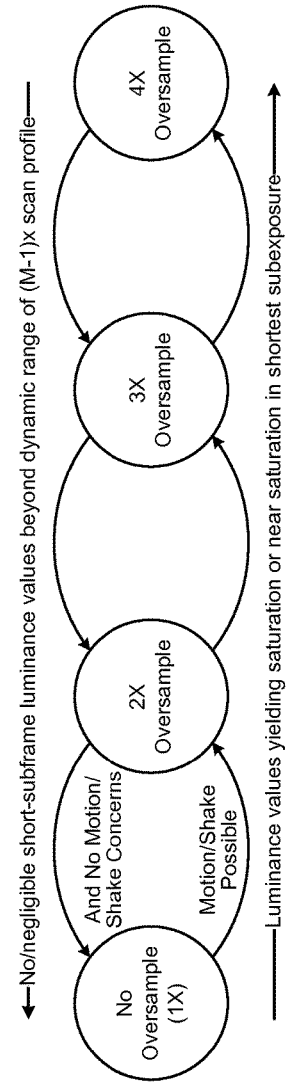
FIG. 50
FIG. 49
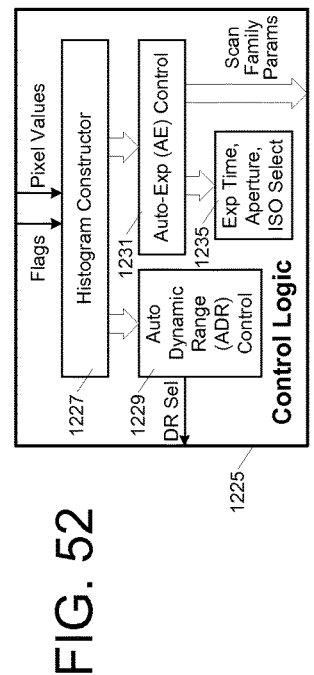
FIG. 52
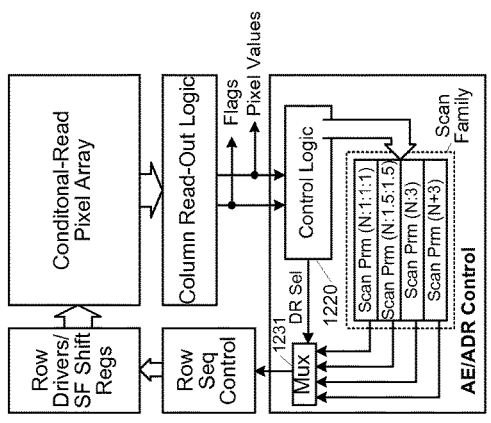
FIG. 51

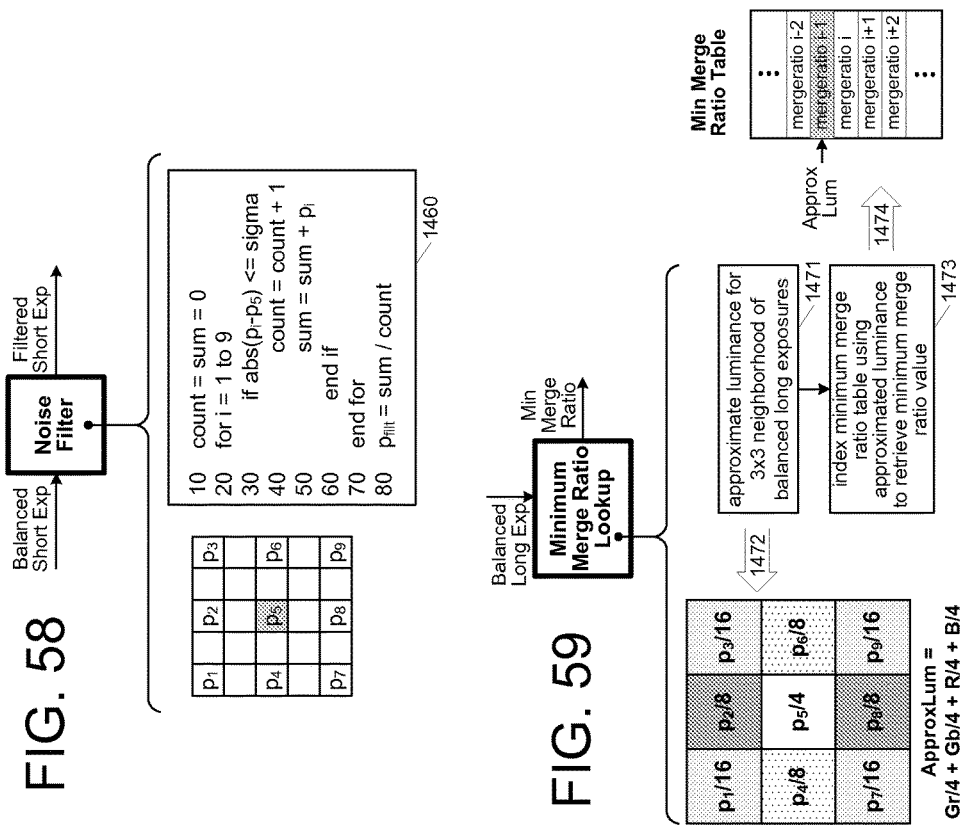
FIG. 58
FIG. 59
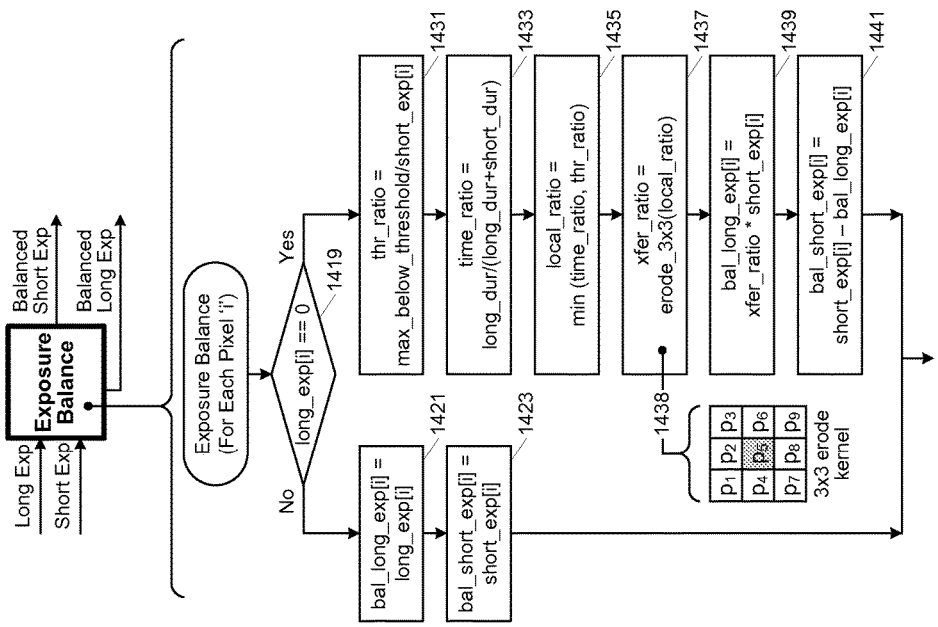
FIG. 57

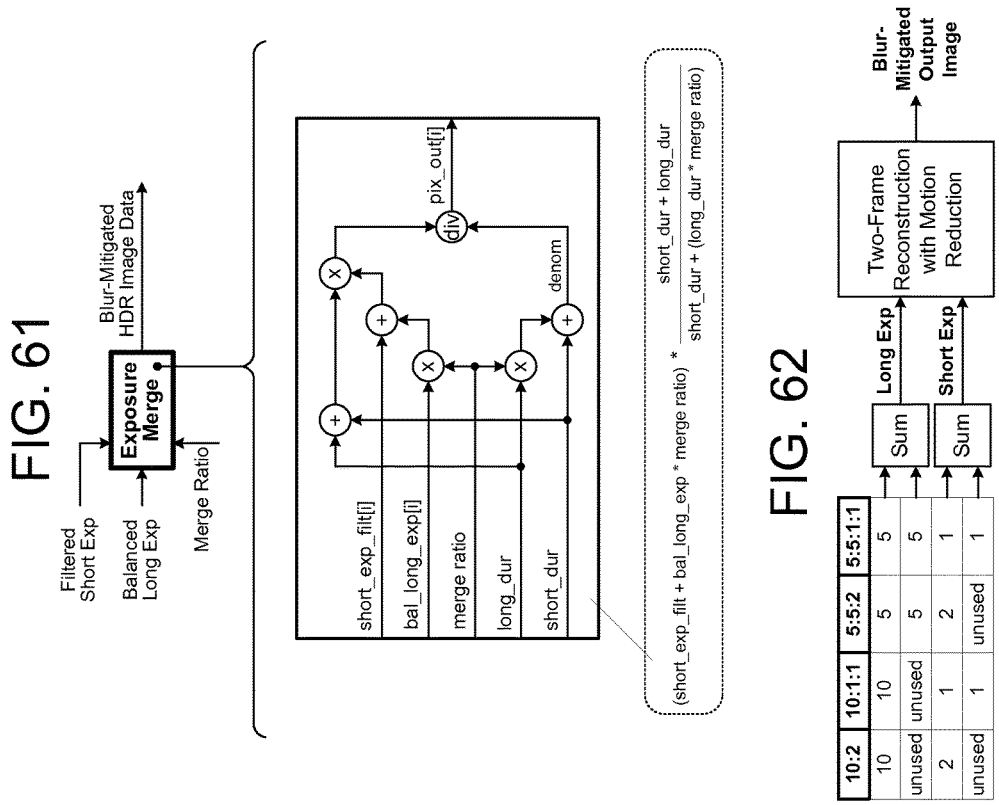
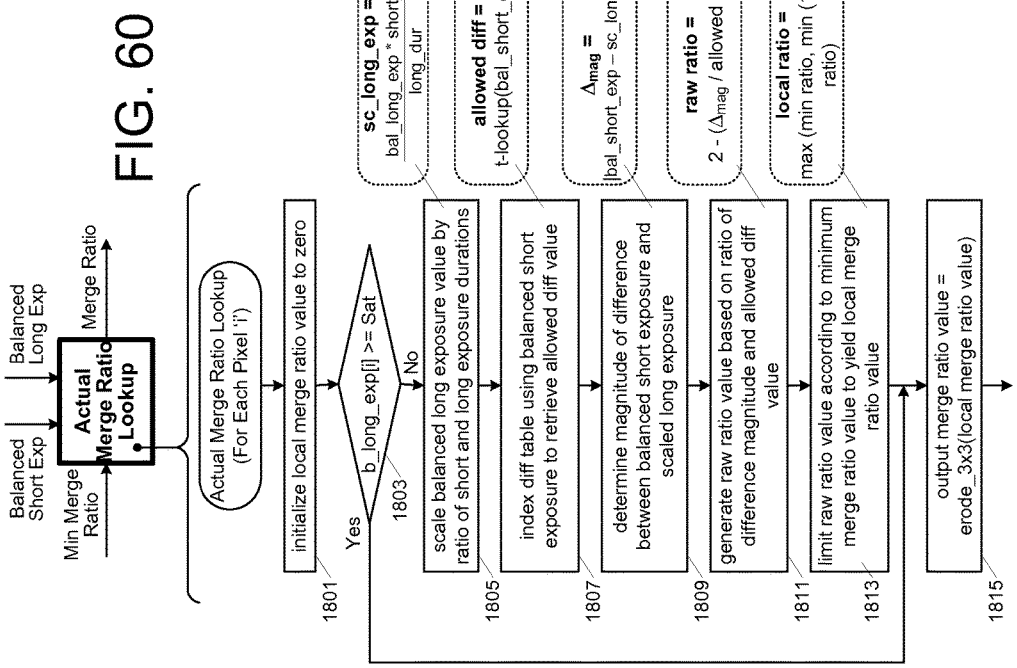

Trading Motion-Blur Mitigation for Noise Reduction while maintaining dynamic range

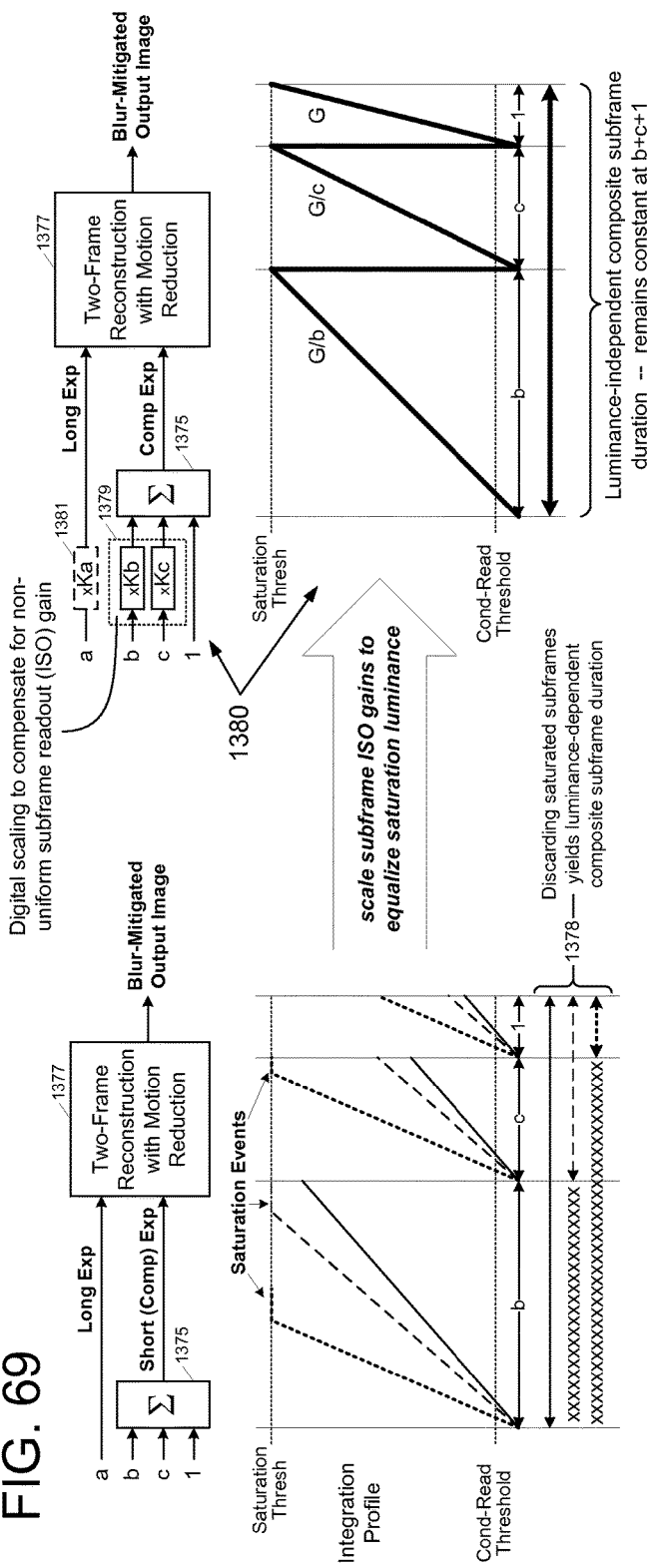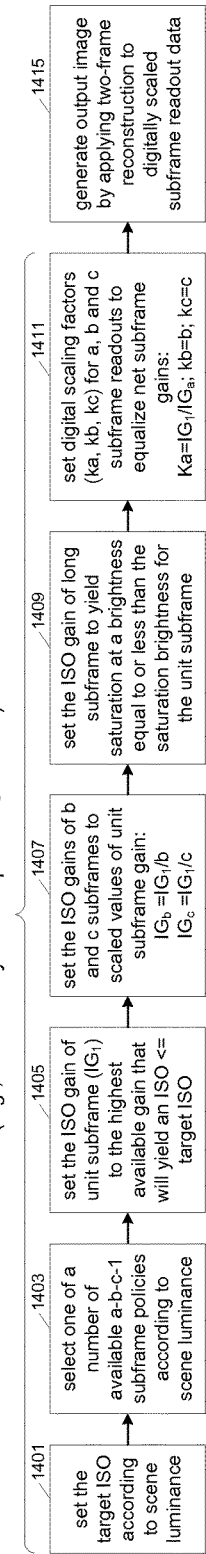
FIG. 69
FIG. 70

Partial Binning to improve low-light SNR while maintaining motion-blur mitigation

OVERSAMPLED HIGH DYNAMIC-RANGE IMAGE SENSOR

TECHNICAL FIELD

The present disclosure relates to the field of electronic image sensors, and more specifically to a sampling architecture for use in such image sensors.

BRIEF DESCRIPTION OF THE DRAWINGS

The various embodiments disclosed herein are illustrated by way of example, and not by way of limitation, in the figures of the accompanying drawings and in which like reference numerals refer to similar elements and in which:

FIG. 13 illustrates an embodiment of multi-bank sample-and-hold circuit that may be used to implement the sample-and-hold (S/H) circuitry depicted in FIG. 11;

FIG. 14 illustrates an exemplary sample and hold pipeline corresponding generally to the S/H bank usage intervals within the timing arrangement of FIG. 12A;

FIG. 15 illustrates embodiments of a reference multiplexer, comparator input multiplexer and comparator that may be used to implement like-named components depicted in FIG. 10;

FIG. 16 illustrates embodiments of a column-shared programmable gain amplifier and K:1 ADC input multiplexer that may be deployed within the embodiment of FIG. 10.

FIG. 17A illustrates embodiments of a read-enable multiplexer, ADC-enable logic and ADC circuit that may be used to implement the K:1 read-enable multiplexer and ADC circuitry of FIG. 10;

FIG. 17B illustrates a convert signal timing diagram corresponding to FIG. 17A;

FIG. 22B illustrates an A=13, 13-1-1-1 subframe read-out sequence designed according to an alternative timing enforcement approach;

FIG. 22D shows another scheduling solution for 20 rows and 80 timeslots, this time for A=5 and a 5-1-1-1 policy;

FIG. 28A illustrates a generalized sequence of operations that may be carried out by an image processor to implement a selected subframe readout policy in accordance with the approach shown in FIG. 27;

FIG. 28B illustrates parameters of an exemplary subframe readout within a 3000 row image sensor with design targets of 4× oversampling, 4-stop dynamic range and a 9:4:2:1 subframe duration ratio;

FIG. 34 illustrates an embodiment of a row sequence controller 875 that may be deployed in place of the row sequence controller 781 of FIG. 25A and programmed with parameters for controlling subframe readout;

FIG. 38 illustrates an exemplary segment of a bin-enabled pixel array together with corresponding color filter array (CFA) elements;

FIG. 39 illustrates an example of selective image reconstruction with respect to a pixel bin group;

FIG. 40 illustrates an exemplary approach to combining binned and unbinned read-out results in bright-light reconstruction of full-resolution pixel values;

FIGS. 41 and 42 illustrate a more detailed example of predicting end-of-frame charge accumulation states within a binned group of pixels for purposes of estimating full-resolution pixel contributions to binned read-outs;

FIG. 43 illustrates a bi-linear interpolation that may be applied to generate final full-resolution pixel values for the pixels of a bin-group-bounded pixel set following determination of a low-light condition;

FIG. 46 illustrates an exemplary imaging sensor embodiment in which the oversampling factor is varied dynamically between minimum and maximum values;

FIG. 47A illustrates an exemplary set of pixel charge integration profiles that occur at various luminance levels and the corresponding read-out/reset events given an N:1:1:1 scan sequence;

FIG. 47B is a table illustrating exemplary pixel state assessment results and read-out events for each of the four subframes and eight luminance levels discussed in reference to FIG. 47A;

FIG. 47C illustrates the various charge integration periods corresponding to valid read-out events within the exemplary luminance ranges of FIG. 47A;

FIG. 49 illustrates a set of operations that may be executed within a conditional-read image sensor or associated integrated circuit to dynamically scale the sensor's dynamic range and power consumption based, at least in part, on the scene being imaged;

FIG. 50 presents an example of dynamic transition between scan sequences of an exposure family operation;

FIG. 51 illustrates an image sensor embodiment that carries out the exposure-setting and dynamic range scaling operations as described in reference to FIGS. 49 and 50;

FIG. 52 illustrates an embodiment of a control logic circuit that may be used to implement the control logic of FIG. 51;

FIG. 57 illustrates an exemplary exposure balancing operation carried out within the exposure balancing unit of FIG. 56;

FIG. 58 illustrates an exemplary embodiment of the noise filter applied to the balanced short exposure within the two-frame reconstruction logic of FIG. 56;

FIG. 59 illustrates an embodiment of the minimum difference lookup of FIG. 56;

FIG. 60 illustrates an exemplary actual-difference lookup operation carried out using the balanced short and long exposure values and the luminance-indexed minimum difference value output from the minimum difference lookup unit;

FIG. 61 illustrates an exemplary exposure merge operation carried out using the filtered short exposure value, balanced long exposure value and difference value output from the actual difference lookup unit;

FIG. 62 illustrates an alternative scan sequence family in which an otherwise solitary long subexposure has been split into medium-duration subexposures;

FIG. 69 illustrates an additional consideration that applies when dynamically scaling the composite subframe duration while holding the shortest subframe duration constant as proposed in FIG. 68;

FIG. 70 illustrates an exemplary sequence of luminance-dependent programming (or configuration) operations that may be executed, for example, by an auto-exposure controller of an image sensor in accordance with the motion-blur/noise balancing and gain scaling approaches described in reference to FIGS. 68 and 69;

DETAILED DESCRIPTION

Figure 1:
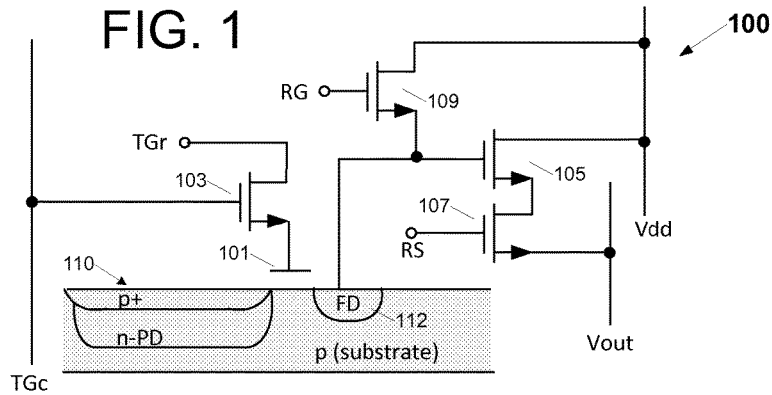
FIG. 1 illustrates an embodiment of a modified 4-transistor pixel in which a non-destructive overthreshold detection operation is executed to enable conditional-read operation in conjunction with correlated double sampling.

In various embodiments disclosed herein, an oversampled image sensor is operated in both full-resolution and reduced-resolution (enhanced low-light sensitivity) read-out modes during respective subframes of an exposure interval. By this arrangement, spatial resolution of the image sensor is preserved while also enhancing low-light sensitivity. In a number of embodiments, reduced-resolution image data is selectively applied in final image reconstruction according to a light-intensity determination based upon the subframe readouts themselves. In other embodiments, subframe intervals are programmably controlled to balance read-out circuitry utilization and limit on-board data storage needs while achieving desired imaging results effects. In yet other embodiments, a binary threshold used to trigger conditional read-out operations is calibrated according to read-out results and/or reference charge injection. These and other features and benefits are disclosed in greater detail below.

High-SNR Image Sensor with Non-Destructive Threshold Monitoring

While three-transistor (3T) pixel architectures are suitable for many applications, four-transistor (4T) designs having a "transfer gate" disposed between the photodiode and a floating-diffusion region provide a number of advantages. First, the floating diffusion, which serves as a temporary storage of charge transferred from the photodiode, may be reset (e.g., coupled to $V_{DD}$) and read out without disturbing the charge state of the photodiode, thereby enabling a correlated double-sampling (CDS) operation in which the state of the floating diffusion is read twice; immediately after reset (the "reset-state" sample or noise sample) and then again after charge transfer from the photodiode (the "signal-state" sample), thus enabling the noise floor to be subtracted from the photodiode output signal (i.e., subtracting the reset-state sample from the signal-state sample), significantly improving the SNR. Another advantage is, counter-intuitively, a more compact pixel design as the switched connection between the photodiode and a source follower transistor (i.e., via the transfer gate and floating diffusion) enables the source follower transistor as well as a reset transistor and access transistor to be shared among multiple photodiodes. For example, only seven transistors are required to implement a set of four "4 T" pixels having a shared source follower, reset transistor and access transistor (i.e., four transfer-gates plus the three shared transistors), thus effecting an average of 1.75 transistors per pixel (1.75T).

In terms of pixel read-out, the direct connection between photodiode and source follower in a 3 T pixel permits the charge state of the photodiode to be read-out without disturbing ongoing photocharge integration. This "non-destructive read" capability is particularly advantageous in the context of the conditional reset operation described above as the 3 T pixel may be sampled following an integration interval and then conditionally permitted to continue integrating charge (i.e., not be reset) if the sampling operation indicates that the charge level remains below a predetermined threshold. By contrast, the charge transfer between photodiode and floating diffusion as part of a 4 T pixel readout disrupts the state of the photodiode, presenting a challenge for conditional-read operation.

In a number of embodiments described below in connection with FIGS. 1-4, a modified 4 T pixel architecture is operated in a manner that dissociates the reset threshold from pixel sample generation to enable a non-destructive (and yet correlated double-sampling) overthreshold determination. That is, instead of reading out the net level of charge accumulated within the photodiode (i.e., a pixel sampling operation) and conditionally resetting the photodiode based on that read-out (i.e., as in a 3 T pixel sampling operation), a preliminary overthreshold sampling operation is executed to enable detection of an overthreshold state within the photodiode, with the full photodiode read-out (i.e., pixel sample generation) being conditionally executed according to the preliminary overthreshold detection result. In effect, instead of conditionally resetting the photodiode according to the pixel value obtained from full photodiode readout, full photodiode readout is conditioned on the result of a preliminary, non-destructive determination of whether the threshold has been exceeded; an approach enabled, in at least one embodiment, by dissociating the conditional-read threshold from the pixel value generation.

FIG. 1 illustrates an embodiment of a modified 4 T pixel 100, referred to herein as a "progressive read-out" or "conditional-read" pixel, in which a non-destructive overthreshold detection operation is executed to enable conditional-reset/read operation in conjunction with correlated double sampling. As explained more fully below, the overthreshold detection involves a limited read-out of the photodiode state which, when determined to indicate an overthreshold condition, will trigger a more complete read-out of the photodiode state. That is, pixel 100 is read-out in a progression from a limited overthreshold detection read-out to a complete read-out, the latter being conditional according to the overthreshold detection result and hence referred to as a conditional read.

Still referring to FIG. 1, conditional-read pixel 100 includes a transfer gate 101 disposed between a photodiode 110 (or any other practicable photosensitive element) and floating diffusion node 112, and a transfer-enable transistor 103 coupled between a transfer-gate row line (TGr) and transfer gate 101. The gate of transfer-enable transistor 103 is coupled to a transfer-gate column line (TGc) so that, when TGc is activated, the potential on TGr is applied (minus any transistor threshold) via transfer-enable transistor 103 to the gate of transfer-gate 101, thus enabling charge accumulated within photodiode 110 to be transferred to floating diffusion 112 and sensed by the pixel readout circuitry. More specifically, floating diffusion 112 is coupled to the gate of source follower 105 (an amplification and/or charge-to-voltage conversion element), which is itself coupled between a supply rail ($V_{DD}$ in this example) and a read-out line, Vout, to enable a signal representative of the floating diffusion potential to be output to read-out logic outside the pixel.

As shown, a row-select transistor 107 is coupled between source follower 105 and the read-out line to enable multiplexed access to the read-out line by respective rows of pixels. That is, row-select lines ("RS") are coupled to the control inputs of row-select transistors 107 within respective rows of pixels and operated on a one-hot basis to select one row of pixels for sense/read-out operations at a time. A reset transistor 109 is also provided within the progressive read-out pixel to enable the floating diffusion to be switchably coupled to the supply rail (i.e., when a reset-gate line (RG) is activated) and thus reset. The photodiode itself may be reset along with the floating diffusion by fully switching on transfer gate 101 (e.g., by asserting TGc while TGr is high) and reset transistor 109 concurrently, or by merely connecting the photodiode to a reset-state floating diffusion.

Figure 2:
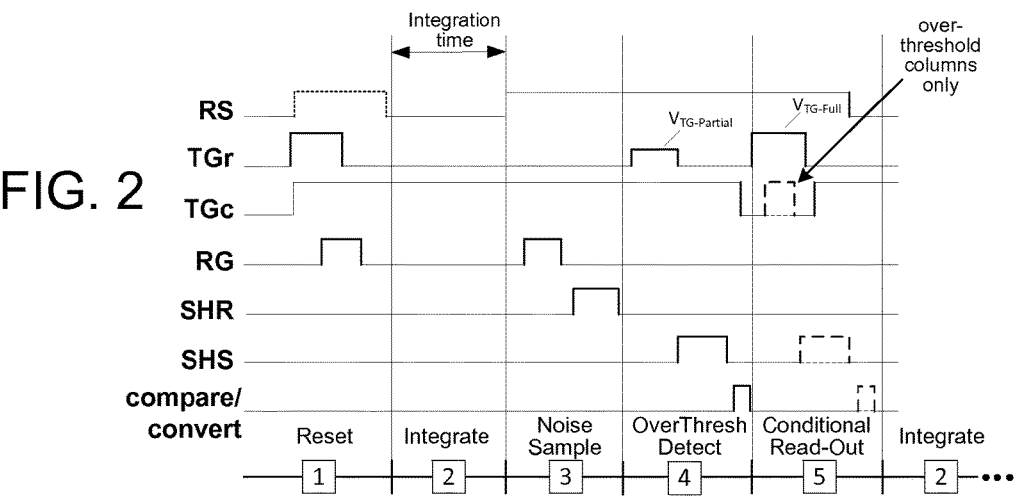
FIG. 2 is a timing diagram illustrating an exemplary pixel cycle within the progressive read-out pixel of FIG. 1.

FIG. 2 is a timing diagram illustrating an exemplary pixel cycle within the progressive read-out pixel of FIG. 1. As shown, the pixel cycle is split into five intervals or phases corresponding to distinct operations carried out to yield an eventual progressive read-out in the final two phases. In the first phase (phase 1), a reset operation is executed within the photodiode and floating diffusion by concurrently asserting logic high signals on the TGr, TGc and RG lines to switch on transfer-enable transistor 103, transfer gate 101 and reset transistor 109, thereby switchably coupling photodiode 110 to the supply rail via transfer gate 101, floating diffusion 112 and reset transistor 109 (the illustrated sequence can begin with an unconditional reset (e.g., at the start of a frame), and can also begin from a preceding conditional read-out/reset operation). To conclude the reset operation, the TGr and RG signals (i.e., signals applied on like-named signal lines) are lowered, thereby switching off transfer gate 101 (and reset transistor 109) so that the photodiode is enabled to accumulate (or integrate) charge in response to incident light in the ensuing integration phase (phase 2). Lastly, although the row-select signal goes high during the reset operation shown in FIG. 2, this is merely a consequence of an implementation-specific row decoder that raises the row-select signal whenever a given row address is decoded in connection with a row-specific operation (e.g., raising the TGr and RG signals during reset directed to a given row). In an alternative embodiment, the row decoder may include logic to suppress assertion of the row-select signal during reset as indicated by the dashed RS pulse in FIG. 2.

At the conclusion of the integration phase, the floating diffusion is reset (i.e., by pulsing the RG signal to couple the floating diffusion to the supply rail) and then sampled by a sample-and-hold element within the column read-out circuit. The reset and sample operation (shown as phase 3 in FIG. 2), in effect, samples the noise level of the floating diffusion and is executed in the embodiment shown by asserting the row-select signal for the pixel row of interest (i.e., the "$i^{th}$" pixel row, selected by RSi) while pulsing a reset-state sample-and-hold signal (SHR) to convey the state of the floating diffusion to the sample-and-hold element (e.g., a switch-accessed capacitive element) within the column read-out circuit via read-out line, Vout.

Figure 3:
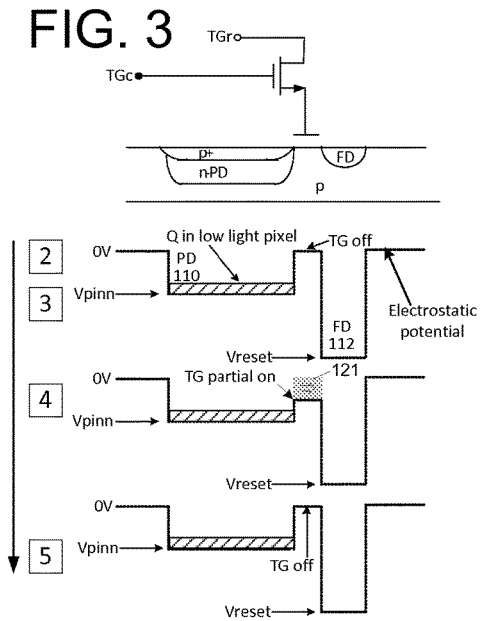
FIGS. 3 and 4 illustrate exemplary electrostatic potential diagrams for the photodiode, transfer gate and floating diffusion of FIG. 1 below their corresponding schematic cross-section diagrams.
Figure 4:
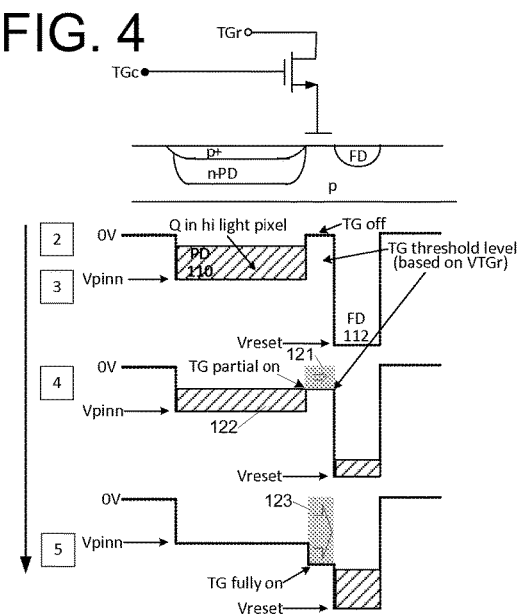

After acquiring the noise sample in phase 3, an overthreshold detection operation is executed in phase 4 by raising the TGr line to a partially-on, "overthreshold-detection" potential, $VTG_{partial}$, concurrently with switching on transfer-enable transistor 103 (i.e., by asserting a logic high TGc signal, although in this embodiment TGc is already on). By this operation, illustrated graphically in FIGS. 3 and 4, $VTG_{partial}$ is applied to transfer gate 101 to switch the transfer gate to a "partial on" state ("TG partial on"). Referring to FIGS. 3 and 4, electrostatic potential diagrams for photodiode 110 (a pinned photodiode in this example), transfer gate 101 and floating diffusion 112 are shown below their corresponding schematic cross-section diagrams. Note that the depicted levels of electrostatic potential are not intended to be an accurate representation of the levels produced in an actual or simulated device, but rather a general (or conceptual) representation to illustrate the operation of the pixel read-out phases. Upon application of $VTG_{partial}$ to transfer gate 101, a relatively shallow channel potential 121 is formed between photodiode 110 and floating diffusion 112. In the example of FIG. 3, the level of charge accumulated within the photodiode at the time of the overthreshold detection operation (phase 4) does not rise to the threshold level required for charge to spill over (i.e., be transferred) to the floating diffusion via the shallow channel potential of the partially-on transfer gate. Accordingly, because the accumulated charge level does not exceed the spillover threshold established by application of $VTG_{partial}$ to the control node of transfer gate 101, there is no spillover from the photodiode to the floating diffusion and the accumulated charge instead remains undisturbed within the photodiode. By contrast, in the example of FIG. 4, the higher level of accumulated charge does exceed the spillover threshold so that a portion of the accumulated charge (i.e., that subset of charge carriers that are above the transfer gate partially-on electrostatic potential) spills over into floating diffusion node 112, with the residual accumulated charge remaining within the photodiode as shown at 122.

Still referring to FIGS. 2, 3 and 4, prior to conclusion of overthreshold detection phase 4, the charge level of the floating diffusion is sampled and held within a signal-state sample-and-hold element (i.e., in response to assertion of signal SHS) to yield a threshold-test sample—the difference between the signal-state sample and the previously obtained reset-state sample—to be evaluated with respect to a conditional-read threshold. In one embodiment, the conditional-read threshold is an analog threshold (e.g., to be compared with the threshold-test sample in a sense amplifier in response to assertion of a compare/convert strobe signal) set or programmed to a setting above the sampling noise floor, but low enough to enable detection of minute charge spillover via the shallow transfer gate channel. Alternatively, the threshold-test sample may be digitized in response to assertion of the compare/convert signal (e.g., within an analog-to-digital converter that is also used to generate the finalized pixel sample value) and then compared with a digital conditional-read threshold, again, set (or programmed to a setting) above the noise floor, but low enough to enable detection of trace charge spillover. In either case, if the threshold-test sample indicates that no detectable spillover occurred (i.e., threshold-test sample value is less than conditional-read spillover threshold), then the photodiode is deemed to be in the underthreshold state shown in FIG. 3 and the TGc line is held low in the ensuing conditional read-out phase (phase 5, the final phase) to disable transfer gate 101 for the remainder of the progressive read-out operation—in effect, disabling further read-out from the photodiode and thus enabling the photodiode to continue integrating charge without disruption for at least another sampling interval. By contrast, if the threshold-test sample indicates a spillover event (i.e., threshold-test sample greater than conditional-read/spillover threshold), then the TGc line is pulsed during the conditional read-out phase concurrently with application of a fully-on, "remainder-transfer" potential, $VTG_{full}$, to the TGr line, thereby enabling the remainder of the charge (i.e., charge 122 as shown in FIG. 4) within photodiode 110 to be transferred to floating diffusion 112 via the full-depth transfer-gate channel (123) so that, between the overthreshold transfer in phase 4 and the remainder transfer in phase 5, the charge accumulated within the photodiode since the hard reset in phase 1 is fully transferred to the floating diffusion where it may be sensed in a pixel read-out operation. In the embodiment shown, the pixel-readout operation is effected by pulsing the SHS signal and compare/convert strobe in sequence during conditional read-out phase 5, though either or both of those pulses may optionally be suppressed in absence of an overthreshold detection. Note that conditional read-out of the photodiode (i.e., effected by pulsing TGc in conjunction with application of $VTG_{full}$ on TGr) effectively resets the photodiode (i.e., drawing off all charge to the floating diffusion), while suppression of the conditional read-out leaves the integration state of the photodiode undisturbed. Accordingly, execution of the conditional read-out operation in phase 5 conditionally resets the photodiode in preparation for integration anew in the succeeding sampling interval (subframe) or refrains from resetting the photodiode to enable cumulative integration in the subsequent sampling interval. Thus, in either case, a new integration phase follows phase 5, with phases 2-5 being repeated for each subframe of the overall frame (or exposure) interval, before repeating the hard reset in a new frame. In other embodiments, where cumulative integration is permitted across frame boundaries, the hard reset operation may be executed to initialize the image sensor and omitted for an indeterminate period of time thereafter.

In the embodiment shown, each column of the pixel array is populated by shared-element pixels in which every four pixels form a quad pixel cell 150 and contain respective photodiodes 110 (PD1-PD4), transfer gates 101, and transfer-enable transistors 103, but share a floating diffusion node 152, reset transistor 109, source follower 105 and row-select transistor 107. By this arrangement, the average transistor count per pixel is 2.75 (i.e., 11 transistors/4 pixels), thus effecting a relatively efficient, 2.75 T-pixel image sensor.

Image Decimation and Pixel Binning

A number of conditional-read image sensor embodiments described herein are operable in decimation modes that yield less than maximum image resolution. For example, in one embodiment an image sensor capable of generating an 8 MP (8 megapixel) output in a still-image mode, yields a 2 MP output in a decimated, high-definition (HD) video mode; a 4:1 decimation ratio (higher or lower resolutions may apply in each mode, and other decimation modes and ratios may be achieved in alternative embodiments; also, if the still and video frame aspect ratios differ, some areas of the sensor may not be used at all in one or the other modes).

While post-digitization logic may be provided to decimate full-resolution data (e.g., on-chip logic at the output of the ADC bank or off-chip processing logic), pixel charge aggregation or "binning" within the pixel array and/or voltage binning within sample-and-hold storage elements is applied in a number of embodiments to effect pre-digitization (i.e., pre-ADC and thus analog) decimation, obviating die-consuming and power-consuming digital binning logic and, in many cases, yielding improved signal-to-noise ratio in the decimated output.

Figure 5:
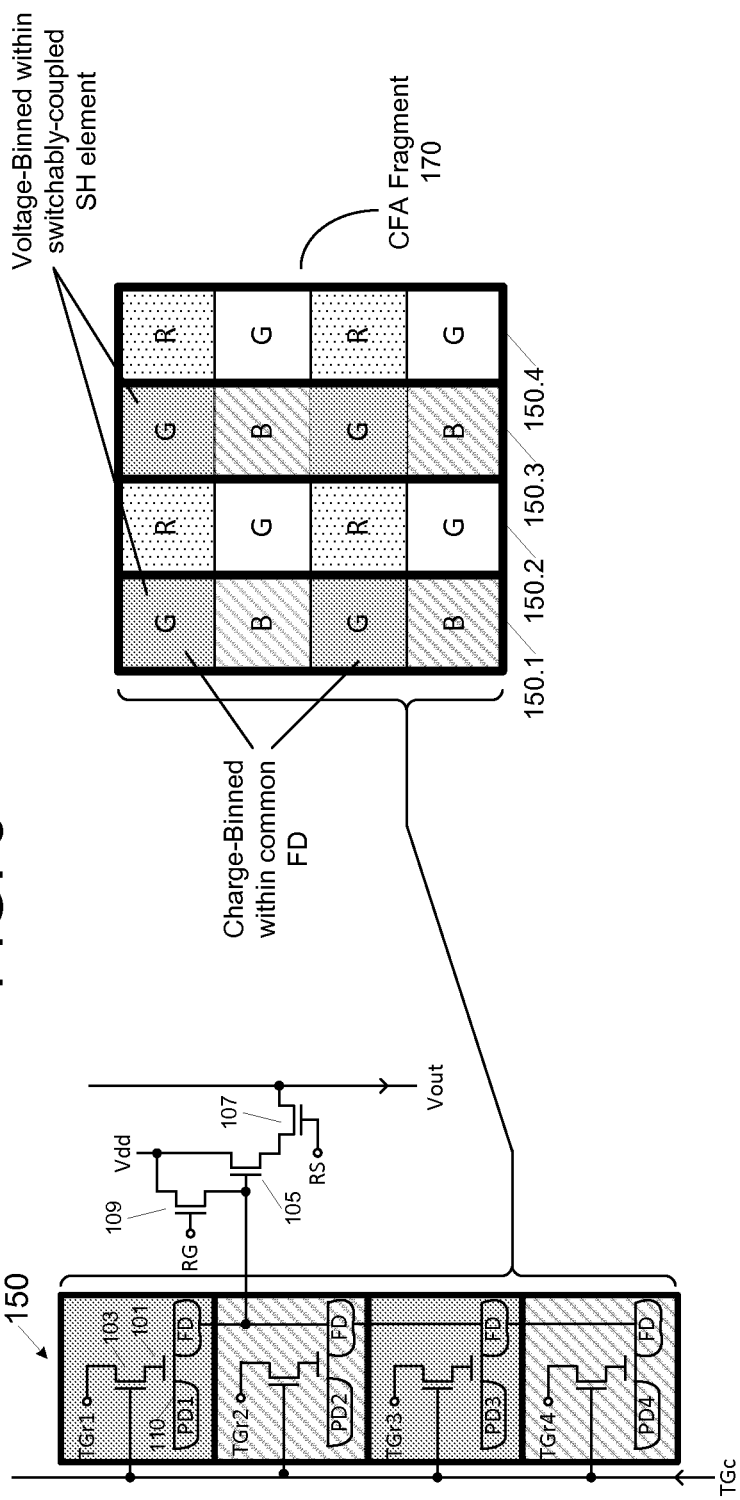
FIG. 5 illustrates an alternative binning strategy that may be executed with respect to a collection of 4×1 quad-pixel blocks in conjunction with a color filter array.

FIG. 5 illustrates a pixel binning/decimation strategy that may be executed with respect to a collection of 4×1 quad-pixel blocks 150 and the color filter array (CFA) fragment shown at 170. In the embodiment shown, the four pixels within each quad pixel block 150 (shown at 150.1-150.4 with respect to the CFA fragment) contain respective photodiodes 110 (PD1-PD4), transfer gates 101, and transfer-enable transistors 103, but share a floating diffusion node 152, reset transistor 109, source follower 105 and row-select transistor 107. By this arrangement, the average transistor count per pixel is 2.75 (i.e., 11 transistors/4 pixels), thus effecting a relatively efficient, 2.75 T-pixel image sensor.

As shown, CFA fragment 170 (i.e., a sufficient portion of a sensor-wide CFA to demonstrate the CFA pattern) includes collections of like colored filter elements at the corner pixels of each 3×3 pixel group. Thus, green filter elements are disposed over shaded pixels 'G', blue filter elements are disposed over striped pixels 'B' and red filter elements are disposed over hashed pixels 'R'. In this arrangement, each pair of like-filtered pixels (i.e., subject to light filtered by same-color filter elements, R, G or B) disposed in the same quad-pixel block thus permit charge binning within their shared floating diffusion as detailed below. Further, referring to FIG. 6, by fixing a column offset between the pixel pair within each column and the like-filtered/same color-plane pair of pixels coupled to the same row lines (i.e., fixed at a spacing of two columns in the example shown) and by providing switching elements at the column read-out points of pixel array 181 (i.e., switching elements 191 and 192 within sample-and-hold circuitry 183), it becomes possible to "voltage-bin" the results of the two charge-binned pixel pairs within sample-and-hold circuitry 183, thus combining (i.e., aggregating, binning) the four corner pixels in each 3×3 pixel group prior to digitization within the ADC elements of SA/ADC block 185.

Figure 6:
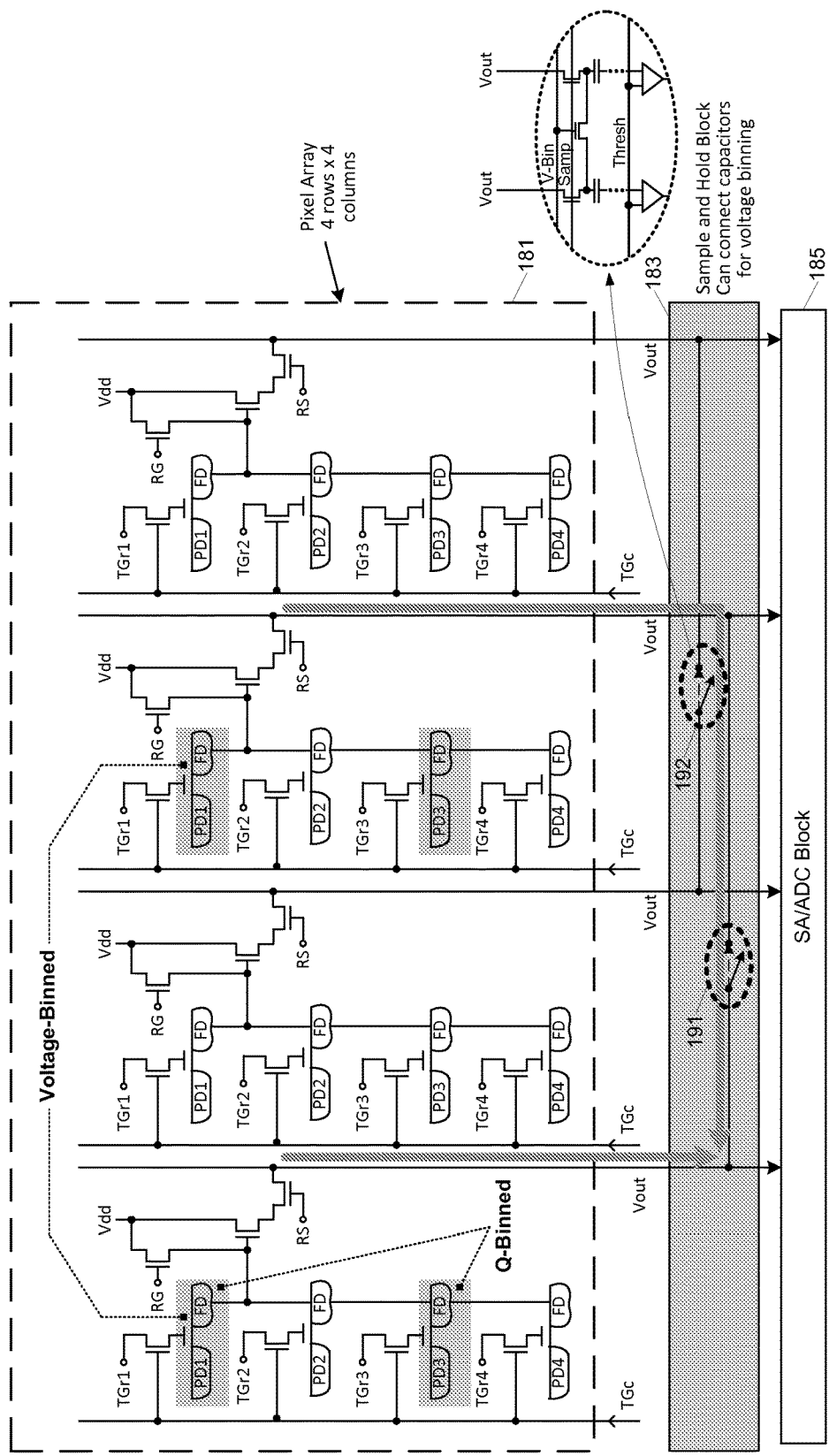
FIG. 6 illustrates a column-interconnect architecture that may be applied to enable voltage-binning of analog signals read-out from selected columns of 4×1 quad-pixel blocks.
Figure 7:
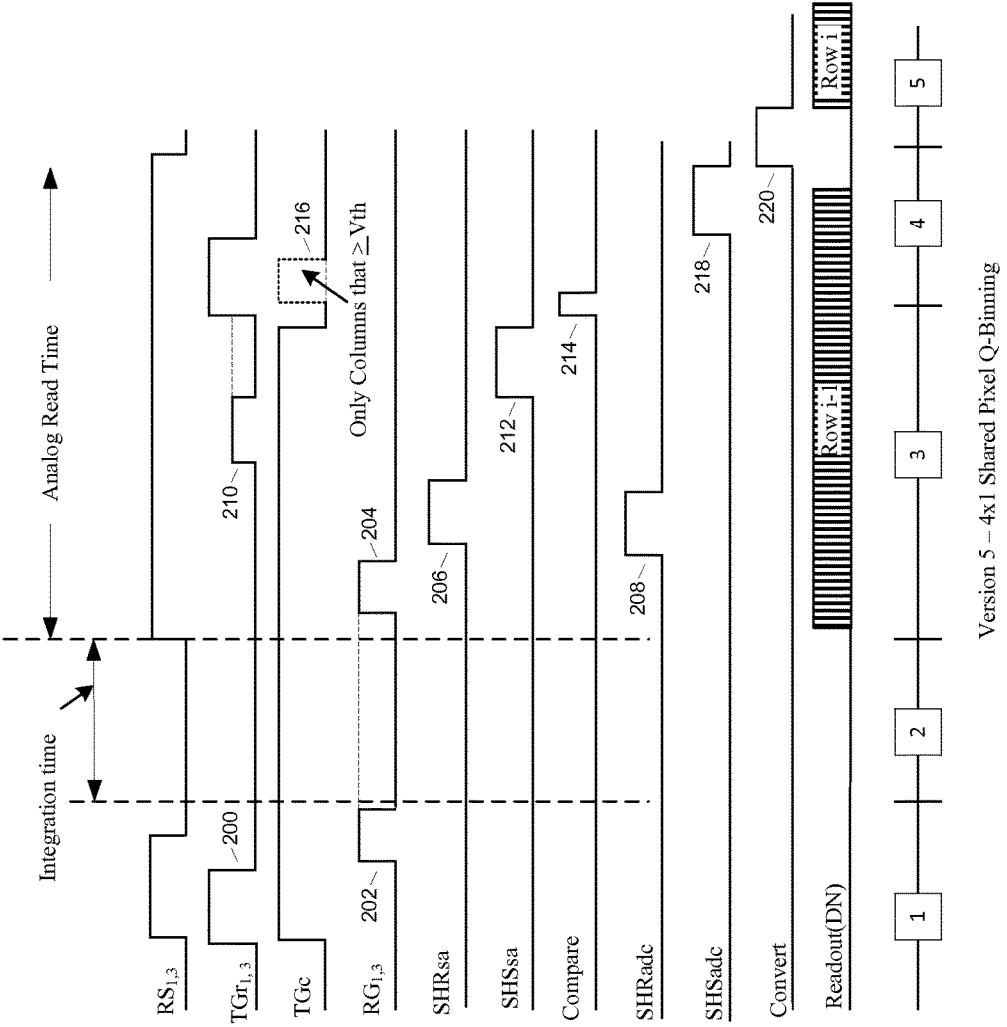
FIG. 7 illustrates an exemplary timing diagram of binned-mode read-out operations within the 4×1 quad-pixel architecture of FIGS. 5 and 6.

FIG. 7 illustrates an exemplary timing diagram of binned-mode read-out operations within the 4×1 quad-pixel architecture of FIGS. 5 and 6. In the example shown, row lines for pixel rows i and i+2 are operated in lock step to achieve 2:1 charge binning within the shared floating diffusion of a given quad-pixel block. More specifically, row signals for pixel rows 1 and 3 of a 4×1 quad pixel block (or row of such quad pixel blocks) are asserted in unison, followed by locked-step assertion of row signals for pixel rows 2 and 4, before advancing to assert row signals for the next row of 4×1 quad pixel blocks. Transverse connections are established within sample-and-hold switch elements (e.g., at 191 and 192 of sample-and-hold block 183 as shown in FIG. 6) to achieve 2:1 voltage binning and thus an overall 4:1 analog signal summing and concomitant image decimation.

Referring more specifically to FIG. 7, the row-select signals ($RS_{1,3}$), reset-gate signals ($RG_{1,3}$) and row transfer-gate signals ($TGr_{1,3}$) for rows 1 and 3 are operated in lock step to reset the photodiodes and shared floating diffusion of the selected pixel rows during hard-reset phase 1, permit charge integration during integration phase 2, determine whether the charge-binned and voltage-binned charge-accumulation results within each column-interleaved collection of four pixels (i.e., the 3×3 corner pixels as described in reference to FIGS. 5 and 6) exceed the conditional-read threshold in threshold-test phase 3, and, if an overthreshold condition is detected, conditionally read-out and digitize the full charge-binned and voltage-binned accumulated charge within the subject pixel collections in conditional read-out phase 4 before transmitting the digitized pixel value to downstream (on-chip or off-chip) processing logic in output phase 5. Considering the phases one by one, during hard-reset phase 1, the row-transfer gate signals TGr1 and TGr3 are pulsed to $VTG_{full}$ (as shown at 200) while simultaneously raising column transfer-gate signal TGc, thus transferring accumulated charge from photodiodes PD1 and PD3 to their shared floating diffusion node. After the photodiode-to-floating-diffusion charge transfer, reset signal RG is pulsed at 202 to clear charge from the floating diffusion in preparation for the ensuing charge integration in phase 2. At the start of threshold-test phase 3, the reset signal is pulsed again (204) to reset the floating diffusions and then signals SHRsa and SHRadc are pulsed at 206 and 208 (while RSi is asserted) to capture samples of the reset-state of the floating diffusions within the respective sample-and-hold elements for the sense amplifier and ADC. After capture, switch 191 is closed to voltage-share between the reset signal sample-and-hold elements for columns 1 and 3, thus producing a reset signal representative of the average of the column 1 and 3 floating diffusions. At 210, TGr1 and TGr3 are raised to the partial-on transfer potential, $VTG_{partial}$, to enable charge spillover to the shared floating diffusions if an overthreshold condition exists in either or both of the photodiodes of the subject pixels in a column. The SHSsa signal is then pulsed at 212 to capture the signal-state of the floating diffusion nodes. Subsequently, switch 191 is closed to voltage-share between the threshold-compare sample-and-hold elements for columns 1 and 3, thus voltage binning the two charge-binned spillover samples. The threshold-test phase is concluded by lowering the TGc signal and asserting the compare-strobe (214) to trigger a threshold comparison within the sense amplifier of either column 1 or column 3 (the other may be deactivated), comparing the aggregated spillover charge from the four charge/voltage binned pixels against a conditional-read threshold. If the comparison result indicates an overthreshold condition, the TGc signals on both columns 1 and 3 are pulsed at 216 during application of $VTG_{full}$ on the TGr1 and TGr3 lines, (thus enabling a full read-out of photodiodes PD1 and PD3 to the shared floating diffusions within corresponding quad pixel blocks), and then the SHSadc signal is raised at 218 to capture the signal-state of the floating diffusion nodes within a signal-state sample-and-hold element in each column. Subsequently, switch 191 is closed to voltage-share between the signal-state sample-and-hold elements for columns 1 and 3, (i.e., voltage-binning the charge-binned floating diffusion contents). Thereafter, the convert-strobe is pulsed at 220 to trigger an ADC operation (for either column 1 or 3, but both are not necessary) with respect to the voltage/charge-binned signal state captured within the sample-and-hold circuit (if any), followed by transmission of the ADC output in phase 5. As discussed above, the ADC operation and data transmission operations may be suppressed to save power and reduce signaling bandwidth if an overthreshold condition is not detected in threshold-test phase 4.

Image Sensor Architecture, System Architecture

Figure 8:
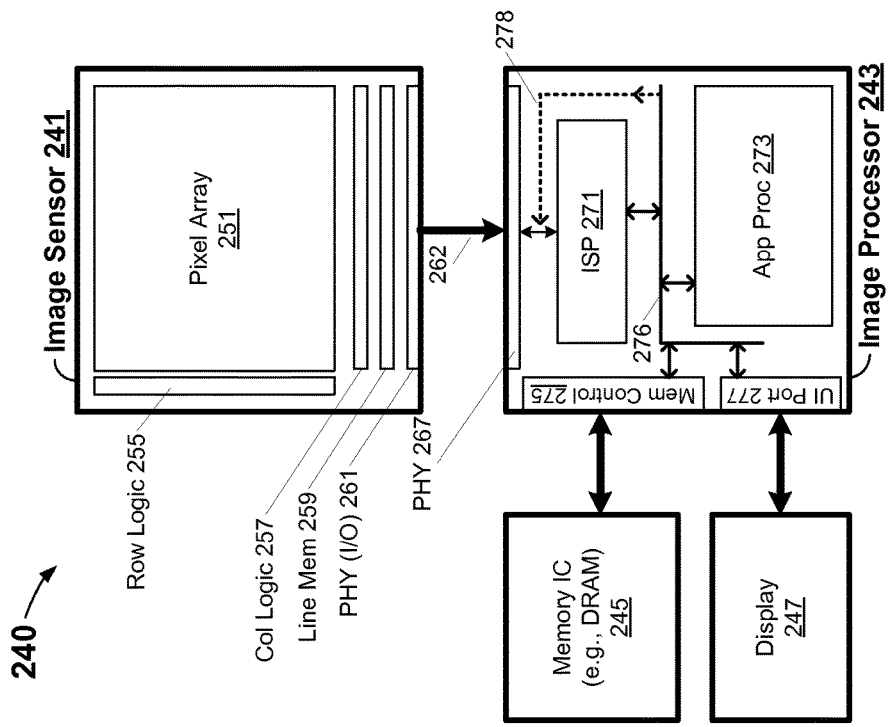
FIG. 8 illustrates an embodiment of an imaging system having a conditional-read image sensor together with an image processor, memory and display.

FIG. 8 illustrates an embodiment of an imaging system 240 having an image sensor 241, image processor 243, memory 245 and display 247. The image sensor 241 includes a pixel array 251 constituted by temporally-oversampled conditional-read pixels according to any of the embodiments disclosed herein, and also includes pixel control and read-out circuitry as described above, including row logic 255, column logic 257, line memory 259 and PHY 261. Image processor 243 (which may be implemented as a system-on-chip or the like) includes an image signal processor (ISP) 271 and application processor 273, coupled to one another via one or more interconnect buses or links 276. As shown, ISP 271 is coupled to receive imaging data from the pixel array via PHY 267 (and signaling link(s) 262, which may be implemented, for example, by a Mobile Industry Processor Interface ("MIPI" bus) or any other practicable signaling interface), and the ISP and application processor are coupled to a memory control interface 275 and user-interface port 277 via interconnect 276. Further, as explained below, interconnect 276 may also be coupled to the image sensor interface of ISP 271 (i.e., the ISPs interface to PHY 267) via side-channel 278 to enable the application processor to deliver data to the ISP in a manner that emulates an image sensor.

Still referring to FIG. 8, imaging system 240 further includes one or more memory components 245 coupled to the memory control interface 275 of image processor 243. In the example shown, and in the discussion below, the memory components are assumed to include a dynamic random access memory (DRAM) which may serve as a buffer for image sub-frame data and/or as a frame buffer for other functions. The memory components may additionally include one or more non-volatile memories for long-term storage of processed images.

User-interface port 277 is coupled to a user display 247 which may itself include a frame memory (or frame buffer) to store an image to be displayed for a user (e.g., a still image frame or video frame). Though not shown, user-interface port 277 may also be coupled to a keypad, touchscreen or other user-input circuitry capable of providing information to image processor 243 corresponding to user-input, including operating mode information that may be used to configure decimation modes within the image sensor 241. Although also not shown, image processor 243 may be coupled to image sensor 241 through a sideband channel or other control interface to permit transmission of operating mode, configuration information, operation-triggering instructions (including image capture instructions, configuration-programming instructions, etc.) and the like to the image sensor.

Figure 9:
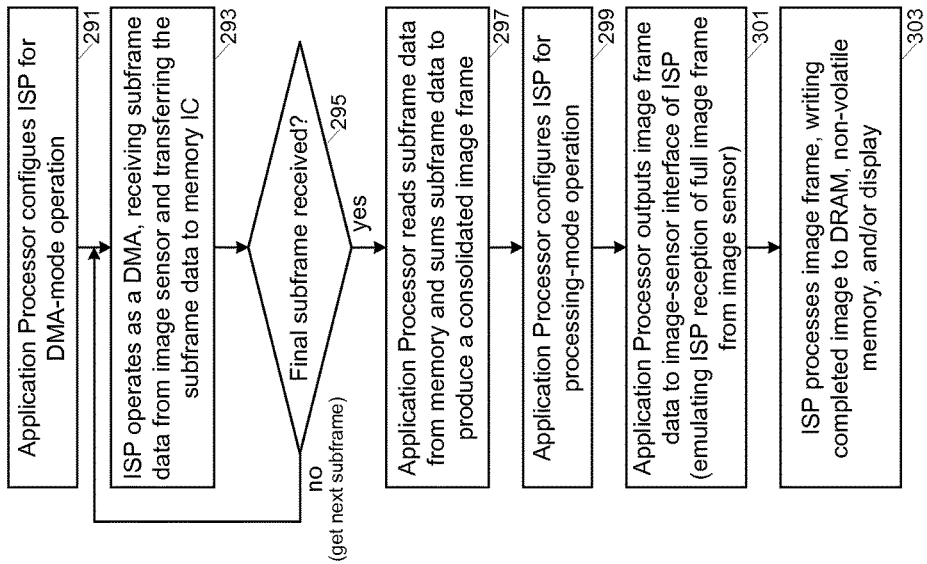
FIG. 9 illustrates an exemplary sequence of operations that may be executed within the imaging system of FIG. 8 in connection with an image processing operation.

FIG. 9 illustrates an exemplary sequence of operations that may be executed within the imaging system of FIG. 8 in connection with an image processing operation. Starting at 291, the application processor configures ISP 271 for DMA (direct-memory-access) operation with respect to memory control interface 275 and thus memory IC 245. By this arrangement, the ISP is enabled to operate as DMA controller between image sensor 241 and memory IC 245, receiving subframe data from image sensor 241 row by row (as shown at 293) and transferring the subframe data to the memory IC. Thus, the subframe data generated by temporal oversampling within image sensor 241 are, in effect, piped through the ISP directly to memory IC (e.g., a DRAM) where they may be accessed by the application processor. Note that, in the embodiment shown, subframes are loaded into the memory one after another until a final subframe has been received and stored (i.e., the frame-by-frame storage loop and its eventual termination being reflected in decision block 295). This process may be optimized in an alternative embodiment by omitting storage of the final subframe in memory IC 245 and instead delivering the final subframe data directly to application processor 273. In other embodiments, subframe readout is interleaved, such that the ISP may be receiving successive rows from different incomplete subframes and either sorting them as they are stored, or as they are retrieved at step 297. That is, as shown at 297, the application processor retrieves and combines (e.g., sums or combines in some other fashion) the stored subframes to produce a consolidated (integrated) image frame so that, instead of storing the final subframe in memory and then reading it right back out, the final subframe may be delivered directly to the application processor to serve as a starting point for subframe data consolidation. In any case, at 299 the application processor configures ISP 271 for operation in image-processing mode and, at 301, outputs the image frame data (i.e., the consolidation of the temporally oversampled image sensor data, with any preprocessing or compression applied, as applicable) to the image-sensor interface of the ISP (i.e., to the front-end of the ISP via channel 278), thereby emulating image sensor delivery of a full image frame to ISP 271. At 303, the ISP processes the image frame delivered by the application processor to produce a finalized image frame, writing the completed (processed) image frame, for example, to DRAM or non-volatile memory (i.e., one or both of memory ICs 245), and/or directly to the frame buffer within display 247 to enable the image to be displayed to the system user.

Low Power, Pipelined Image Sensor

Figure 10:
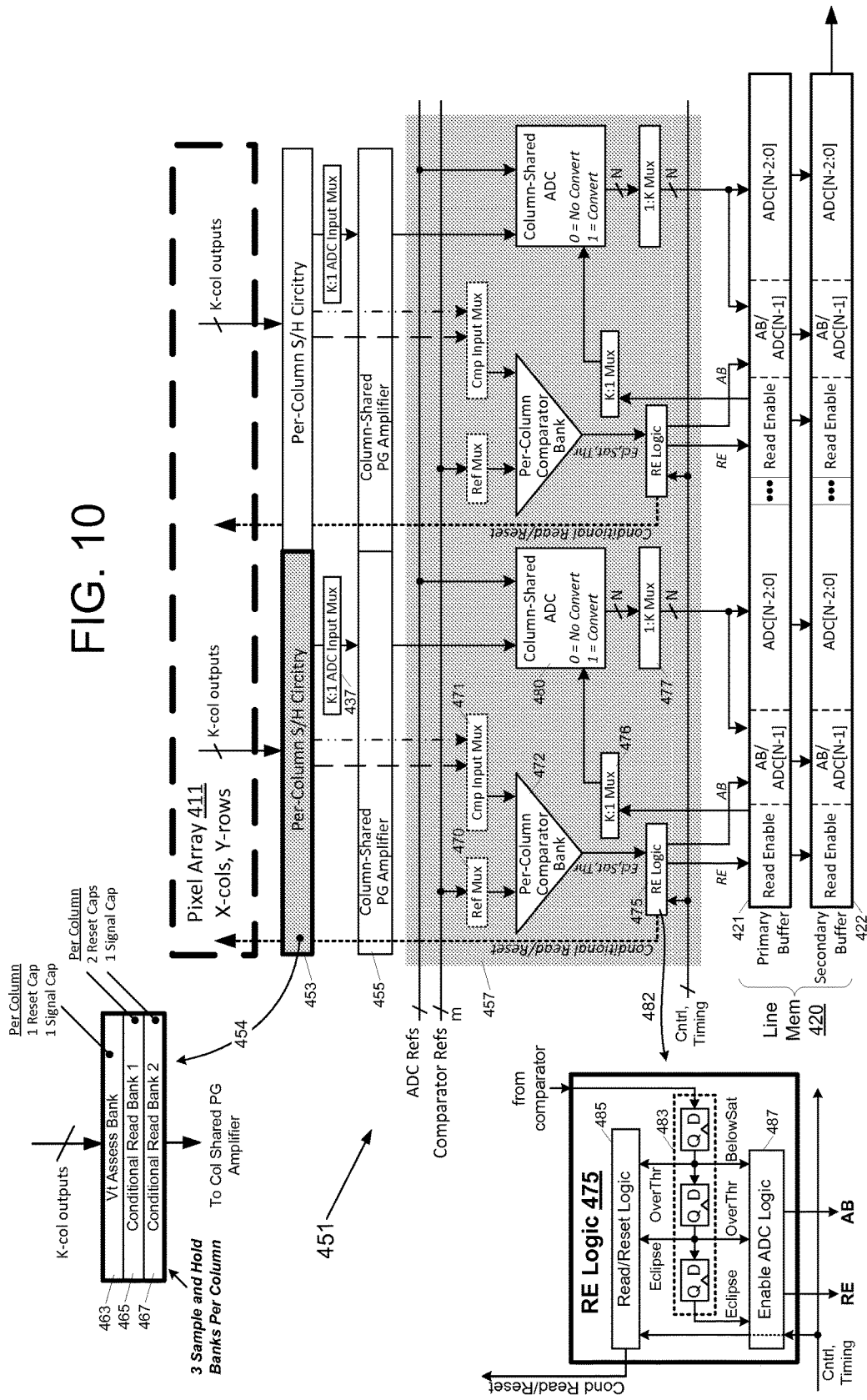
FIG. 10 illustrates an embodiment of a low power image sensor that may be used to implement component circuitry within the image sensor of FIG. 8.

FIG. 10 illustrates an embodiment of a low power image sensor that may be used to implement component circuitry within the image sensor of FIG. 8. In the example shown, image sensor 451 includes a pixel array 411, multi-bank sample-and-hold (S/H) circuitry 453, column-shared programmable-gain (PG) amplifier bank 455 (PGA), comparator/ADC circuitry 457 (including per-column comparator circuitry and column-shared ADC circuitry as discussed below), and line memory 420. Pixel array output lines convey pixel read-out signals to sample-and-hold circuitry 453, which in turn supplies analog samples of the read-out signals, with and without gain from the PGA 455, to comparator/ADC circuitry 457. To conserve die area, a single programmable gain amplifier 455 and single ADC circuit 480 are shared among K columns of the pixel array and cycled K times for each row of the pixel array (for an unconditional readout operation). By contrast, a dedicated (separate) threshold comparator 472 is provided for each column of pixels to enable pixel state (e.g., eclipse, under/over threshold, saturation) to be assessed across an entire row of pixels in parallel. In the embodiment shown, such "per-column" threshold comparators 472 are operated cyclically to perform multiple pixel state evaluations per pixel row (i.e., in parallel for each pixel in the row), including an eclipse assessment to determine, for each pixel in the row, whether the reset-state of the floating diffusion has fallen below an eclipse threshold; an underthreshold assessment to determine whether charge integration within the pixel has exceeded a conditional read/reset threshold, and a saturation assessment to determine whether the pixel charge integration level sampled in a conditional read/reset operation exceeds a saturation threshold (i.e., a threshold corresponding to a saturation point of ADC circuit 480). Thresholds corresponding to the various pixel state assessments (e.g., eclipse threshold, conditional read/reset threshold, saturation threshold) are applied one after another to the input of the per-column comparators 472 via corresponding reference multiplexers 470, and a comparator input multiplexer 471 is provided to select between multiple sample-and-hold circuit outputs as discussed below.

Comparator results for each pixel column are captured within a respective read-enable logic circuit 475 which conditionally drives a conditional read/reset signal (e.g., TGc) back to the pixel column and also outputs read-enable and above/below-range bits (RE and AB) to primary buffer 421 of line memory 420. After pixel state assessment is complete for a given pixel row, the read-enable bit for each of K columns is passed, one after another via multiplexer 476, to the enable input of column-shared ADC (analog-to-digital converter) circuit 480 and to column-shared PGA 455, thereby selectively enabling digitization of individual column read-outs (i.e., according to the logic state of the selected RE bit), suppressing signal amplification and digitization (and thus conserving power) for pixels that are eclipsed, below the conditional read/reset threshold, or saturated. Multiplexer 477 is provided to demultiplex (i.e., distribute) digitized samples from column-shared ADC circuit 480 into respective per-column storage locations within the primary line-memory buffer 421 including, in the embodiment shown, overwriting the AB bit location.

Still referring to FIG. 10, pipelined operation within the various data read-out stages (i.e., pixel state assessment, conditional ADC, and line memory read-out) is enabled, at least in part, by multi-bank sample-and-hold circuitry 453. In the embodiment shown in detail view 454, for example, three separate sample-and-hold banks are provided for sequentially executed read-out operations, including an "Eclipse/Vt" bank 463 that stores pixel samples evaluated to detect eclipse events and determine whether the conditional read/reset threshold is exceeded (the latter referred to alternately as "Vt assessment" or conditional read/reset threshold assessment); an even-row conditional read S/H bank 465 (Conditional Read Bank 1) to store pixel samples that enable saturation detection and read-out digitization (ADC operation) for even-numbered pixel rows, and an odd-row conditional read S/H bank 467 (Conditional Read Bank 2) to store pixel samples that enable saturation detection and read-out digitization for odd-numbered pixel rows. As explained in greater detail below, by providing a separate (dedicated) Eclipse/Vt bank 463, S/H for the comparator operation can be pipelined with storage into the conditional read S/H banks. Thus, by providing separate conditional read S/H banks for even and odd rows and alternately storing samples therein for eventual digitization within the column-shared ADC circuitry, it becomes possible to pipeline pixel state assessment and ADC operations from row to row.

Referring to detail view 482, an exemplary implementation of RE logic 475 includes shift register 483 to capture the output of comparator 472 following a sequence of per-row pixel assessment evaluations, latching each new assessment result (i.e., comparator output, including an eclipse flag, overthreshold flag and below-saturation flag) in response to a timing signal from the sensor control logic (e.g., element 983 of FIG. 44). Read/reset logic 485 evaluates the states of the eclipse and overthreshold (i.e., above Vt) flags when enabled by another timing signal (or state transition signal), asserting a conditional read/reset signal according to their states as discussed below. Similarly, Enable-ADC logic 487 outputs read-enable and above/below-range bits (RE) and (AB) for the pixel under evaluation in response to another control/timing signal and according to the states of the eclipse, overthreshold and below-saturation flags.

Figure 11:
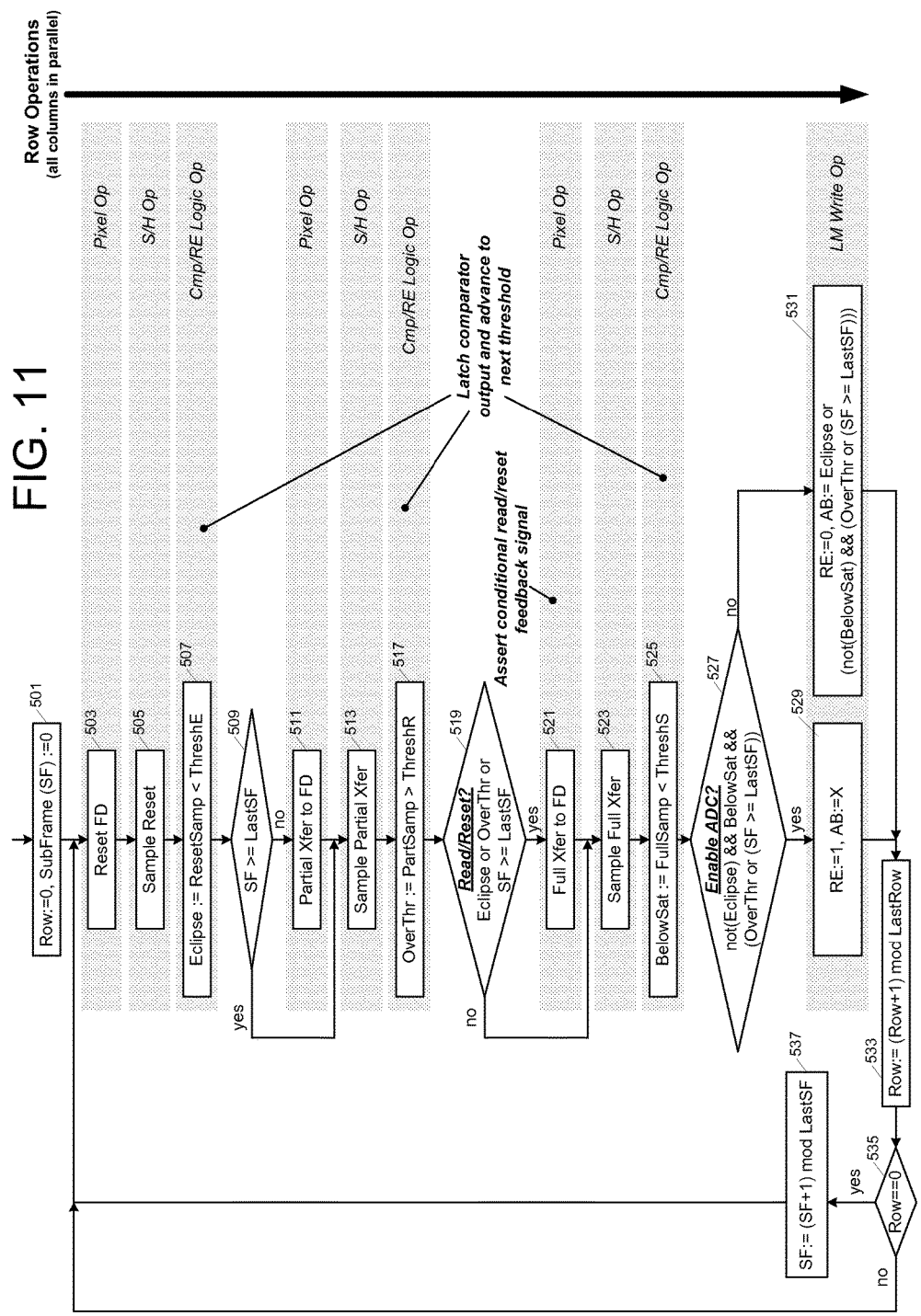
FIG. 11 illustrates a sequence of operations that may be executed within the pixel array, sample/hold banks and comparator circuitry of FIG. 10 to carry out pixel state assessment and enable subsequent ADC operation for row after row of pixels.

FIG. 11 illustrates a sequence of operations that may be executed within the pixel array, sample/hold banks and comparator circuitry of FIG. 10 to carry out pixel state assessment and enable subsequent PGA and ADC operation for row after row of pixels. In the implementation shown, each image frame is assumed to contain a sequence of conditional-read subframes that conclude with conditional read/reset operations, and a final unconditional-read subframe in which the integration states of pixels within the subject row are unconditionally read-out and, if no saturation or eclipse condition is detected, digitized to yield a subframe output. This approach of conditionally reading out pixel data during non-final subframes of a given image frame and then concluding the image frame with an unconditional read/reset operation is carried forward in a number of embodiments described below. In all cases, conditional read/reset operations may be carried out unconditionally (i.e., regardless of threshold comparison results) and unconditional read/reset operations may be replaced by conditional read/reset operations.

Starting at 501, row and subframe indices (Row, SF) are cleared to zero, followed by a three-phase pixel assessment operation involving, in order, the selected pixel row (i.e., row zero in the first loop iteration), the sample and hold circuitry, and the comparator/read-enable logic. More specifically, the floating diffusion (FD) is reset in a pixel operation at 503, a sample of the FD reset state is captured in the sample-and-hold circuitry at 505 and the reset-state sample is compared with an eclipse threshold at 507, with the result of the eclipse assessment being latched as a Boolean "Eclipse" flag (e.g., within RE shift register 483 of FIG. 10). If the subframe is not the last (final) subframe in the exposure interval (negative determination at 509), another three-phase pixel assessment operation is carried out to determine whether charge integrated within the pixel has exceeded the conditional read/reset threshold. Thus, a partial transfer from photodetector to floating diffusion is executed in a pixel operation at 511, a sample of the signal-state of the floating diffusion (enabling determination of whether a least a specified amount of charge was transferred during the partial-transfer operation) is captured within the sample and hold circuitry at 513, and the signal-state sample is compared within a conditional read/reset threshold (ThreshR) within the comparator circuitry at 517, with the result of the comparison being latched as a Boolean "OverThr" flag within the RE logic. In the embodiment shown, if the subframe is the final subframe (i.e., affirmative determination at 509), the partial transfer operation at 511 is bypassed, thus leaving the state of the photodetector undisturbed in preparation for an unconditional read operation (note that some other operating modes may have more than one unconditional read per row per frame). In one implementation, the sample and hold operation at 513 and the ThreshR comparison/OverThr latching operations at 517 are carried out regardless of whether partial transfer operation 511 is bypassed, thus simplifying control of the sample and hold circuitry and comparator/RE logic (i.e., the logic may operate the same way for each subframe so that no subframe-dependent control operation is needed with respect to the operations shown at 513 and 517). In alternative embodiments, the control logic may account for the final subframe condition and bypass the partial transfer sample operation 513 and/or comparator/read-enable logic operation 517.

Referring to the read/reset determination at 519, if either the Eclipse flag or OverThr flag is set (indicating that the subject pixel is in an eclipsed state and thus should be reset, or that sufficient charge has been integrated within the pixel to trigger conditional read and reset), or if the subframe is the final subframe in the integration interval (indicating that an unconditional read/reset is to be performed), then a full transfer from photodetector to floating diffusion is executed in the pixel operation at 521 (thus resetting the photodetector), followed by capture of the signal-state of the floating diffusion in a sample-and-hold operation at 523, and then a comparison of the signal-state sample with a saturation threshold (ThreshS) at 525, with the comparison result being latched as a Boolean "BelowSat" flag within the RE logic (a differential saturation test may be applied in alternative embodiments, comparing the difference between the signal-state sample and reset sample with the saturation threshold). Note that the floating diffusion of the pixel will be reset at 503 before further sampling so that the photodetector-to-floating diffusion charge transfer at 521 effectively resets the pixel. Thus, if the pixel is eclipsed, has integrated charge above the conditional read/reset level, or is being evaluated in the final subframe of an exposure interval (i.e., affirmative determination at 519), the pixel is reset. By contrast, if the pixel is neither eclipsed nor overthreshold in a non-final subframe (negative determination at 519), the charge transfer operation at 521 is bypassed, thereby preserving charge within the photodetector to enable integration to continue into the next subframe. Note that the sampling operation at 513 and BelowSat comparison/result-latch at 517 may be omitted for eclipsed pixels in an alternative embodiment.

At 527, the OverThresh, BelowSat and Eclipse flags are evaluated together with the final-subframe indication to either enable or disable PGA and ADC operation with respect to the subject pixel, a selection effected by setting or clearing the RE bit in a line memory write operation at 529 or 531, respectively. More specifically, if the pixel state flags indicate that the pixel is not eclipsed and below the saturation threshold, and either (i) the subframe is the final subframe or the pixel state flags indicate that the partial read-out exceeded the conditional-read threshold (i.e., affirmative determination at 527), then PGA and ADC operation is enabled by setting the read-enable bit in a line memory write operation at 529. In that case, the value written to the AB bit, if any, is a don't care ('X') as the set RE bit will enable a subsequent ADC output to overwrite the AB bit. If the pixel state flags indicate that the pixel is either eclipsed or saturated, or does not exceed the conditional read/reset threshold (except in final subframe), or is not below the saturation threshold (i.e., negative determination at 527) then PGA and ADC operation is disabled by clearing the read-enable bit in a line memory write operation at 531. If ADC operation is disabled, the AB bit is written with a value that indicates whether the pixel state is saturated or eclipsed (AB:=1), or the pixel is underthreshold (AB:=0). Note that the expression shown in operation 531 reflects the particular implementation of the pixel assessment shown in FIG. 11 (i.e., OverThresh is meaningless if the pixel is eclipsed, and BelowSat is meaningless if Overthresh and Eclipse are both false in a non-final subframe) and may be different for a different pixel assessment sequence. Following the line memory write operation at 529 or 531, the row index is incremented by the scan sequencer (i.e., within control logic 983 of FIG. 44) at 533 in preparation for loop iteration with respect to the subsequent pixel row, rolling/resetting to row zero following loop iteration with respect to the final row in the sensor (for interleaved operation, row sequencing will not be sequential and the subframe index may change at each row). If a row reset occurs (i.e., affirmative determination at decision 535), the subframe index is incremented at 537 in preparation for subsequent subframe processing, rolling to zero if the just-processed subframe was the final subframe in an exposure. Note that depending on the pixel architecture and subframe exposure method, the next row may not be physically adjacent to the subsequent row.

Referring to FIGS. 10 and 11, in one embodiment, the comparator/RE logic operations shown at 507, 517 and 525, not only latch the comparator output within the RE logic (e.g., shifting the comparator result into shift register 483 of FIG. 10), but also advance the control input to reference multiplexer 470, thereby sequencing in order through the eclipse, conditional-read and saturation thresholds (ThreshE, ThreshR, ThreshS). While not specifically shown, the conditional reset and/or saturation thresholds may be changed from subframe to subframe, thus enabling subframe-specific thresholds to be applied according to subframe duration (i.e., setting a higher or lower conditional read threshold according to the subframe integration interval), programmable gain settings (i.e., aligning ThreshS with the signal level that will saturate the ADC for a given programmable gain setting), and/or any other factors.

Figure 12:
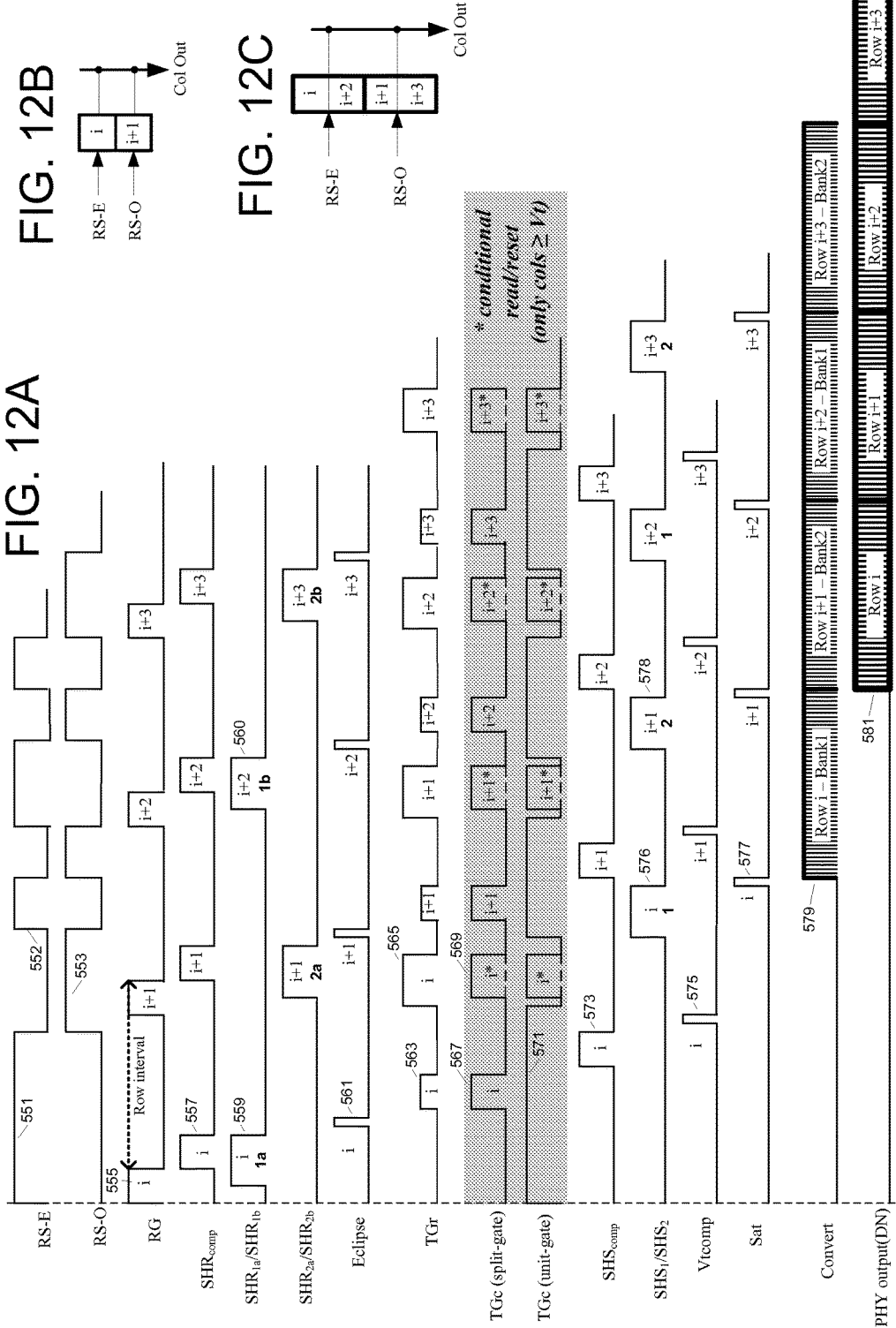
FIG. 12A illustrates an exemplary timing diagram in accordance with the sensor architecture of FIG. 10 and operational sequence of FIG. 11, including alternate TGc waveforms corresponding to split-gate and continuous-gate pixel array embodiments, respectively.
FIGS. 12B and 12C present exemplary read-out sequences that may be employed with respect to even and odd rows of pixels.

FIG. 12A illustrates an exemplary timing diagram in accordance with the sensor architecture of FIG. 10 and operational sequence of FIG. 11, including alternate TGc waveforms, "TGc (split-gate)" and "TGc (unit-gate)," corresponding to split-gate and continuous-gate pixel array embodiments, respectively. As noted above, the TGc waveforms for the two embodiments differ primarily in the TGc state during intervals of isolation between photodetector and floating diffusion. In the exemplary diagram of FIG. 12A, for instance, TGc is lowered in the split-gate embodiment to maximize the isolation between photodetector and floating diffusion, but held high in the continuous-gate embodiment for the same purpose (i.e., to ensure that the low state of the TGr line is applied to the transfer gate and thus avoid (or minimize) the floating transfer-gate condition.

FIGS. 12B and 12C present exemplary read-out sequences that may be employed with respect to even and odd rows of pixels. More specifically, FIG. 12B illustrates a non-shared pixel architecture where even and odd rows and pixels have a dedicated RS control and are read-out one after another, while FIG. 12C illustrates a shared pixel architecture in which each pair of pixels within a pixel column form a two-pixel cell (sharing a floating diffusion) and share a read-out line. In this arrangement, a first 2-row by 1-column shared pixel cell containing even-row pixels 'i' and 'i+2' and a second 2-row by 1-column shared pixel cell containing odd-row pixels 'i+1' and 'i+3' constitute a 4-row by 1-column region. A single row-select signal (RS-E) is provided for the first shared pixel cell (the even-row pixels) and another single row-select signal (RS-O) is provided for the second shared pixel cell (the odd-row pixels). The row readout order is as shown from top down (i.e., i, i+2, i+1, i+3) to avoid resource conflict with the shared floating diffusion region in the shared pixel cells. In general, the timing diagram of FIG. 12A, sample-and-hold circuitry described below in reference to FIG. 13 and sample-and-hold pipeline shown in FIG. 14 refer to the dedicated row-select embodiment of FIG. 12B. In all cases, the timing events and circuitry shown may be extended to cover the shared-read-out architecture of FIG. 12C or other shared read-out (shared floating diffusion and/or shared sample/hold circuitry) architectures, including 2×2 pixel-sharing readout architectures where each row readout may only be a half-row (even or odd columns) readout. Note also that "even" and "odd" readout refers to the use of the sample and hold registers and does not require that readout of an odd array row always follow an even array row—for interleaved readout where a row readout from one subframe is followed by a row readout from another subframe, the two row indices always may be spaced apart in the array and thus an even row could follow another even row in readout order, without causing a resource conflict.

In the timing example presented in FIG. 12A, interleaved pixel row operations are executed for even and odd pixel rows with the row operations for any single row corresponding to those shown in FIG. 11. More specifically, pixel reset, reset-state sample, eclipse assessment, partial transfer, signal-state sample and overthreshold (i.e., conditional read/reset threshold) assessment operations are executed with respect to even pixel row 'i' during an interval in which an even-row row-select signal (RS-E) is asserted as shown at 551, followed by pixel reset, reset-state sample and eclipse assessment operations with respect to odd pixel row 'i+1' during assertion of odd-row row-select signal (RS-O) at 553. Thereafter, RS-E is raised again at 552 to enable signal-state sample capture following a conditional read/reset operation in pixel i, with RS-O and RS-E thereafter being alternately enabled to permit interleaved (pipelined) reset-state and signal-state sampling operations with respect to the even and odd sample-and-hold banks. As discussed above, pixel reset is effected by assertion of a reset-gate signal (RG) as shown at 555 to couple the floating diffusions within a given row of pixels to a reset potential. Note that the pixel row index 'i' shown beneath the signal pulse in the signal RG waveform signifies a pulse on the RG signal line for row 'i', while pulse 'i+1' shown in that same waveform signifies a pulse on the RG signal line for row 'i+1' and thus the pulsing of a separate signal line—this indexed interpretation applies in a number of waveforms depicted in FIG. 12A.

Continuing with FIG. 12A, a row 'i' reset-state sample capture within the Eclipse/Vt S/H bank is triggered by assertion of $SHR_{comp}$ at 557, with $SHR_{1a}$ being simultaneously (559) asserted to capture a reset-state sample within the even row conditional read S/H bank, the latter sample to be applied during subsequent saturation assessment and, if enabled, ADC operation. An eclipse signal is pulsed at 561 to enable the $SHR_{comp}$ reset-state sample to be compared with an eclipse threshold (ThreshE) and latch the comparison result (e.g., within the RE logic as discussed above). Thereafter, at 567, TGc is pulsed (split-gate embodiment) or maintained high (continuous-gate embodiment) and TGr is concurrently raised to a partial-transfer potential (e.g., $VTG_{partial}$ as discussed above) at 563 to enable partial charge transfer from photodetector to floating diffusion, followed by an $SHS_{comp}$ pulse at 573 to capture a signal-state sample of the floating diffusion within the Eclipse/Vt sample-and-hold bank. In the case of a non-final subframe, Vtcomp is pulsed at 575 to compare the partial-transfer sample (i.e., the signal-state sample less the reset-state sample within the Eclipse/Vt sample-and-hold bank) with the conditional read/reset threshold (ThreshR) and latch the comparison result. As discussed above, the Vtcomp pulse may be suppressed in a subframe in view of a forthcoming unconditional read.

Still referring to FIG. 12A, the read-enable logic conditionally asserts the TGc signal at time 569 (i.e., if the conditional read/reset threshold is exceeded, the pixel is eclipsed or an unconditional read/reset is to be performed), concurrently with the full-transfer pulse 565 on the TGr line, thereby enabling charge integrated within the photodetector to be transferred in its entirety to the floating diffusion, resetting the photodetector in preparation for the next integration interval. $SHS_1$ is pulsed at 576 to capture the signal state of the floating diffusion within conditional read S/H bank 1, and at 577 a saturation signal is pulsed to enable the floating diffusion signal state less reset-state (the latter captured in response to the $SHR_{1a}$ pulse at 559, or alternately the floating diffusion signal state) to be compared with an appropriate saturation threshold (ThreshS). As discussed above, the combined pixel assessment results (i.e., eclipse, conditional read/reset and saturation assessments) may be recorded in line memory in the form of RE and AB bits, thus enabling column-sequential ADC operations to be carried out selectively according to the RE bit state for each individual pixel column. At 579, a convert signal is cycled K times (e.g., 48 times) per row read interval (e.g., 2.75 microseconds, though different row intervals may apply) to enable column-shared ADC operation, with the output of each individual pixel column (i.e., signal state less reset state amplified according to the gain selected within the programmable gain amplifier) being selectively/conditionally digitized according to the state of the corresponding RE bit. Digitized read-out values are stored within the line memory as described above, with the contents of the primary line memory buffer transferred to the secondary buffer and output via the PHY with a one row-interval latency as shown at 581.

The multi-bank sample-and-hold implementation shown in FIG. 11 and described in further detail below in reference to FIG. 13 becomes easier to understand in the context of FIG. 12A. More specifically, provision of separate even-row and odd-row conditional read S/H banks makes it possible to capture a signal-state sample of the full charge transfer from photodetector to floating-diffusion within the conditional read S/H bank for an odd pixel row (e.g., row i+1 as shown at $SHS_2$ pulse 578) concurrently with ADC operations with respect to prior-row pixel samples latched within the even-row conditional read S/H bank, and vice-versa. Similarly, because the reset-state sample captured within a given conditional read S/H bank is maintained for more than one row interval (i.e., to support Vt assessment as shown at 575, and ADC operation at 579, provision of two reset-state S/H elements, 'a' and 'b', per conditional read S/H bank makes it possible to pipeline those operations without resource conflict. This can be seen by the alternating assertion of signals $SHR_{1a}$ and $SHR_{1b}$ for even row reset-state samples (e.g., for samples i and i+2 as shown at 559 and 560) and, similarly, by the alternating assertion of signals $SHR_{2a}$ and $SHR_{2b}$ for odd row reset-state samples. Further, because the Eclipse/Vt assessment may be completed within a row interval, a single Eclipse/Vt S/H bank is sufficient to support operations in all rows.

FIG. 13 illustrates an embodiment of multi-bank sample-and-hold circuit 601 that may be used to implement the sample-and-hold (S/H) circuitry depicted in FIG. 10. As shown, the column read-out line for each of K pixel columns ($out_0$, $out_1$, . . . , $out_{K-1}$) is supplied to a respective per-column S/H circuit 621, each of which includes three sets of sample-and-hold elements (switch elements and storage elements) corresponding to the three sample-and-hold storage banks shown in FIG. 11, namely, an eclipse/Vt assess bank, and separate even and odd conditional read banks (i.e., Conditional Read Bank 1 and Conditional Read Bank 2). More specifically, as shown in detail view 622, a per-column component of the eclipse/Vt assess bank 625 includes two capacitive storage elements, $Cr_{comp}$, $Cs_{comp}$, coupled via switch elements 631 and 633 to control lines $SHR_{comp}$ and $SHS_{comp}$, respectively. By this arrangement, when either of the $SHR_{comp}$ or $SHS_{comp}$ signals is pulsed (e.g., as shown in FIG. 12A), the floating diffusion state driven onto column read-out line, Out (e.g., by a source follower transistor as described above), is captured within the corresponding capacitive element.

Still referring to FIG. 13, even-row conditional read S/H bank component 627 includes a pair of reset-state capacitive elements, $Cr_{1a}$ and $Cr_{1b}$, and corresponding switch elements 635, 637 (controlled by $SHR_{1a}$ and $SHR_{1b}$, respectively), and a signal-state capacitive element $Cs_1$ and corresponding switch element 639 controlled by $SHS_1$. Odd row S/H bank component 629 similarly includes reset-state capacitive elements, $Cr_{2a}$ and $Cr_{2b}$, and corresponding switch elements controlled by $SHR_{2a}$ and $SHR_{2b}$, respectively, and a signal-state capacitive element, $Cs_2$, and corresponding switch element controlled by $SHS_2$. As explained above, by providing separate reset-state capacitive elements within each conditional read S/H bank, it becomes possible to extend the interval for which a given reset-state sample is held (maintained) beyond two row intervals, and thus enabling pixel state assessment, conditional read/reset and selective ADC operations to be pipelined. FIG. 14 illustrates an exemplary sample and hold pipeline corresponding generally to the S/H bank usage intervals within the timing arrangement of FIG. 12A.

In an alternate embodiment (not illustrated) to FIG. 13, each per-column S/H bank includes a third Conditional Read Bank 3, and the three banks are alternated in a pipeline sequence similar to FIG. 14. Each of the three conditional read banks in this embodiment, however, only include one reset-state capacitive element. Thus the total number of switches and capacitive elements (6) needed for pipelined conditional read operations is the same as FIG. 13, although at least some aspects of operation may be simplified by this alternate arrangement.

FIG. 15 illustrates embodiments of a reference multiplexer 647, comparator input multiplexer 649 and comparator 651 that may be used to implement like-named components depicted in FIG. 10. In the embodiment shown, reference multiplexer 647 sequences through selection of three threshold references, including the eclipse, conditional-read and saturation thresholds discussed above (ThreshE, ThreshR, ThreshS). As mentioned, additional thresholds may be provided and selected to account for variation in programmable gain, reset threshold and so forth (e.g., from subframe to subframe and/or according to imaging settings). The comparator input multiplexer 649 includes a reset-state multiplexer 655 and signal-state multiplexer 657, as well as a single-ended/differential multiplexer 659 that enables selection between single-ended and differential outputs, the latter (i.e., difference between signal-state and reference-state selections) being generated by difference circuit 658.

In one embodiment, the eclipse evaluation is carried out by supplying $Cr_{comp}$ (i.e., the reset-state stored on capacitive element $Cr_{comp}$ within the eclipse/Vt S/H bank) in single-ended form to comparator 651 for comparison with ThreshE, and the saturation assessment can be similarly carried out by supplying $Cs_1$ or $Cs_2$ in single-ended form to comparator 651 for comparison with ThreshS. By contrast, conditional-read comparison is effected by selecting the differential between $Cs_{comp}$ and $Cr_{comp}$, and the saturation comparison by selecting the differential between $Cs_1$ and either of $Cr_{1a}$ and $Cr_{1b}$, or $Cs_2$ and either of $Cr_{2a}$ and $Cr_{2b}$. In alternative embodiments, any of the single-ended comparisons may be differential and vice-versa, in some cases simplifying the comparator input multiplexer circuitry (e.g., if no single-ended signals need be forwarded to comparator 651).

FIG. 16 illustrates embodiments of a column-shared programmable gain amplifier 685 and K:1 ADC input multiplexer 437 that may be deployed within the embodiment of FIG. 10. The ADC input mux includes a column multiplexer 669 and a set of K source-select multiplexers 667 (each including reset-state mux 671 and signal-state mux 673) that cooperate to enable column-by-column delivery of one of four signal-state/reset-state signal pairs ($Cs_1/Cr_{1a}$, $Cs_1/Cr_{1b}$, $Cs_2/Cr_{2a}$ or $Cs_2/Cr_{2b}$) to the differential input of programmable-gain amplifier 685. By this arrangement, after read-enable bits have been recorded to reflect the pixel state assessment for each of K columns, the source-select multiplexer can be set to select an even row or odd row input signal pair (e.g., alternating between $Cs_1/Cr_{1a}$ and $Cs_1/Cr_{1b}$ for every other even pixel row, and alternating between $Cs_2/Cr_{2a}$ and $Cs_2/Cr_{2b}$ for every other odd pixel row) and the K:1 column mux may be sequenced through the input sources from 0 to K−1 to support selective ADC operation.

In the embodiment shown, programmable gain amplifier 685 includes multiple stages of capacitively coupled differential amplifiers 693, each of which applies a programmable gain according to the ratio of an input capacitance 689 and feedback-coupled variable capacitance 691. In one implementation, shown in detail view 692, variable capacitance element 691 is implemented by switchably coupling a variable number of capacitive elements 699 in parallel with a minimum capacitance 697 in accordance with a program setting. In one embodiment, switchably coupled capacitive elements 699 are binary-weighted (capacitances=x, 2x, 4x, 8x, etc.) to enable $2^R$ different capacitance settings in accordance with an R-bit control value. Alternatively, capacitive elements 699 may be thermometer coded, have matching capacitances or any other arrangement that allows programmable gain amplifier to meet a desired amplification range and resolution. Also, the programmable gain amplifier may be disabled by opening gain-stage switch elements 687 in response to deassertion of a PGA enable signal (e.g., signal equivalent to or derived from the RE bits recorded within line memory 420 and supplied via multiplexing element 476 of FIG. 10). Also, any of the gain stages (only two of which are shown) may be bypassed according to programmed gain settings to further extend the amplification range of programmable gain amplifier 685. Note that various other programmable gain amplifier implementations may be used in alternative embodiments, including PGA implementations that are enabled and disabled per the RE flag bit to save power.

FIG. 17A illustrates embodiments of a read-enable multiplexer 711, ADC-enable logic 713 and ADC circuit 715 that may be used to implement the K:1 read-enable multiplexer and ADC circuitry of FIG. 10. As shown, read-enable multiplexer 711 is coupled to receive read-enable bits from each of K storage locations within primary line memory 421 (i.e., each location corresponding to a respective pixel column) and iteratively sequences through those locations to supply the read-enable bits, one after another, to the input of ADC-enable logic 713 (i.e., an AND logic gate in the embodiment shown) and also to the column-shared PGA (where they may serve as or enable generation of the PGA-enable signal described above). Referring to FIGS. 17A and 17B, a convert signal ("Convert") is cycled K times per pixel row to advance the read-enable bit selection (e.g., by incrementing a counter that controls the read-enable multiplexer selection), with the selected read-enable bit gating application of the convert signal to an enable input of ADC circuit 715. By this operation, the high-state of the convert signal either passes through or is blocked by logic gate 713 according to the state of the RE bit for that cycle of the convert signal, thereby either enabling or disabling operation of the PGA and ADC circuit according to the state of the RE bit. The ADC result for each read-enabled pixel column is stored within primary line memory buffer 421 for eventual output to the VLL circuitry and PHY. Though not specifically shown, a set of "store" strobes that enable the output of ADC 715 to be loaded into respective line memory buffer locations may be asserted in succession to enable successive (and selective) loading of ADC results into primary line memory buffer 421. Alternatively, the ADC results may be loaded into a shift register and then transferred in parallel to the line memory buffer, masking or otherwise preventing buffer load operations for those pixel columns in which the RE bit is not set.

Read-Out Dilation

When a color filter array is applied in connection with the conditional read/reset image sensors described above, image distortion may occur when a moving object triggers color-differentiated sampling operations—conditional read/reset operations in a given subframe within pixels for some colors, but not for adjacent pixels of other colors. For example, a moving object that triggers read-out operations in green pixels (i.e., pixels that receive light predominantly in the green wavelength band), but not adjacent red or blue pixels, may trigger relatively rapid read/reset operations within the green pixels while the blue and red pixels are infrequently read (or read on different subframes than the adjacent green pixels), thus producing artifacts in the finalized image. In a number of embodiments, such color artifacts are mitigated by modifying the conditional read/reset determination for a given pixel to account for the read/reset assessment for one or more neighboring pixels, in effect, expanding the number of pixels to be read/reset in response to an overthreshold determination with respect to a given pixel; an approach referred to herein as "read-out dilation" or "read dilation."

Figure 18:
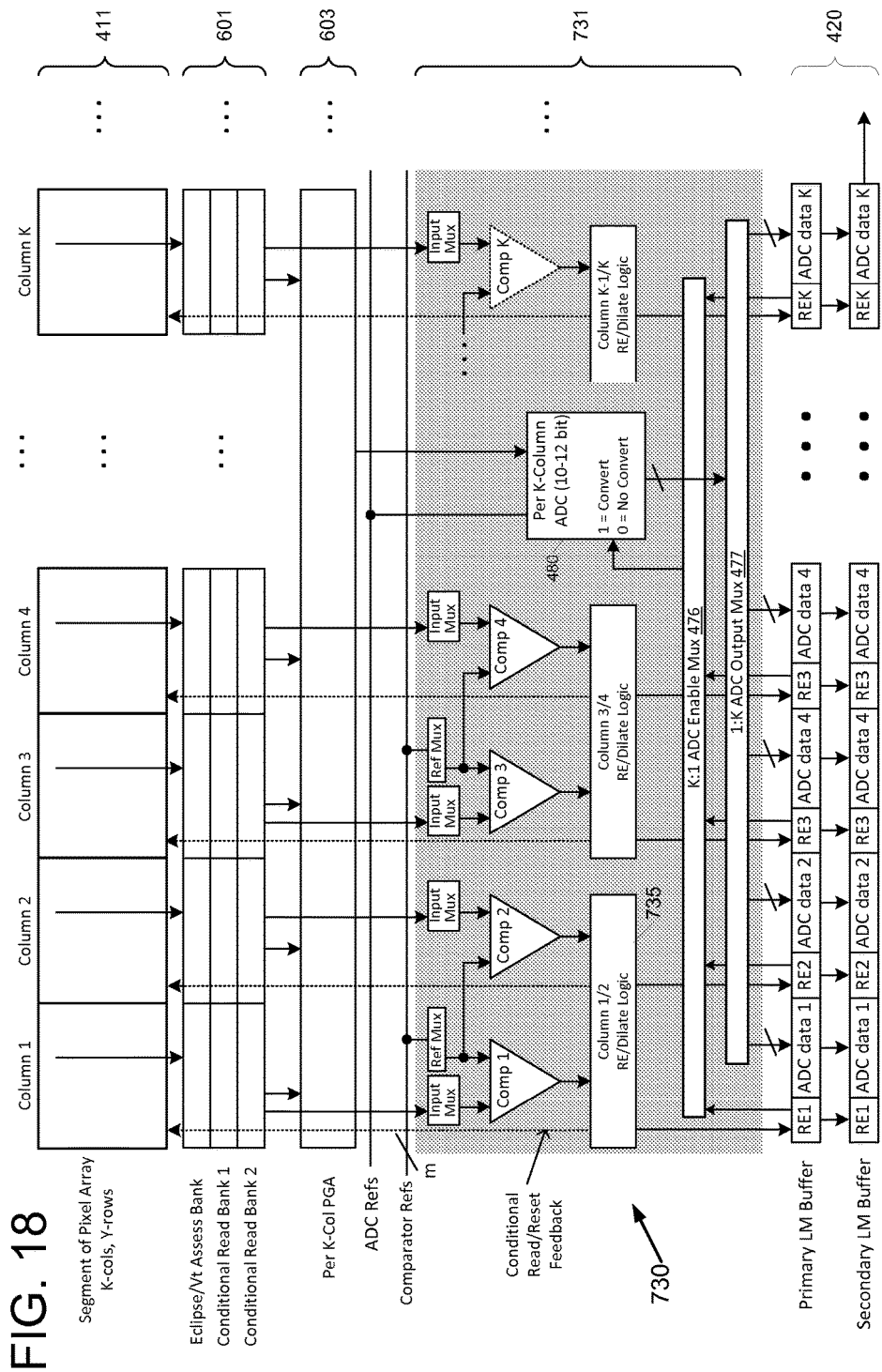
FIG. 18 illustrates an exemplary K-column section of an image sensor having logic to carry out read-dilation operations.

FIG. 18 illustrates an exemplary K-column section of an image sensor 730 having logic to carry out read-dilation operations. In the arrangement shown, the pixel array 411, multi-bank sample-and-hold circuitry 601, column-shared PGA 603, column-shared ADC circuitry 480, multiplexing circuits 476 and 477, and line memory buffers 420 are implemented generally as described in reference to FIGS. 10-17. Comparator circuitry 731 is also implemented generally as described in reference to FIG. 44, except that the per-column read-enable logic (element 475 of FIG. 10) is replaced by multi-column read-enable/dilation logic 735 coupled to receive the output of the comparators for multiple adjacent columns corresponding to pixels within the same read kernel (two adjacent columns and thus columns ½, ¾, . . . , K−1/K, in the embodiment shown). By this arrangement, the read-enable bit determination for a given pixel may be based on the pixel assessment results and corresponding row flags for multiple column-adjacent and row-adjacent pixels.

In embodiments that allow interleaved operation between two or more subexposures, RE/Dilate Logic 735 is designed to save dilation state when switching row context from one subexposure to another. For instance, if four subexposure scans are interleaved, logic 735 retains four separate dilation states. When dilation state for a row x is complete, it is retained in an indexed set of registers while, e.g., dilation state for up to three unrelated rows is accessed for the next three row operations. On the fourth successive row operation, which visits row (x+1), the row x state is referenced to determine whether dilation requires pixel reads due to overthreshold state at row x.

Dilation may be neither necessary nor desirable in all modes of operation. Thus preferably, logic 735 has at least one dilate mode and at least one non-dilate mode (where every pixel is evaluated for readout completely independent of surrounding pixels). In some embodiments, dilation can also be activated on a subframe basis. For instance, only the longest subexposure(s) may use dilation, as that is where motion artifacts would be more apparent and/or problematic. Dilation logic 735 would in such case, when interleaving is used, allow state storage for each subexposure that indicates whether or not dilation applies each time a row is visited for that subexposure.

Subframe-Interleaved Read-Out

Figure 19:
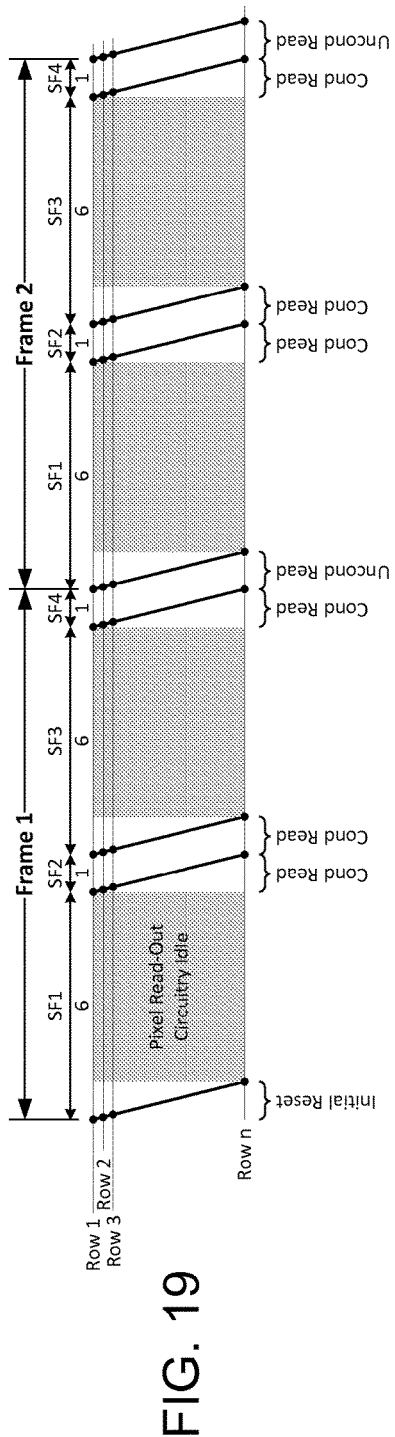
FIG. 19 illustrates an exemplary subframe read-out sequence within a conditional read/reset image sensor.

FIGS. 19-24 illustrate exemplary subframe read-out sequences envisioned for conditional-read sensors. It is noted that because such sensors are generally equipped to also perform unconditional reads, one, several, or all of the conditional reads in a given sequence may be equivalently replaced with an unconditional read. In one such mode, longer subframes can be unconditional and shorter subframes (save for a final subframe) may be conditional. FIG. 19 illustrates an exemplary subframe read-out sequence within a conditional read/reset image sensor. In the arrangement shown, four complete subframes, "SF1" through "SF4" are read-out for each complete exposure interval (i.e., four read-outs per image frame and thus an oversampling factor of four), with two of the subframes exhibiting relatively long shutter times (i.e., subframe exposure intervals— time between initial reset and first conditional read-out and thereafter between successive conditional reads or between the last conditional read-out and the unconditional read that marks the overarching frame time) and two exhibiting relatively short exposure intervals. More specifically, each of the long subframes, SF1 and SF3, is six times the duration of either short subframe (SF2 and SF4), thus establishing a 6-1-6-1 subframe duration/subframe read-out pattern.

The shortest-duration subframe in a given read-out pattern is referred to herein as a "unit subframe" or (USF) and, in the embodiment of FIG. 19 at least, establishes the rolling shutter interval—the time available for the read-out circuitry to scan through the entire pixel array before returning for a successive read-out within a given pixel row and thus the amount of time available for execution of an individual pixel row read-out (i.e., rolling shutter interval divided by number of pixel rows). As can be seen, because the read-out circuitry is designed to scan the entire pixel array within the unit-subframe interval, the read-out circuitry completes the longer 6-USF subframe read-outs with time to spare and is thus idle for a substantial period of time per image frame as shown by the shaded intervals. While the arrangement shown in FIG. 19 may be suitable for some imaging applications, as the unit subframe shrinks (i.e., ratio of long-to-short subframe durations increased, for example, to improve dynamic range) the corresponding increase in read-out circuitry speed approaches practical limits in terms of power and clock rate, while at the same time increasing the per-frame idle time of the read-out circuitry.

Figure 20:
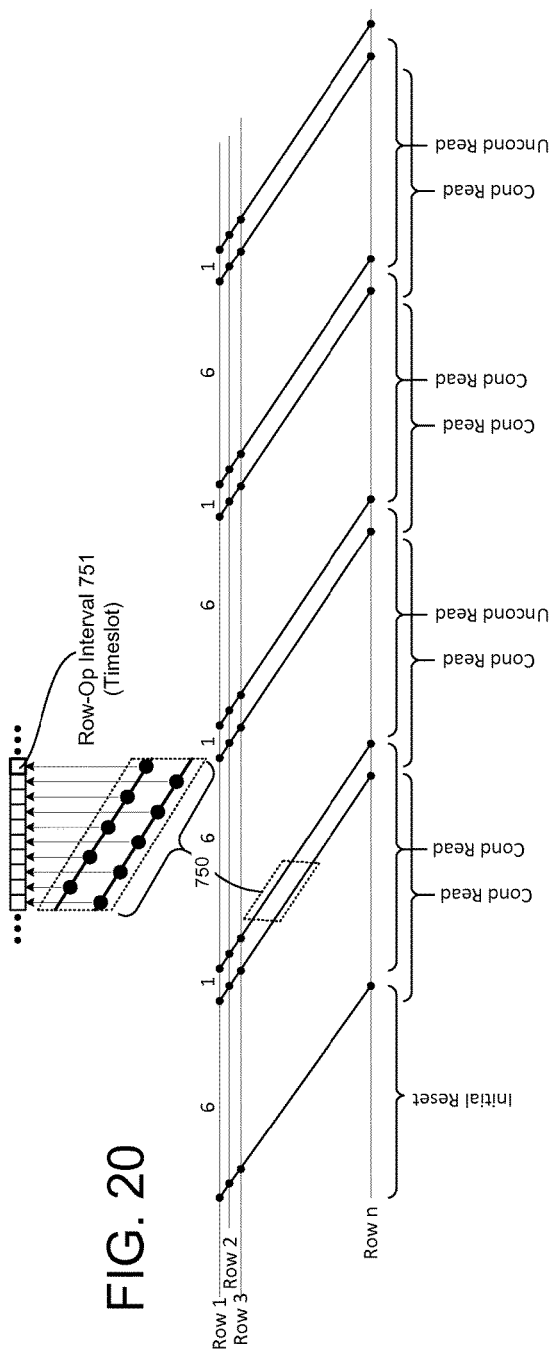
FIG. 20 illustrates an alternative read-out approach that expands the sub-frame read-out time and smooths (balances) resource utilization across the frame interval.

FIG. 20 illustrates an alternative read-out approach that expands the sub-frame read-out time and smooths (balances) resource utilization across the frame interval. More specifically, instead of squeezing the complete sensor read-out into a time corresponding to the shortest-duration subframe (i.e., unit subframe), the read-out interval is expanded to use one-half the frame time to perform two of the four subframe reads required per frame, thereby enabling the pixel read-out circuitry to be operated at a reduced rate (and thus with reduced power consumption and/or with higher resolution) in a continuous or near-continuous fashion, instead of the more bursty (i.e., start/stop) approach shown in FIG. 19.

Still referring to FIG. 20, because the expanded subframe read-out time may, in many cases, exceed the shortest-duration subframe, the sensor architecture is modified to permit interleaved read-out operations with respect to temporally adjacent subframes, alternately reading out pixel row data for two or more subframes so that the subframe read-out intervals overlap in time. In the 6-1-6-1 subframe sequence shown, for example, pixel read-out operations alternate between a 6-USF subframe and ensuing unit subframe as shown in detail view 750, thus effecting a concurrent read-out of a two-subframe group.

Continuing with FIG. 20, in a number of embodiments, the frame interval is subdivided into uniform row-operation intervals or row "timeslots" 751 approximately according to the total number of rows in the image sensor and the oversampling factor (i.e., number of subframes) with the timeslots allocated to subframe read-out operations in accordance with a selected subframe pattern. In one implementation, for example, row logic is provided to sequence through row addresses in accordance with a programmed or otherwise selected subframe pattern, thereby initiating a row operation in connection with a subframe read-out during each successive timeslot. As explained below, in some cases one or more timeslots may be allocated to "dummy rows" and thus be unused to establish a repeating, deterministic timeslot utilization pattern across subframes and groups of concurrently read-out subframes. Also, to avoid scheduling conflicts, a subframe read-out sequence may be shifted by one or more timeslots in a manner that causes the actual subframe duration to deviate slightly from the nominal (i.e., ideal or desired) subframe duration.

Figure 21:
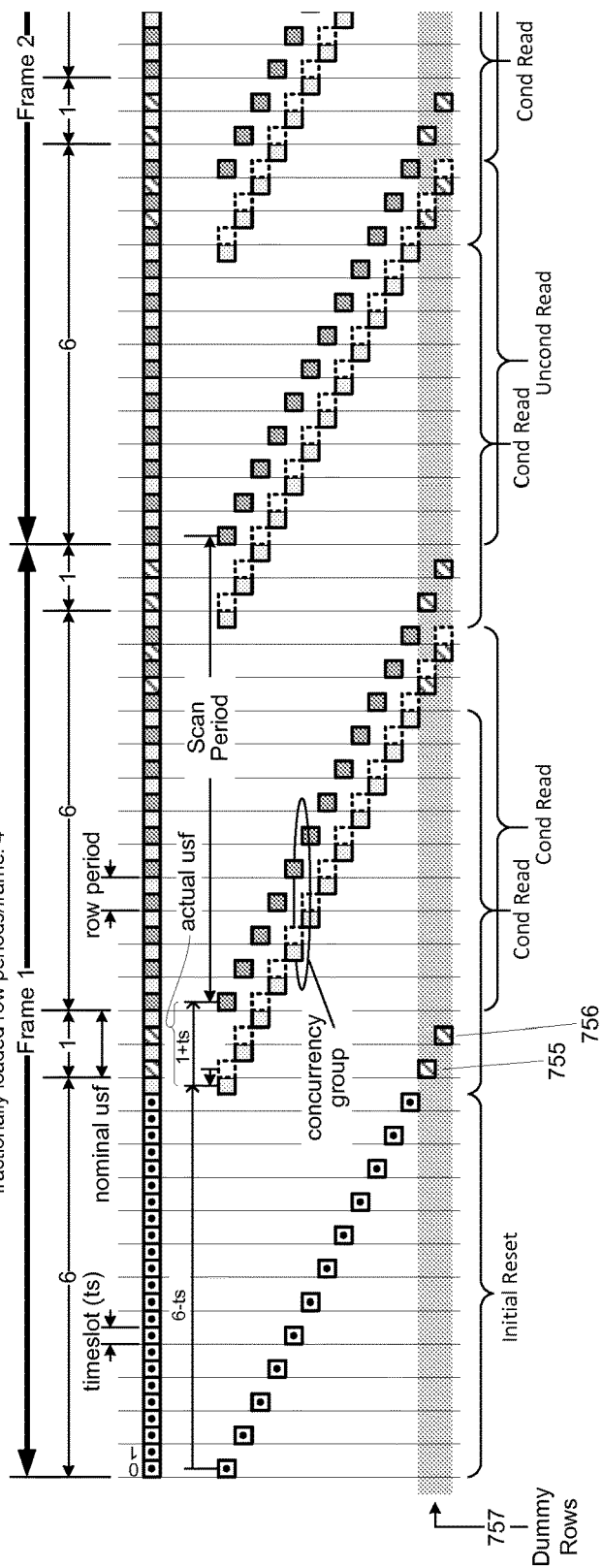
FIG. 21 illustrates an exemplary 6-1-6-1 subframe read-out in greater detail, showing timeslot utilization within an image sensor embodiment having a 12-row pixel array.

FIG. 21 illustrates an exemplary 6-1-6-1 subframe read-out in greater detail, showing timeslot utilization within an image sensor embodiment having a 12-row pixel array. In actual embodiments, the image sensor will generally have several thousand (or more) pixel rows, but will operate on similar principles. For purposes of explanation, image frame 1 ("Frame 1") is assumed to begin with an initial reset of the image sensor, while pixel reset is effected automatically for subsequent frames by an unconditional subframe read-out that concludes the preceding frame. As shown, the overall frame interval (or total exposure interval) spans a total of fourteen unit subframes (i.e., per the 6-1-6-1 subframe durations) with each long (6 USF) and short (1 USF) subframe pair being read-out concurrently over a respective half-frame interval. Thus, the total scan period (or scan duration) for a given subframe is seven unit-subframes (i.e., total USFs per frame (14) divided by number of grouped-subframe read-outs (2)), and a total of two dummy rows is assumed so that a virtual two-subframe-readout concurrency is maintained following the initial reset operation. More specifically, to maximize concurrency throughout a given frame interval (and subsequent frame intervals), the total number of row operations per scan period (i.e., timeslots) is set to the scan duration in unit subframes multiplied by the subframe interleave depth (or pipeline depth, which corresponds to the number of concurrently read-out subframes) or, in this case, 7*2=14. Unused timeslots that result when the quantity of available timeslots exceeds the number required to read-out a given subframe (i.e., as in the two such timeslots 755 and 756 shown in this example) are referred to herein as empty timeslots and may be viewed from the perspective of the row sequencing logic as being allocated to dummy rows 757.

Continuing with FIG. 21, the time interval between successive read-out operations within the same subframe is referred to herein as the "row period" and the number of time slots per row period corresponds to the interleave depth or pipeline depth of the subframe read-out sequence. The product of the pipeline depth and concurrency-group count (i.e., number of instances of concurrent-subframe read-outs) defines the number of timeslots per unit subframe (2×2=4 in this example) and the read-group count also defines the number of row periods per unit subframe (i.e., 2 row periods per unit subframe in this example). Row periods in which less than all available timeslots are allocated to row operations are referred to as fractionally loaded row periods, and those in which no row operations are performed are referred to as empty row periods. In the 6-1-6-1 example shown, there are two fractionally loaded row periods per concurrent subframe read-out and thus four fractionally loaded row periods per frame. As explained below, empty row periods are generally employed to shrink the duration of a subframe below the available time for light collection and thus correspond to unused light-collection time ("dead time" within the pixel array. There is no dead time in the exemplary 6-1-6-1 subframe sequence.

Still referring to FIG. 21, assuming that a uniform exposure period is to apply for each pixel row read-out in a given subframe, the division of each row interval into two timeslots (designated '0' and '1', respectively, as shown in the first row period) dictates that the even and odd time slots will be allocated respective subframe read-out operations during a given scan period. Consequently, where the total number of timeslots per scan period is even, it is necessary to shift every other subframe read-out operation from its natural position within an even timeslot to an adjacent odd timeslot as shown by the dashed boxes within the first subframe read-out. That is, instead of conducting the first subframe read-out at the ideal time indicated by the dashed-box timeslots, the first subframe read-out is advanced by one timeslot to effect an odd-timeslot read-out and thus avoid conflict with the ensuing read-out of the second subframe during even-numbered time-slots. One consequence of this time shift is that the actual unit subframe (i.e., duration of the shortest subframe) is lengthened by one time slot relative to the nominal or ideal unit subframe duration and the counterpart long subframe is shortened by one timeslot (note that the timeslot shift may involve a one-timeslot delay of the first subframe read-out instead of the timeslot advance shown). In general this non-ideality is a negligible consequence of the finite timeslot granularity, particularly in view of the relatively large number of rows in production embodiments. For example, in a 3000 row sensor having 3 dummy rows (i.e., for reasons explained above) and a 1/30 second frame interval, 6006 time slots (3003 row periods) transpire per scan period, with 858 of those timeslots (6006*2/14) ideally allocated to the x1 (unit) subframe and 5148 (6006*12/14) allocated to the x6 subframe. In that case, shortening the actual unit subframe duration by one timeslot represents a 0.1% deviation from the nominal unit subframe duration and thus an inconsequential difference between nominal and actual unit subframe durations, particularly as the ratio of subframe exposure intervals themselves tend to be flexible design choices. In any case, it should be kept in mind that the nominal and actual unit subframe durations may vary, and more care may be needed for short frame intervals in the 100ths or 1000ths of a second in duration.

Figure 22A:
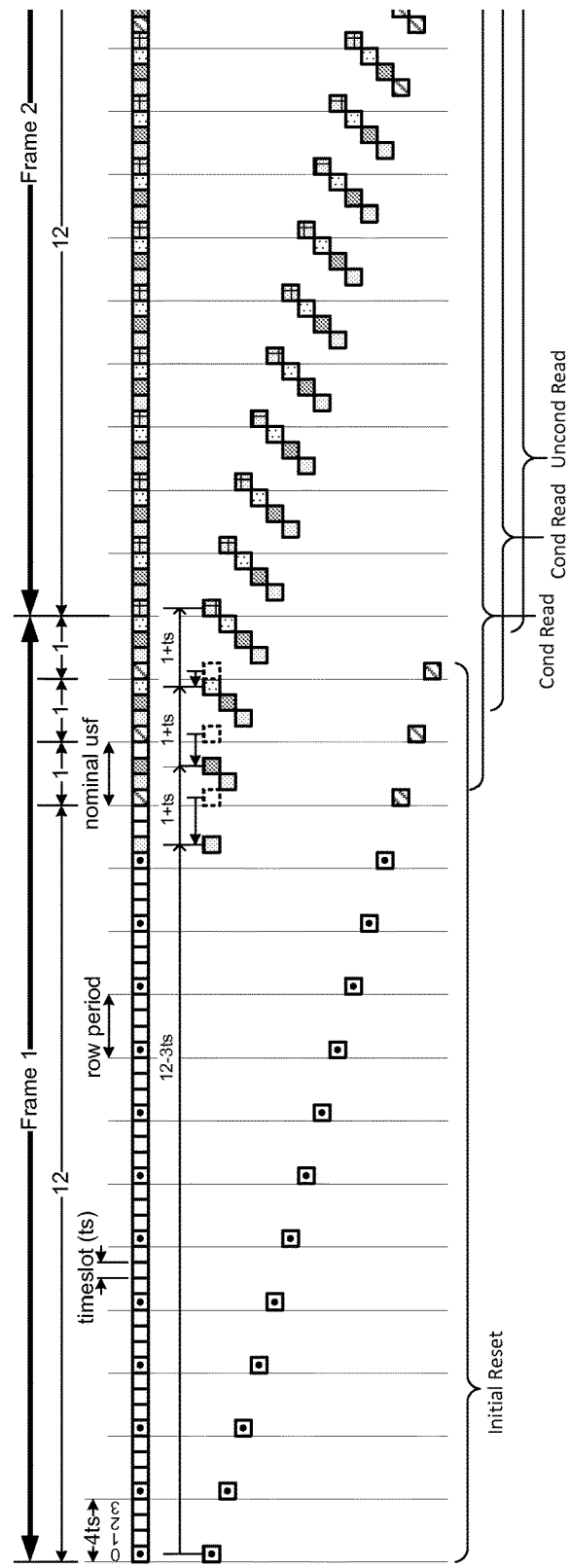
FIG. 22A illustrates an alternative subframe sequence in which a relatively long subframe is followed by a sequence of three relatively short subframes in a 12-1-1-1 pattern

FIG. 22A illustrates an alternative subframe sequence in which a relatively long (12 USF) subframe is followed by a sequence of three unit subframes in a 12-1-1-1 pattern. In this case all four subframes are read out concurrently (i.e., there is only one concurrency group which spans an entire frame interval) so that the pipeline depth and number of timeslots per unit subframe is four. The row period is coextensive with the nominal unit subframe duration by virtue of the solitary read-group. As shown, each of the sub-frame read-outs is shifted to a respective one of the four timeslots per row period, thus effecting an actual unit subframe slightly longer than ideal (1+ts) and a longer subframe slightly shorter than ideal (12-3 ts). A total of three dummy rows is assumed by the row sequencing logic (i.e., to establish the number of unit subframes per scan period as an integer number of the row count and thus maximize concurrency as successive image frames are read-out) and thus three fractionally-loaded row periods per frame. There is no dead time in the 12-1-1-1 subframe sequence and thus no empty row periods.

An alternative to adding dummy rows to an interleaved frame sequence and shifting the subframe times away from nominal to remove timing conflicts is to enforce a group of timing constraints on the frame sequence, and then start each subframe in video at the same offset from each frame start. Although the mathematical constraints depend on the specific sequence and number of subframes, an example for "AB-B-B-B" frame sequencing is instructive and similar constraints can be developed for other sequencing families.

Consider the following "AB-B-B-B" timing constraints. $N_{rows}$, numbered 0 to $N_{rows}-1$, are to be sampled four times per frame each, thus a number of timeslots per frame T must be greater than or equal to 4 $N_{rows}$ for a sustained video sequence. For four subframes per frame, this method also requires that T be divisible by 4. Now select exposure parameters A and B in units of timeslots, where: $T>=(A+3)*B$; B is an odd positive integer (although 1 may not be possible for pipelined readout that takes more than one timeslot); A is an integer that expresses the ratio of the long subexposure duration to the short subexposure durations. Given these parameters, for any row k its assigned timeslots are:

Initial Reset, row k: T-1-(A+3)*B+4k
First conditional read, row k: T-1-3B+4k
Second conditional read, row k: T-1-2B+4k
Third conditional read, row k: T-1-B+4k
Fourth, unconditional read, row k: T-1+4k It is also noted that for the case where T=4 $N_{rows}$=(A+3)*B, each row integrates light for an entire frame and the unconditional read of each frame also accomplishes the unconditional reset of the following frame, and thus no separate explicit resets are required for continuous video operation. If A+3 is not divisible by four, explicit resets can still remain unscheduled by selecting B to get as close to 4 $N_{rows}$ as possible without exceeding, in which case the long subframe will be a few timeslots longer than a perfect A:1 ratio would specify.

FIG. 22B illustrates an A=13, 13-1-1-1 subframe read-out sequence designed according to this methodology. For 20 rows and 80 timeslots, selecting B=5 gives a full-frame integration time for each row with timing of 65-5-5-5. For a real-world example such as a sensor with 3016 rows and 12064 timeslots/frame, selecting B=754 would give a full-frame integration time for each row with timing of 9802-754-754-754, but B is not odd and thus timeslot conflicts would arise. Thus the best "legal" full-frame integration schedule for this sensor would be 9805-753-753-753, which relates to an actual A of 13.02. Alternately, to keep A at exactly 13, one can select a 9789-753-753-753 sequence with explicit resets at timeslot 15 for the first row (and so on) of each frame.

Figure 22C:
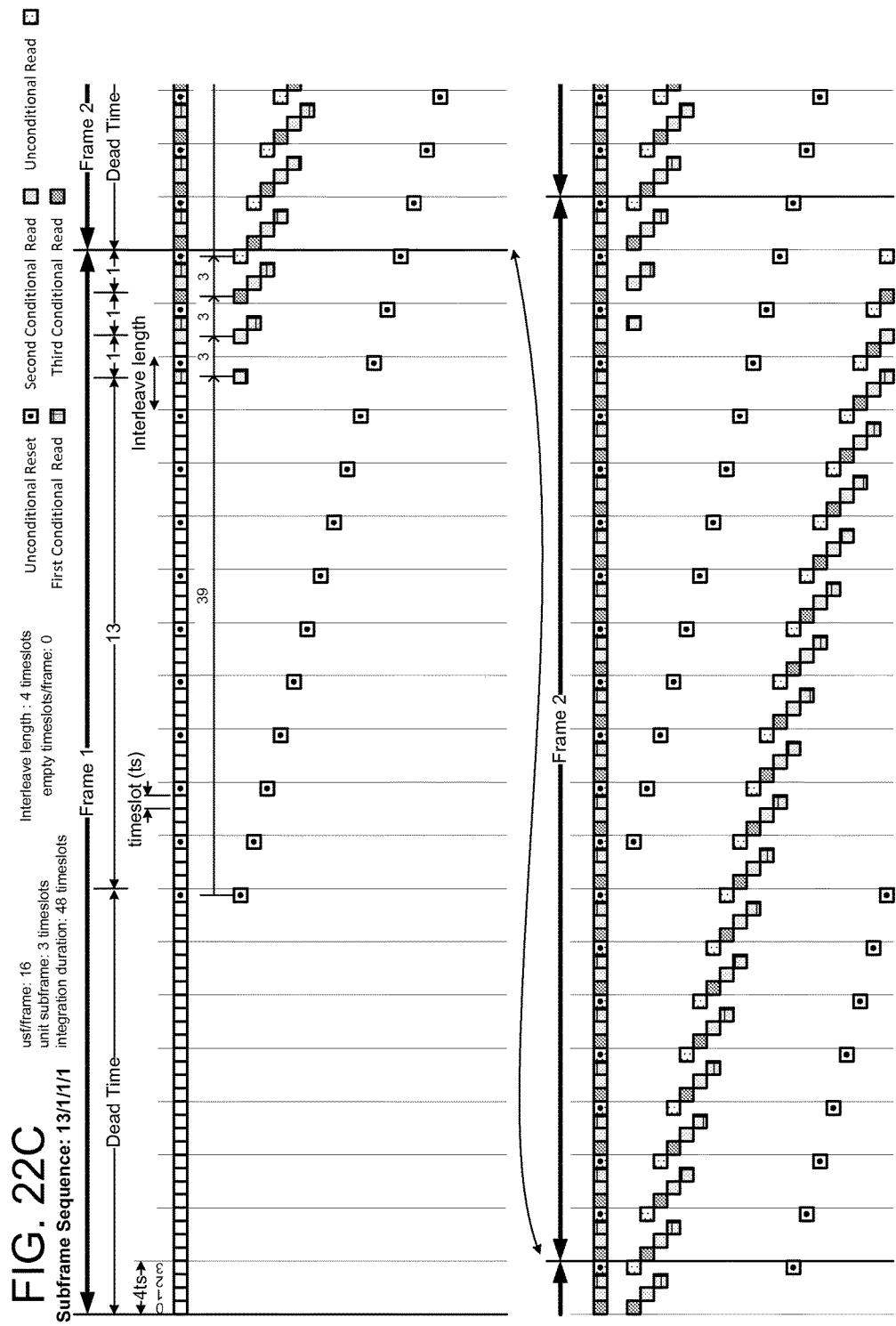
FIG. 22C illustrates an A=39, B=3, 39-3-3-3 subframe read-out sequence designed according to the alternative timing enforcement approach.

For exposures that are shorter than a full frame time, the methodology can also give a schedule that utilizes all timeslots. FIG. 22C illustrates another A=13, 13-1-1-1 subframe read-out sequence for 20 rows and 80 timeslots. In FIG. 22C, however, B=3 is selected to give a shorter exposure, and each row has a timing of 39-3-3-3. Since a reset occurs at timeslot 31 for row 0, dead time occupies 40% of each frame. In the 3016 row sensor example, 375 possible sequences exist for the odd B values from B=753 down to B=3. For B=753 equating to an exposure time of $1/30^{th}$ of a second, B=3 equates to an exposure time of $1/7530^{th}$ of a second, thus the configurable 13-1-1-1 policies range across 9 stops of exposure range.

Using the same methodology, FIG. 22D shows another scheduling solution for 20 rows and 80 timeslots, this time for A=5 and a 5-1-1-1 policy. In this case, the longest 5-1-1-1 policy attainable within 80 timeslots is 45-9-9-9 with B=9, occupying a 72 out of 80 timeslot integration time, for 90% light collection. In the 3016 row sensor example, an equivalent policy would be 7535-1507-1507-1507, with 99.93% light collection, or 7543-1507-1507-1507, with 100% light collection and an actual A value of 5.005.

From these examples, it is apparent that other similar interleaved policy solutions are also possible, e.g., with AB-B-B policies or AB-B policies with different response curves. These examples thus show that with a large number of rows and careful selection, a large family of interleaved subexposure policies exist that fully utilize the timeslots available and allow a large range of exposure and/or dynamic range options.

Figure 23:
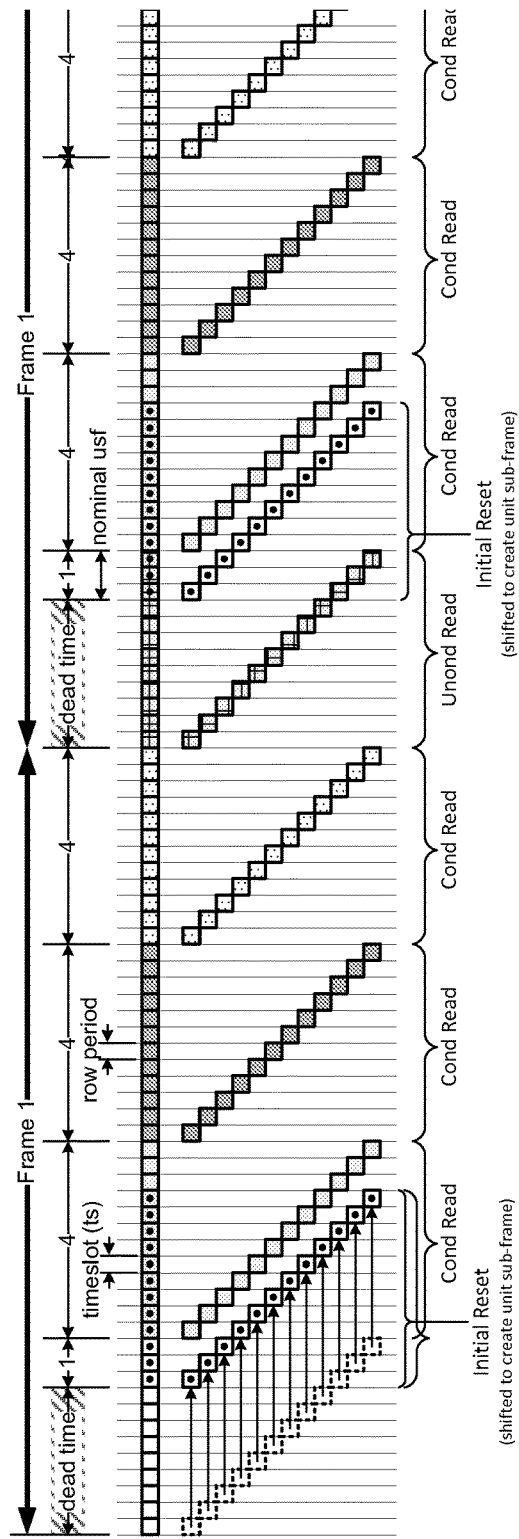
FIG. 23 illustrates a 1-4-4-4 subframe read-out sequence that, at least in terms of subframe read-out concurrency, represents the inverse of the 12-1-1-1 subframe sequence of FIG. 22A.

FIG. 23 illustrates a 1-4-4-4 subframe read-out sequence that, at least in terms of subframe read-out concurrency, represents the inverse of the 12-1-1-1 subframe sequence of FIG. 22A. More specifically, while all four subframes are read-out concurrently in the 12-1-1-1 sequence and the total subframe scan duration spans the entire frame interval, no subframe read-out concurrency occurs in the 1-4-4-4 sequence and the scan duration is one-fourth of the overall frame interval—the fastest possible scan duration in a four-subframe sequence in which the number of timeslots per frame is limited to the total number of pixel row read-out operations required (i.e., 4*12=48 timeslots in this example). As shown, no dummy rows (and thus no fractionally-loaded row periods) are required as the scan duration in unit subframes (4) is an integer multiple of the physical row count (12). Three row periods transpire per unit subframe—the ratio of the row count to the subframe scan period.

Still referring to FIG. 23, the shortest subframe (i.e., the unit subframe) is effected by creating dead time within what would otherwise be a 4-USF subframe. That is, instead of executing pixel reset operations at the start of the frame interval at the dashed-box timeslots shown, the reset operations are delayed by three of the four allocated unit subframes, thus effecting a one USF subframe interval. Note that pixel reset operations (denoted by center-dotted timeslots) are executed concurrently with read-out of the first subframe with read-out and reset operations being executed in the same timeslot with a three row lag (i.e., reading the first pixel row and resetting the third pixel row reset in the same timeslot, reading the second pixel row and resetting the fourth pixel row in the same timeslot, and so forth). In general, explicit reset operations and unconditional or conditional read-out operations within respective rows may be executed in the same timeslot without conflict as no data is transferred to the column output line (i.e., "data out" line) during reset operations. For described embodiments with a conditional read operation having an unconditional partial charge transfer operation applied to all columns, the parallel unconditional reset operation in a second row can be piggybacked on the unconditional partial charge transfer operation. Note that pixel reset operations are distinguished in this context from conditional read/reset operations with the latter outputting one or more pixel state signals onto the column output line.

Figure 24:
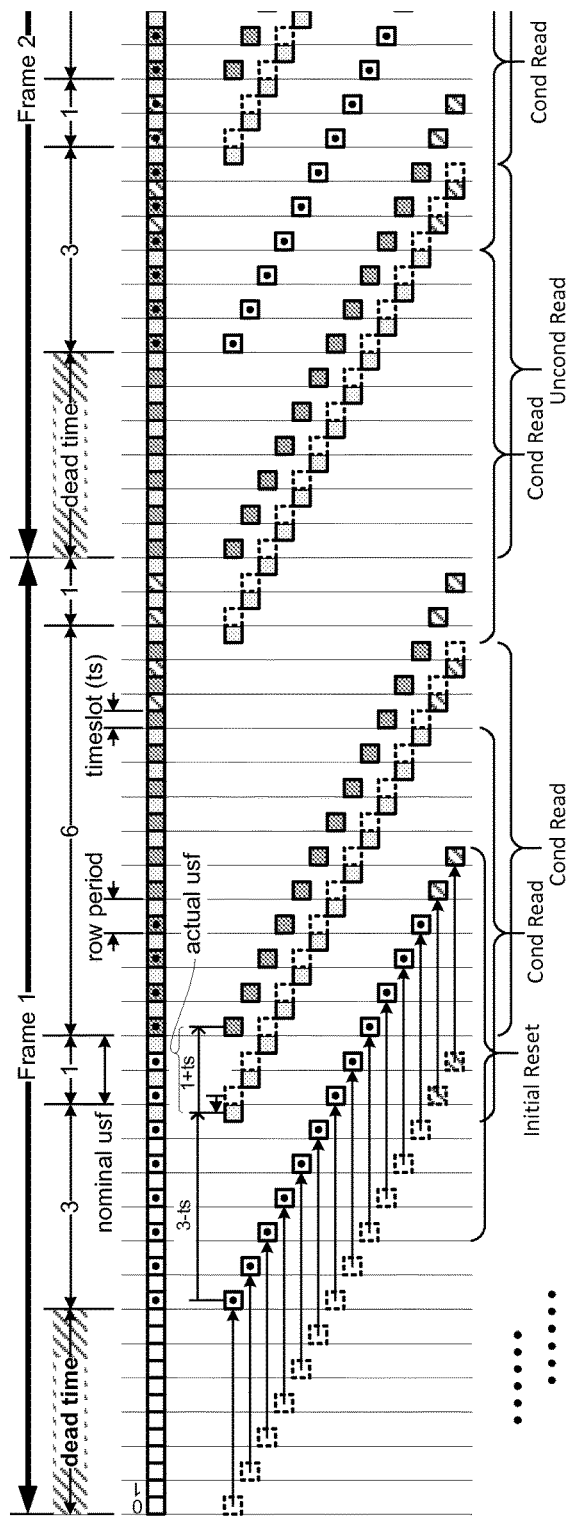
FIG. 24 illustrates another dead-time subframe read-out sequence, in this case having a 3-1-6-1 pattern.

FIG. 24 illustrates another dead-time subframe read-out sequence, in this case having a 3-1-6-1 pattern. As can be appreciated by comparing FIGS. 24 and 21, the 3-1-6-1 subframe sequence is similar to the 6-1-6-1 subframe sequence (i.e., same USF/frame count, subframe scan period, row period, pipeline depth, and fractionally loaded row periods) but with dead-time added to create the initial 3-USF subframe. That is, the initial reset operation (and reset operations that follow unconditional read-out operations thereafter) is delayed by three unit subframes (six row periods and thus 12 timeslots) to shorten the initial 6-USF interval to a 3-USF subframe.

Figure 25B:
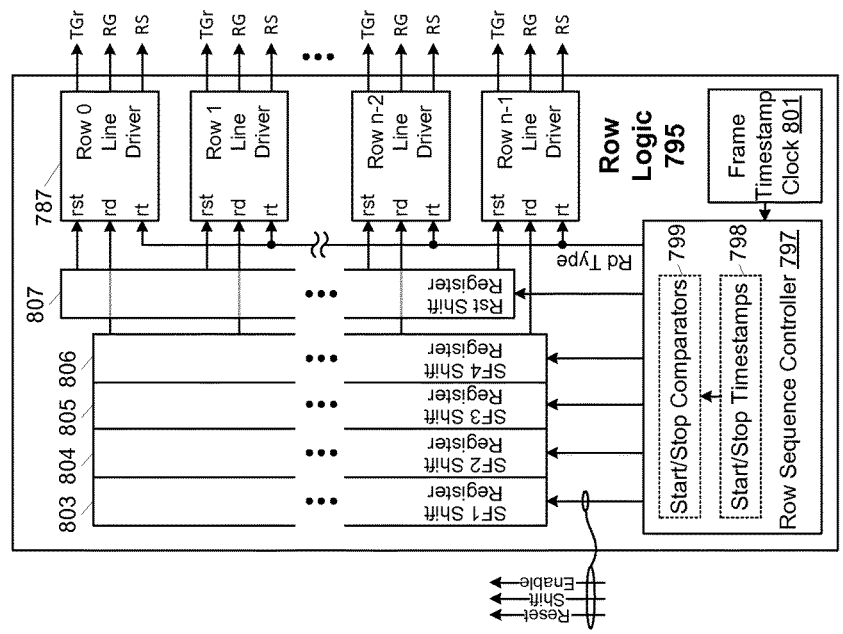
FIG. 25B illustrates another embodiment of a row logic circuit that may be used to establish a wide variety of subframe sequences including, without limitation, those depicted in FIGS. 21-24.
Figure 25A:
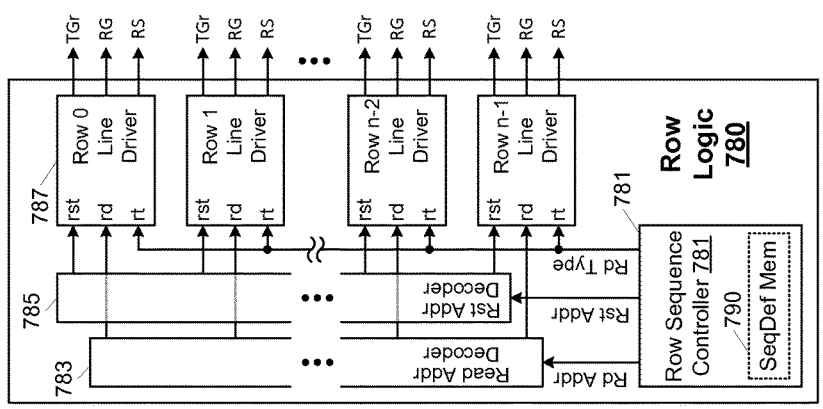
FIG. 25A illustrates an embodiment of a row logic circuit that may be used to establish a wide variety of run-time and/or production-time selectable subframe sequences including, without limitation, those depicted in FIGS. 21-24.

FIG. 25A illustrates an embodiment of a row logic circuit 780 that may be used to establish a wide variety of run-time and/or production-time selectable subframe sequences including, without limitation, those depicted in FIGS. 21-24. As shown, row logic 780 includes a row sequence controller 781, read-address decoder 783, reset-address decoder 785, and a set of n row line drivers 787, one for each row of pixels or pixel groups in the pixel array. In one embodiment, row sequence controller 781 includes a sequence definition memory 790 that has been pre-loaded or programmed at run-time with address sequencing information including, for example, tabulated address values and/or information that enables algorithmic generation of addresses. Logic circuitry with the row sequence controller applies the contents of the sequence definition memory to generate, during each of a fixed or programmably controlled number of timeslots per frame interval, a read address value (Rd Addr), reset address value (Rst Addr) and read type (Rd Type). In one embodiment, for example, for each time slot in which a read-out operation is to be executed with respect to a given pixel row, row sequence controller 781 outputs a read address corresponding to that pixel row and a read-type signal that indicates whether a conditional or unconditional read is to be executed, the latter being supplied in common to read-type inputs ("rt") of individual line row line drivers 787. As shown, the read address is supplied to read address decoder 783, which performs a decoding operation to assert a read-enable signal to the read input ("rd") of the address-specified one of row line drivers 787, thereby enabling a conditional or unconditional read operation to be carried out by that row line driver (and thus with regard to a specified pixel row), in accordance with the read-type signal from the row sequence controller.

To suppress read-enable assertion (i.e., during a timeslot in which no read-out is to be performed as in the case of a timeslot corresponding to a dummy row or that occurs during a dead-time interval), the row sequence controller may output a reserved "no-op" address value, or may output a dedicated control signal to suppress/enable row read-out operations (not specifically shown). Note that, in the case of bin-enabled pixel groups, each row line driver 787 may output multiple TGr signals (e.g., TGr1-TGr4 for the 4×1 quad pixel group discussed above) in which case row address decoder 783 may output multiple read-enable signals to enable any one or more of the TGr signals to be asserted, thus enabling either un-binned or binned read-outs in accordance with mode control signals from other logic circuitry within the image sensor.

Still referring to FIG. 25A, reset operations are controlled (sequenced) in generally the same manner as read-out operations, with row sequence controller 781 outputting a valid reset address to reset address decoder 785 during each timeslot in which a reset operation is to be performed (which, as discussed above, may also be a timeslot in which a read-out operation is to be performed), and either a dedicated control signal (e.g., a "reset-enable" signal, not shown) or a reserved, not-to-be-decoded reset address value to indicate timeslots in which no reset operation is to be performed Like read address decoder 783, reset address decoder 785 decodes incoming reset address values (i.e., those other than reserved address values or those accompanied by an asserted reset-enable signal) to assert a reset signal at the input of a reset-address-specified one of row line drivers 787.

In general, each row line driver 787 responds to incoming reset-enable, read-enable and read-type signals by raising RG, RS and one or more TGr signals in accordance with the read-out and reset sequences described above. Though not specifically shown, additional control signals may be provided row line drivers 787 to enable selection between different TGr potentials (e.g., $VTG_{partial}$, $VTG_{full}$ as shown in FIGS. 2 and 18A) and/or pulse widths during the threshold-testing (partial-read) and conditional read-out phases of a conditional read/reset operation.

Though not specifically shown in FIG. 25A, row sequence controller 781 may receive a row clock signal (e.g., from read-out control circuitry or other control logic) that defines, by itself or in combination with one or more programmed settings, the above-described timeslots in which row operations are carried out. For example, in one embodiment, the row clock signal period (which itself may be programmable within other image-sensor logic circuitry) defines the timeslot duration, with each rising and/or falling clock edge marking the start of a new timeslot. In another embodiment, the row clock signal may oscillate at a sufficiently high frequency to enable a programmable-counter-defined timeslot interval, thus enabling a given frame interval (e.g., $1/30^{th}$ second) to be divided into a programmable number of timeslots. For example, a counter circuit may be programmed with a terminal count value (or initial starting value in a down-count implementation) that yields a terminal-count "timeslot" pulse at desired intervals (e.g., in accordance with the number of physical rows, dummy rows, frame interval, subframe count, etc.), thereby establishing a programmable timeslot according to a selected subframe sequence.

FIG. 25B illustrates another embodiment of a row logic circuit 795 that may be used to establish a wide variety of subframe sequences including, without limitation, those depicted in FIGS. 21-24. Instead of address decoders as in the embodiment of FIG. 25A, a shift register bank is used to track row operations. In the particular example shown, for instance, five shift registers, one each for subframes SF1 to SF4 (803, 804, 805 and 806) and one for unconditional row reset (807), are operated by a row sequence controller 797. Each shift register is loaded with one, or possible two (for binning) "1" logic values, which are loaded to a register location corresponding to the top (first) row of the pixel array in response to a reset signal (Reset), with all other register locations loaded with "0" logic values. Upon receiving a shift signal (Shift), a particular register's contents are shifted down by a row. Upon receiving an enable signal (Enable), a particular register drives its contents to the row drivers 787, thus enabling row operations to be carried out within the row driver(s) for the row(s) associated with the shift register "1" location(s). The subframe shift register outputs may be connected in a wired-or configuration, since the row sequence controller will only enable one at a time.

In one embodiment, row sequence controller 797 stores start/stop timestamps within a timestamp storage element 798 for each shift register 803-807 to control the operation of subframe sequencing. A bank of comparators 799 compares the output of a frame timestamp clock 801 to the stored timestamps to properly time each shift register. Additional logic (not shown) defines how many subframes are active, whether reset is active, and the exact timing of enable signal assertion according to timeslot sub-clocking.

Figure 26A:
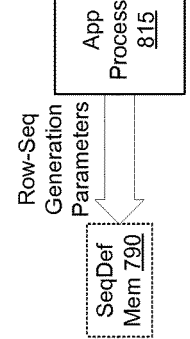
FIGS. 26A-26C illustrate alternative parameter loading operations with respect to the sequence definition memory of FIG. 25A.
Figure 26B:
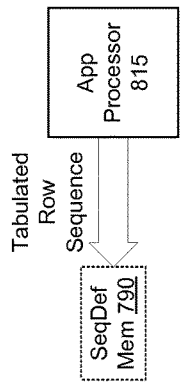
Figure 26C:
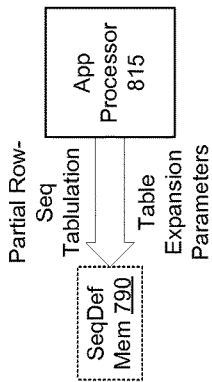

FIGS. 26A-26C illustrate alternative parameter loading operations with respect to the sequence definition memory 790 of FIG. 25A. In the arrangement shown in FIG. 26A, an application processor 815 (e.g., corresponding to application processor 273 or image processor 243 of FIG. 8) loads a set of row-sequence generation parameters into sequence definition memory 790 to enable row sequence controller (i.e., element 781 of FIG. 25A) to synthesize reset and read-out addresses in accordance with a desired subframe read-out sequence. By contrast, in the arrangement of FIG. 26B, a tabulated set of read-out and reset addresses is loaded into sequence definition memory 790 and thereafter read-out by (and output from) the row sequence controller in a sequence of table lookup operations. The tabulated set of read-out and reset addresses may be generated by application processor 815 (e.g., using sequence generation parameters similar to those loaded into the sequence definition memory in the algorithmic address generation arrangement of FIG. 26A) or may itself be supplied from a pre-loaded source (e.g., loaded into a discrete non-volatile memory or on-processor non-volatile memory during device production or run-time docking). FIG. 26C illustrates a hybrid of the fully algorithmic and fully tabulated sequence definition approaches of FIGS. 26A and 26B. That is, application processor 815 loads a partial row-sequence tabulation into sequence definition memory 790 together with table expansion parameters that enable algorithmic expansion of the partial read-out/reset address tabulation into a complete sequence of read-out and reset addresses. For example, a sequence of read-out addresses to be output in successive time slots may be specified by tabulation of an initial address together with run-length information that indicates the number of sequential addresses to be generated thereafter.

To implement the row address sequencer as a state machine on a sensor chip or an accompanying ASIC or FPGA, it is helpful to have an algorithm that needs only to know the current row and its internal state to derive the next row address. In one embodiment such a state machine reads each row address consecutively from a memory where a pre-calculated row address sequence has been stored. This method requires however a significant amount of memory. It will also take considerable time to store a new table in the memory if the policy is changed. An alternative algorithm directly calculates each row address in sequence. Such an algorithm has an initialization part which has the more complex calculations that are executed to set up the address generation based on the policy and exposure time and a part that is stepping through the exposures. In one embodiment, the complex set-up calculations are implemented by software execution within the chip controlling the image sensor and the step-through operation are implemented in a state machine on the sensor itself.

An exemplary set of variables that are used in the address sequencing state machine are listed in the tables I-III below. The variables in Table I are generated at each row time. They are the row address to be read, the row address to be reset and the subframe of the row address to be read. The subframe is only input to the reconstruction circuit and can be omitted if that circuit is not on the sensor but implanted in downstream processing. The row addresses for read and initialization are input both to the row control circuits and the reconstruction circuit. If initialization is implemented off-sensor, the variables of Table III need to be transferred to the sensor before starting taking exposures with a given policy. If initialization is implemented on-sensor, then only the duration of the sample intervals and the ratio of the exposure time to the frame time need to be sent to the sensor.

The number of groups can be sent in addition if fewer groups than the minimum necessary by the policy are going to be used.

TABLE I

Generated state machine output

| Variable | Comment |
|---|---|
| $a_{rd}$ | Row address for read at current row time |
| $f_{rd}$ | Subframe for read at current row time |
| $a_{init}$ | Row address for initial reset at current row time |

TABLE II

Initialization only state machine variables

| Variable | Comment |
|---|---|
| s | Array with sampling durations |
| $\sum_{i=1}^{N/g} d_i$ | Duration of sub-sequence ($d_i$ is the duration of an interval of the repeated subsequence, see Equation (2)) |
| g | Number of equal groups |
| $r_{vb}$ | Row times for vertical blanking |
| $\rho_{fe}$ | Ratio frame time to exposure time |

TABLE III

Runtime state machine variables

| Variable | Comment |
|---|---|
| N | Number of sampling intervals |
| $\delta_s = \dfrac{N}{g}$ | Slot offset between the same subframe of consecutive rows for interleaving |
| $\delta_r$ | Offset to next row of subframe read other than first |
| $\delta_i$ | Row to start with at first subframe read |
| $n_{rows}^0$ | Number of rows for which addresses need to be generated |
| $n_{rows}$ | Number of rows after adding the necessary dummy rows |
| $n_{ro} = n_{rows} \cdot \dfrac{N}{g}$ | Storage to avoid multiplication and division during run |
| $n_{rN} = n_{rows} \cdot N$ | Storage to avoid multiplication during run |
| $b_i$ | Subframe of position i in slot |
| k | Counter, reset at frame start |
| $k_1$ | Counter, reset at group start |
| $k_i$ | Counter used for pixel reset, reset at frame start |
| $k_i^0$ | Initialization value of counter $k_i$ |
| i | Row address slot counter, reset at group start |
| r | Row address to be calculated |
| j | Current position in slot |
| $a_{rstbuf}$ | Buffer to shift address to be reset by one row time |

If an exposure time shorter than the frame time is required, then the sampling interval duration used in the following initialization steps is adjusted according to Equation (1).

$$s_1 = (\rho_{fe} - 1)\sum_{i=1}^{N} s_i + s_1 \quad (1)$$

Next the number of identical sub-sequences is determined. Equation (2) shows the sequence of sample interval durations where a group repeats itself except for the first interval of the first group which can be shorter since the initial reset can be moved closer to the first read while preserving the capability to do conditional resets throughout the frame.

$$s = \hat{d}_1, d_2, \ldots, d_{\frac{N}{g}}, d_1, d_2, \ldots, d_{\frac{N}{g}}, \ldots, d_1, d_2, \ldots, d_{\frac{N}{g}} \quad (2)$$

Then dummy rows are added so that with positive integer p $$n_{rows} = p \sum_{i=1}^{\frac{N}{g}} d_i \quad (3)$$

Dummy rows for vertical blanking are added in integer multiples of the total subsequence duration as well to not violate Equation (3). The row and initial offsets are calculated using $$\delta_{r_k} = g\left(\sum_{j=1}^{\frac{N}{g}} d_j - \sum_{j=1}^{k} d_j\right) \forall k \in \left[1 \ldots \frac{N}{g}\right] \quad (4)$$

$$\delta_i = \frac{n_{rows}(d_1 - \hat{d}_1)}{\sum_{j=1}^{\frac{N}{g}} d_j} \quad (5)$$

The list of subframe indices per slot becomes $$b = N, N - \delta_s + 1, \ldots, N - 1 \quad (6)$$

The initialization value for the reset counter is set depending on the ratio of the frame time to the exposure time $$k_i^0 = \begin{cases} 0, & \rho_{fe} = 1 \\ \dfrac{n_{rows}}{\rho_{fe}}, & \rho_{fe} > 1 \end{cases} \quad (7)$$

Finally the counters are initialized and the output variables are set to $a_{not}$ a value that flags no activity, e.g. all bits set.

$k=0$ $k_1=0$ $m=0$ $a_{rd}=a_{not}$ $a_{init}=a_{not}$ $a_{rstbuf}=a_{not} \quad (8)$ While the initialization routine has the complex calculations outlined above, the runtime address generation is possible using only additions, shifts and conditional decisions. The pseudo-code sequence below shows the calculations and assignments that are done at the beginning of each row time to generate the next row address and initial reset address. The code assumes valid row addresses between 0 and $n_{rows}^0-1$.

```
a_init = a_rstbuf
if (k_1 = 0) {i = δ_i}
if (j = 0) {
    r = i
    i = i + 1
    if (i = n_rows) {i = 0}
}
else {
    r = i + δ_{rj-1}
    if (r ≥ n_rows) {r = r - n_rows}
}
k = k + 1
k_1 = k_1 + 1
if (k_1 = n_ro) {k_1 = 0}
f_rd = b_j
if (r = n_rows^0 - 1) {
    if (b_j > N - δ_s) {
        if (j > 0) {
            b_j = j - 1
        }
        else {
            b_j = δ_s - 1
        }
    }
    else {
        b_j = b_j + 1
    }
}
if (r < n_rows^0) {
    a_rd = r
    if (δ_s = 1) {
        Comment: subscript is bitindex
        a_rd,2 = r_0
        a_rd,1 = r_2
        a_rd,0 = r_1
    }
}
else {
    a_rd = a_not
}
if ((j = 0)&(k ≤ n_ro)) {
    if (k_i < n_rows^0) {
        r = k_i
        if (δ_s = 1) {
            Comment: subscript is bitindex
            r_2 = k_{i,0}
            r_1 = k_{i,2}
            r_0 = k_{i,1}
        }
        a_rstbuf = r
    }
    else {
        a_rstbuf = a_not
    }
    k_i = k_i + 1
    if (k_i ≥ n_rows) {k_i = k_i - n_rows}
}
else {
    a_rstbuf = a_not
}
j = j + 1
if (j = δ_s) {j = 0}
if (k = n_rN) {
    k = 0
    k_1 = 0
    k_i = k_i^0
    j = 0
}
```

Figure 27:
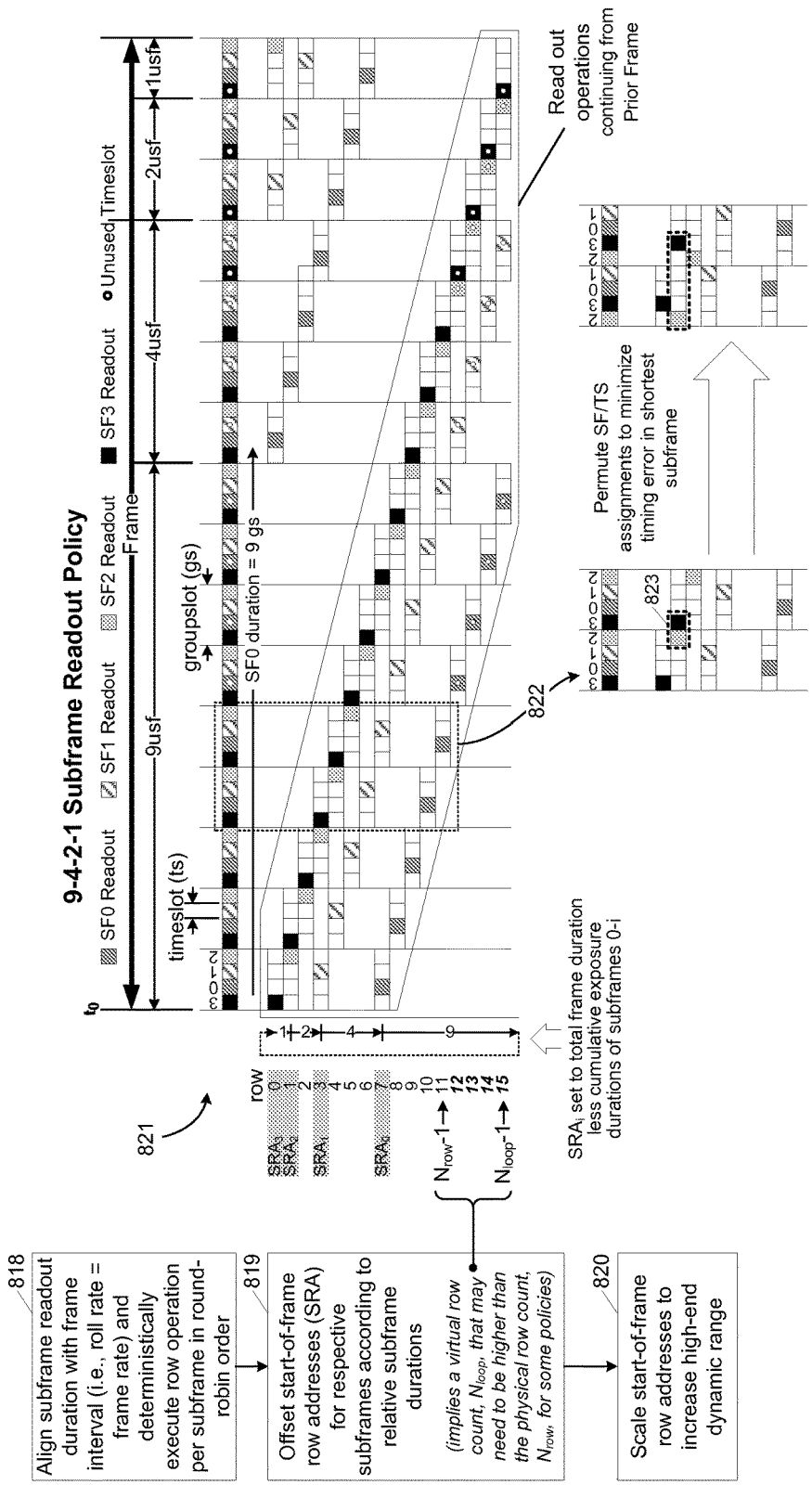
FIG. 27 illustrates an alternative subframe readout embodiment.

FIG. 27 illustrates an alternative subframe readout embodiment. As shown at 818, instead of completing subframe readouts in fractions of a frame interval as in the embodiments above, the subframe readout duration is aligned with the frame interval (i.e., the "roll rate" is the same as the frame rate) and row operations are executed deterministically for each subframe, one after another in round-robin order. To establish desired subframe exposure durations (i.e., in accordance with the subframe readout policy), the start-of-frame row addresses for respective subframes (i.e., $SRA_0$-$SRA_{N_{SF}-1}$, where $N_{SF}$ is the number of subframes per frame) are offset according to relative subframe durations as shown at 819. The start-of-frame row addresses may be scaled according to subframe scaling factors as shown at 820 (i.e., divisors that maintain the same subframe duration ratios, but with shorter exposure intervals) to increase high-end dynamic range.

As indicated at 819, establishing start-of-frame row addresses in accordance with respective subframe durations may require a virtual row count higher than the physical row count of the sensor. In the exemplary readout timing diagram at 821, for instance, distribution of start-of-frame row addresses $SRA_0$-$SRA_3$ according to a 9-4-2-1 subframe policy within an image sensor having 12 physical rows ($N_{row}=12$) is enabled by setting a virtual row count ($N_{loop}$) high enough to enable division of the overall virtual count range (or loop range) with a resolution equal to the total number of unit subframes ($Q_{USF}$), or sixteen in this example. In the example shown, row zero of the fourth subframe (i.e., the final subframe in this $N_{SF}=4$ example) is read out in the start-of-frame groupslot (i.e., $SRA_3=0$) as the light collection interval for that subframe concludes at the end of the prior frame, so that final subframe readout begins at the start of the depicted frame. More generally, subframe readout sequences extend across frame boundaries with read-out for each subframe of the prior frame commencing at a row addresses within the successor frame according to the total frame duration less the cumulative exposure durations of the subframe being read out and all predecessor subframes, all in units of groupslots. In the example presented in FIG. 821, the total frame duration is sixteen groupslots (i.e., $N_{loop}$) and the subframe durations are 9, 4, 2 and 1, respectively. Accordingly, starting-of-frame row addresses for each of the four subframes are: $SRA_0=16-9=7$; $SRA_1=16-(9+4)=3$; $SRA_2=16-(9+4+2)=1$; and $SRA_3=16-(9+4+2+1)=0$. Applying the same 9-4-2-1 subframe policy within a more practical image sensor having, for example, 3000 rows of pixels is enabled by setting the virtual row count high enough to establish the sum of subframe durations in unit subframes as a divisor, and thus 3008. As the number of groupslots per unit subframe (i.e., $N_{loop}/Q_{USF}=3008/16=188$) is now greater than unity, the start-of-frame row addresses scale accordingly and become $SRA_0=188*7=1316$; $SRA_1=188*3=564$; $SRA_2=188*1=188$; and $SRA_3=0$.

Still referring to the exemplary timing diagram at 821, the total number of timeslots per frame is given by the product of the virtual row count, $N_{loop}$ (which is, by definition, also the number of groupslots per frame), and the subframe count, $N_{SF}$ (also referred to herein as the oversampling factor), with the start-of-frame row address value for each subframe being applied in respective timeslots (ts) one after another in deterministic fashion (i.e., in the same subframe order from one groupslot to the next). After $N_{SF}$ row addresses have been applied, the row address for each subframe is incremented (thus sequencing the readout operation for each subframe by one row) in modulo fashion, overflowing to zero after reaching a count value of $N_{loop}-1$.

By this operation, a "groupslot" interval (i.e., ts*$N_{SF}$, where "*" denotes multiplication), transpires between each change in row address values, with the total number of groupslots per frame equal to the virtual row count. That is, in theory at least, $T_{FRAME}$=gs*$N_{loop}$=ts*$N_{SF}$*$N_{loop}$. As discussed below, the timeslot duration in some cases may be slightly shorter or longer than necessary to precisely meet a target frame rate.

FIG. 28A illustrates a generalized sequence of operations that may be carried out by an image processor to implement a selected subframe readout policy in accordance with the approach shown in FIG. 27. Initially, the image processor assigns parameters in accordance with the selected subframe policy—a policy that may itself be determined by the image processor based on various input parameters, including scene luminance, motion detection, user-specified imaging mode, user-specified imaging constraints, etc. In the example shown at 825, for instance, values are assigned to the following non-exhaustive list of parameters in accordance with the subframe policy specification.

number of subframes per frame ($N_{SF}$),
number of unit subframes per frame ($Q_{USF}$),
duration of unit subframe 'i' ($SF_i$, where i is the subframe index and ranges from 0 to $N_{SF}$−1), Note that the physical row count is also listed in assignment block 825. While that value will generally be fixed for a given sensor, the physical row count may be manipulated to achieve aspect ratios other than that of the physical sensor (e.g., limiting the readout to a smaller number of physical rows than available in the sensor and thus defining a logical starting and/or ending row that is offset from the physical starting and/or ending row of the sensor to achieve a logical aspect ratio that is different from the physical aspect ratio of the sensor, or binning or subsampling with corresponding row steps that are greater than one).

Continuing with FIG. 28A, at 826 the image processor determines the virtual row count based on the number of physical rows (Nrow) and the number of subframes per frame and at 827 the image processor determines the start-of-frame row address for each subframe following the approach described above. As shown in detail view 829, the image processor may, as part of start-of-frame row address determination, determine start-of-frame row addresses for multiple scaled subframe durations. That is, while a non-scaled subframe readout may extend across the entire frame interval, the number of groupslots per unit subframe may be scaled in accordance with one or more subframe scaling factors (SFS) to yield scaled subframe intervals (i.e., scaled (shortened) light collection intervals) and thereby extend the high-end dynamic range of the image sensor. For scaling simplicity, the embodiment shown in operations 830, 831 and 832 limits subframe scaling to factors that divide evenly into (i.e., are divisors of) the number of groupslots per unit subframe (i.e., $N_{loop}/Q_{USF}$). That is, at 830 the image processor determines the number of scaling factors by factoring the groupslot per unit-subframe value, assigning each factor to a respective subframe scaling factor. Then, at 831, the image processor selects a subframe scaling factor according to scene luminance (e.g., choosing progressively larger factors as luminance increases thereby shortening the light collection interval and extend the high-end dynamic range of the sensor) and then scales the start-of-frame (t0) row address for each subframe according to the selected subframe scaling factor at 832.

FIG. 28B illustrates parameters of an exemplary subframe readout within a 3000 row image sensor with design targets of 4x oversampling ($N_{SF}$=4), 4-stop dynamic range extension ($Q_{USF}$=16) and a 9:4:2:1 subframe duration ratio. Following the exemplary assignments shown at 825 in FIG. 28A, the image processor determines a virtual row count ($N_{loop}$) and starting row address ($SRA_0$-$SRA_3$) as shown. In an embodiment that permits subframe scaling, the image processor determines the number of factors of the groupslot per unit-subframe value (there are five factors in the example shown, ranging from 94, 47, 4, 2 and 1) and assigns those factors to respective subframe scaling factors, $SFS_{0-4}$.

Still referring to FIG. 28A, limiting the subframe scaling factors to divisors of the groupslot per unit-subframe value may not yield practical (or desired) scaling progressions in some cases. Accordingly, subframe scaling factors may alternatively (or additionally) be determined by choosing the desired subframe scaling factor (α), multiplying each starting row address by the subframe scaling factor and rounding the result up or down to the nearest integer. While this approach may yield subframe duration ratios that are slightly offset from the target policy (e.g., 9.01, 3.99, 1.99, 1.01 instead of 9, 4, 2, 1), the ratios are applied deterministically (i.e., repeated uniformly for each frame) and can be compensated during image reconstruction.

Referring again to FIG. 27, it can be seen that allocation of an integer number of groupslots per unit subframe (i.e., one-to-one in the example shown at 821) yields a deviation from precise subframe duration ratios due to the per-subframe timeslot displacement within a groupslot. That is, the $N_{SF}$ readout operations carried out with respect to a given row of pixels are, by definition, displaced by at least one timeslot from precise unit subframe boundaries from subframe to subframe, yielding a cumulative timing deviation as large as $N_{SF}$−1 timeslots. Thus, in the example shown at 821, while the final subframe readout should ideally occur exactly one unit subframe (and thus four timeslots) after the prior subframe readout (i.e., SF3 readout exactly four timeslots after the SF2 readout), the per subframe timeslot displacement in the round-robin readout sequence SF3→SF0→SF1→SF2 yields a 3-timeslot displacement of the SF2 readout—a displacement that shortens the SF3 duration correspondingly (i.e., by three timeslots) so that the SF3 integration interval is a unit subframe less three timeslots instead of a complete unit subframe. This timing deviation is exaggerated in this single-groupslot per unit subframe example shown at 821, with the three timeslot deviation shrinking the desired SF3 integration interval from four timeslots to one and thus by 75% of the target duration as shown at 823 in detail view 822. In a more practical sensor having multiple groupslots per unit subframe, the timing deviation will in most cases constitute a much smaller fraction of the desired interval. For example, executing the 9-4-2-1 readout policy shown at 821 in a 3000 row sensor with 188 groupslots per unit subframe as discussed above will yield a timing deviation of three timeslots out of 188*4 and thus a mere 0.4% of the target integration interval. Further, as shown in detail view 822, the subframe-to-timeslot assignments may be reordered (or permuted or otherwise adjusted) to minimize or reducing the worst case timing error—generally the timing error in the shortest subframe. In the example shown at 822, for instance, SF2 is rotated to the first timeslot in each group with the other subframe timeslots shifted over. By this arrangement, the SF3 timing error is reduced to a single timeslot and thus a mere 0.1% offset from the desired subframe duration in a 3000-row sensor. In one embodiment, the intra-groupslot allocation to individual subframes (i.e., intra-groupslot readout order) is specified by a control parameter that forms part of the subframe readout policy, with that readout-order parameter being applied by the row address generator.

The permutation of the intra-groupslot readout order points to an alternative subframe readout approach in which the groupslot/unit-subframe alignment constraint is lifted in favor of timeslot allocation that more precisely matches the target subframe durations. That is, while a general-case timeslot (or row-operation) scheduler has been presented, there exists a subclass of subframe-interleaved schedules that are guaranteed to exist. For a given number of subframes $s_g$, define corresponding group timeslots $ts_i$, $0 < i \leq s_g$, each taking a unique integer value between 0 and $s_g-1$ (for simplicity in Equation 1 below, we also define a value $ts_{sg+1}$, which we assume can take any timeslot). Also define corresponding exposure time shifts expressed in integer numbers of group times $S_1$, $0 < i \leq s_g$ (for simplicity in Equation 1 below, we also define a value $S_0=0$). Assuming that T total timeslots are available per frame, and defining the last readout scan for row 0 of the array to begin at the final frame timeslot (T-1), one can define the following timeslot schedule for $(s_g+1)$ row events ($s_g$ conditional/unconditional reads and one reset per row per frame):

$$t(i,k) = T-1 + s_g k - s_g \Sigma_{n=0}^{i-1} S_n - ts_i, 1 \leq i \leq s_g + 1 \quad (1)$$

Consider the following specific case for four subframes, with corresponding group times and slot offsets. The schedule given by Equation 1 is then as follows:
Fourth, unconditional read, row k: $t(1, k) = T-1+4k-ts_1$
Third, (un)conditional read, row k: $t(2, k) = T-1+4k-4S_1-ts_2$
Second, (un)conditional read, row k: $t(3, k) = T-1+4k-4(S_1+S_2)-ts_3$
First, (un)conditional read, row k: $t(4, k) = T-1+4k-4(S_1+S_2+ts_4$
Initial Reset, row k: $t(4, k) = T-1+4k-4(S_1+S_2+S_3+S_4)-ts_5$ By definition of the frame referencing to the final timeslot, select $ts_1=0$. The remaining group timeslots can be assigned as desired, for instance to give a "best fit" to a desired policy. For instance, consider a target policy of the form 9-4-2-1, with exposure times expressed in integer numbers of timeslots 9A-4A-2A-A. By defining $ts_2=3$, $ts_3=1$, $ts_4=2$, and $ts_5=1$ (arbitrarily but advantageously), one can then derive for any A how to set each exposure time shift:

$$A = t(1,k) - t(2,k) = 4S_1 + ts_2 - ts_1 = 4S_1 + 3$$

Thus for integer values $S_1=0, 1, 2, 3, \ldots$, then A=3, 7, 11, 15, ..., increasing by fours as $S_1$ increments. To have a penultimate subexposure duration twice that of the final subexposure duration, $$2A = t(2,k) - t(3,k) = 4S_2 + ts_3 - ts_2 = 4S_2 - 2$$

Since $A=4S_1+3$, by substitution:

$$8S_1 + 6 = 4S_2 - 2, \text{ and } S_2 = 2S_1 + 1.$$

Then to have a second-longest subexposure duration four times that of the final subexposure duration, $$4A = t(3,k) - t(4,k) = 4S_3 + ts_4 - ts_3 = 4S_3 + 1$$

Since $A=4S_1+3$, by substitution:

$$16S_1 + 12 = 4S_3 + 1, \text{ and } S_3 = 4S_1 + 11/4.$$

Since S3 must be an integer, the relationship must be adjusted and there will be a slight error from the desired duration of $S_3$, which decreases as a percent error as $S_3$ increases. Accordingly, round the fixed term and set $S_3 = 4S_1 + 3$.

Finally, to have a longest subexposure duration nine times that of the final subexposure duration, $$9A = t(4,k) - t(5,k) = 4S_4 + ts_5 - ts_4 = 4S_4 - 1$$

Since $A=4S_1+3$, by substitution:
$36S_1+27=4S_4-1$, and $S_4=9S_1+7$. With the allowable integer values for $S_1$, one can calculate possible exposure time policies, e.g., for a system with a 2.78 μs timeslot duration:

| $S_1$, group timeslots | Policy, timeslots | % error in "4" subframe duration | Exposure time (approx.), s |
|---|---|---|---|
| 0 | 27-13-6-3 | 8.3 | 1/7300 |
| 1 | 63-29-14-7 | 3.6 | 1/3200 |
| 2 | 99-45-22-11 | 2.3 | 1/2000 |
| 3 | 135-61-30-15 | 1.6 | 1/1500 |
| 4 | 171-77-38-19 | 1.3 | 1/1200 |
| 5 | 207-93-46-23 | 1.1 | 1/1000 |
| 10 | 387-173-86-43 | 0.6 | 1/500 |
| 22 | 819-365-182-91 | 0.3 | 1/250 |
| 44 | 1611-717-358-179 | 0.1 | 1/125 |
| 93 | 3375-1501-750-375 | 0.07 | 1/60 |
| 186 | 6723-2989-1494-747 | 0.03 | 1/30 |

Figure 29:
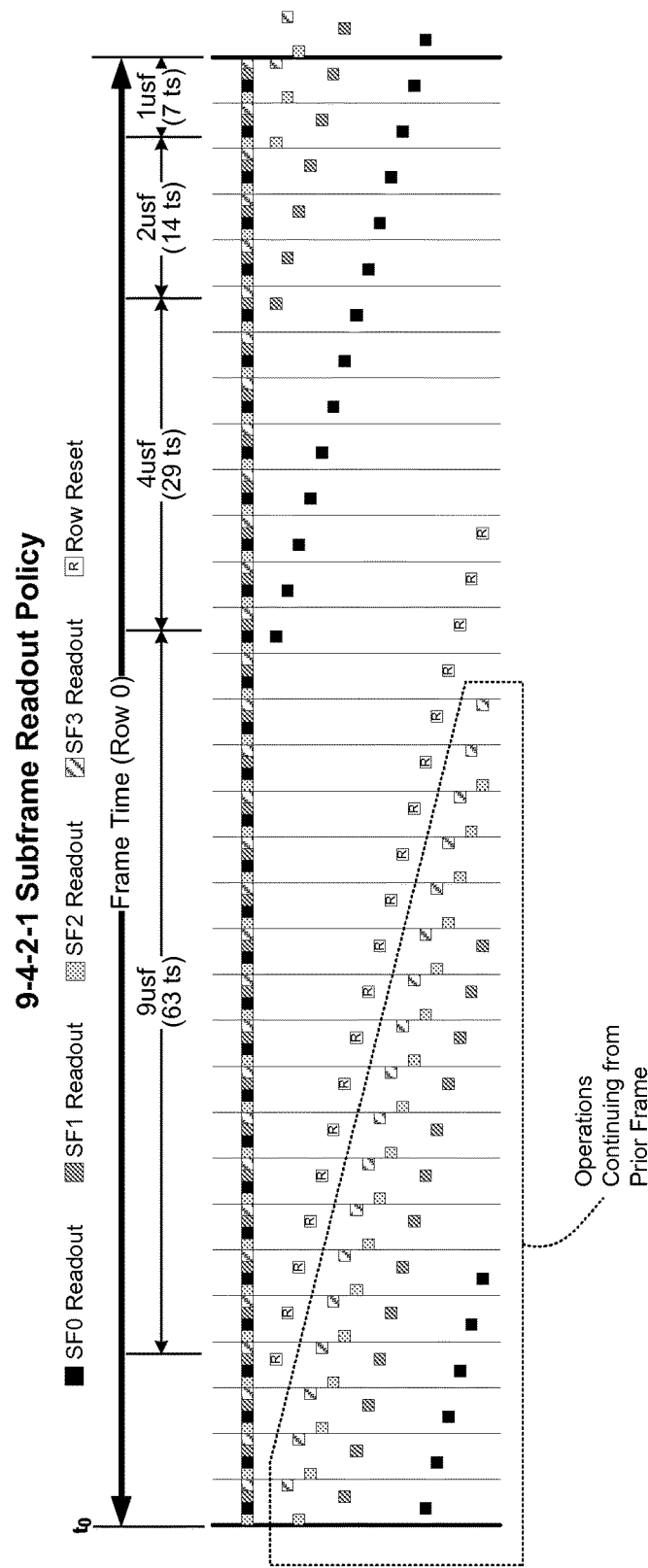
FIG. 29 illustrates an example of alternative timeslot allocation approach under a 9-4-2-1 subframe readout policy in which the group timeslot value, $S_1$, is set to unity.

FIG. 29 illustrates an example of the foregoing timeslot allocation approach under a 9-4-2-1 subframe readout policy in which the group timeslot value, $S_1$, is set to unity. As shown, the 4-USF subframe is a single timeslot longer than the ideal duration (i.e., 29 timeslots instead of 28), thus exhibiting a 3.6% error in that subframe as shown in the table above.

A few observations are in order. Although only a few possible exposure selections exist above 1/1000 s, each of these is a high dynamic range sample, with the shortest subframe 1/16$^{th}$ of the exposure time, thus these few samples can cover an extremely wide and overlapping dynamic range. Below 1/1000 s, the number of individual time policies doubles per photographic stop. Although the longest exposure time shown is 1/30 s (assuming that is a set video rate), for still frames or slower video rates the schedule can be extended to longer exposures. For the shortest exposure times, to increase accuracy one may compensate for the subexposure duration error during reconstruction.

A similar exercise can be conducted for other policies to select a "best" timeslot order and calculate exact timing. Depending on the exact policy, there may also be other timing sequences not defined by Equation 1 that do not generate timeslot conflicts. These may be derived, for example, using the more general approach described in the prior section.

Frame Error Compensation

Figure 30:
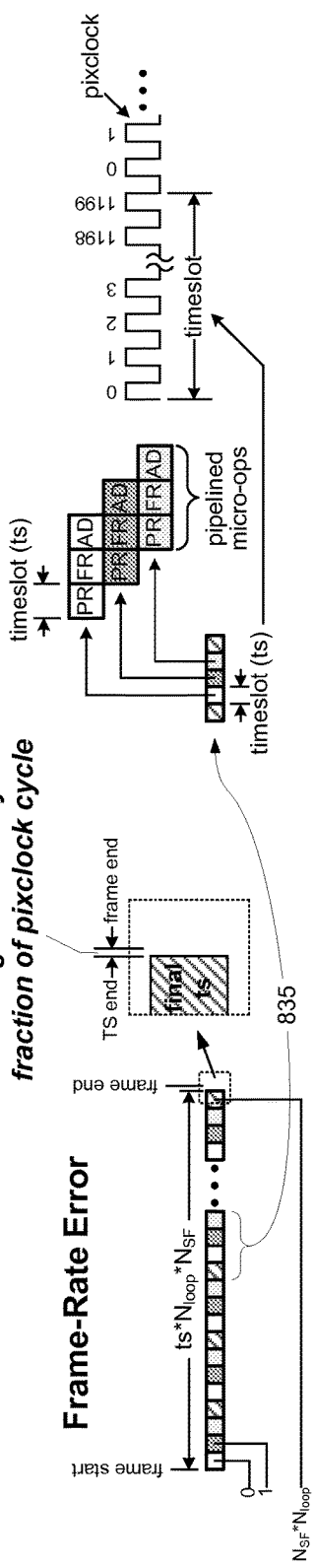
FIG. 30 illustrates an exemplary frame-rate error (or frame-to-timeslot rounding error) in which the total number of row-operation timeslots per frame yields an actual frame time slightly shorter than the target frame period, meaning that the image sensor will generate an extra frame every P frames.

As mentioned above, the timeslot duration in some implementations may be slightly shorter or longer than necessary to precisely meet a target frame rate, which is generally not an issue for still frame capture but may be an issue for video capture. FIG. 30 illustrates this frame-rate error (or frame-to-timeslot rounding error) in an example in which the total number of timeslots per frame ($N_{loop}*N_{SF}$) yields an actual frame time (ts*$N_{loop}*N_{SF}$) slightly shorter than the target frame period, meaning that the image sensor will generate an extra frame every P frames, where P is the inverse of the rounding error expressed as a percentage of the frame time. For example, a 0.02% rounding error, will yield an extra frame for every 5000 expected frames (i.e., 5001 frames instead of 5000). Conversely, a −0.02% error (i.e., actual frame time exceeds target) will result in an omitted frame for every 5000 expected (i.e., 4999 instead of 5000). For both positive and negative framing errors, timing compensation is complicated in continuous sampling schemes such as those shown in FIGS. 27-29, as there may be no idle time in which to insert a delay event or advance event. Moreover, occasionally extending or shortening the timeslot duration is complicated by the pipelined execution of the micro-operations that constitute individual row operations. That is, though row operations have been depicted as corresponding to respective timeslots for simplicity, in actual implementation, row operations may include component micro-operations that are pipelined with micro-operations for other subframes across multiple timeslots. For example, as illustrated in detail view 835, a row operation executed as part of a subframe readout may include partial-read (PR), full-read (FR) and analog-to-digital conversion (AD) micro-operations, each executed in a respective timeslot. As shown, the same three micro-operations are executed with respect to another subframe readout, starting one timeslot later, and then with respect to yet another subframe readout starting one timeslot later still. While pipelining the micro-operations in this way compresses the overall amount of time required for subframe readout (i.e., in accordance with the operational parallelism and thus by a factor of 3), this pipelining also presents challenges for implementing timing compensation, as a carelessly inserted or deleted timing event may impact the three concurrently executed row operations differently and thus yield undesired effects in the output image. For example, inserting an extra unused timeslot every P time slots may result in extending the time between partial read and full read operations for one subframe in the concurrent subframe readout, but not others. Similarly, inserting an extra pixel clock cycle in accordance with the framing error (i.e., one extra clock cycle every 1200 pixel clock cycles in the example shown), may result in additional delay at a time-critical point in a row-readout operation.

Figure 31:
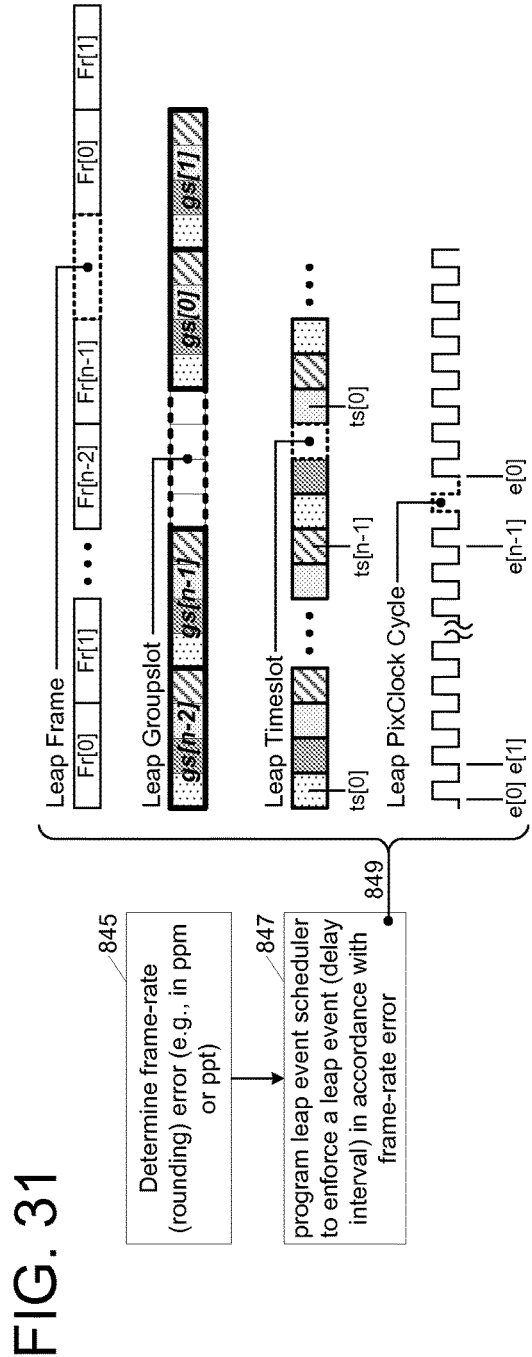
FIG. 31 illustrates an exemplary approach to frame-rate error correction that may be employed by an image processor within various imaging system embodiments disclosed herein.

FIG. 31 illustrates an exemplary approach to frame-rate error correction that may be employed by an image processor within various imaging system embodiments disclosed herein, including embodiments that implement continuous subframe readout image as described in reference to FIGS. 27-29. Starting at 845, the image processor determines the frame/timeslot error based on the subframe readout policy. In one embodiment, for example, the number of timeslots per frame is determined based on the number of subframes per frame (NSF) and the virtual row count ($N_{loop}$), with the latter value being determined based on the subframe duration ratios as described above. The timeslot duration is itself defined by a variable number of pixel clock cycles ($N_{CK}$) determined according to the ratio of the pixel clock frequency ($1/T_{pixclock}$), frame rate ($1/T_{frame}$), $N_{loop}$ and $N_{SF}$ parameters (e.g., $N_{CK}$=floor[floor($T_{FR}/T_{pixclock}$)/($N_{loop}*N_{SF}$)]) so that the frame-rate error may be expressed, as a fraction of the frame period for example, by [$T_{FR}$−($N_{ck}*T_{pixclock}*N_{loop}*N_{SF}$)]/$T_{FR}$.

Still referring to FIG. 31, at 847, the image processor programs a leap event scheduler to insert a leap event in accordance with the frame-rate error. More specifically, in an embodiment that ensures an actual frame rate not greater than the target frame rate (i.e., $N_{SF}*N_{loop}*ts<=T_{FR}$), the image processor programs a leap frequency value within the leap event scheduler that indicates the frequency with which leap events are to be enforced. In one implementation, the leap frequency is the inverse of the frame-rate error (e.g., if the frame-rate error is 0.02%, or 1/5000, then the leap frequency value will be 5000, indicating that a leap event is to be inserted every 5000 instances of the time period being leaped, or leap period. As shown, the leap period may an entire frame, leap groupslot, leap timeslot or leap pixel clock cycle (or multiple pixel clock cycles) or any other time period that may be conveniently inserted within a specified time window. Thus, given a 0.02% frame-rate error, a leap frame may be inserted after every 5000 frames (or at some point within each window of 5000 frames) to synchronize the frame count and target frame rate (i.e., such that exactly 5000 frames are received every 5000*$T_{FR}$. Similarly, a leap groupslot (i.e., $N_{SF}$ contiguous timeslots) may be inserted within each window of 5000 groupslots, a leap timeslot may be inserted within each window of 5000 time slots and one to N leap pixel clock cycles may be inserted within each window of 5000 to N*5000 pixel clock cycles. These operations are illustrated generally (i.e., leap event enforcement every n time periods) in detail view 849.

Figures 32, 33:
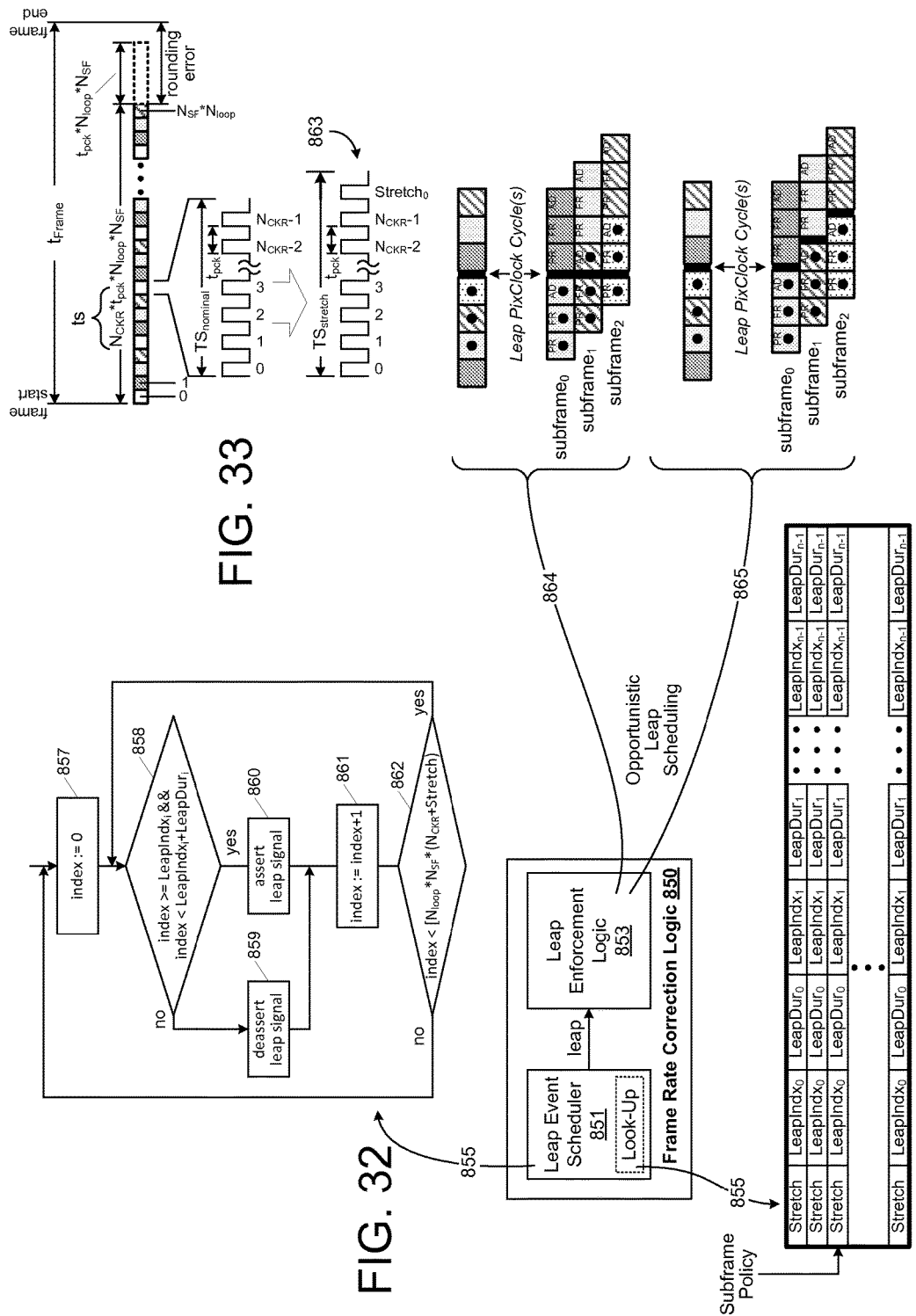
FIG. 32 illustrates an embodiment of frame-rate correction logic that may be implemented within the control circuitry of the various image sensor implementations disclosed herein.
FIG. 33 illustrates an example of policy-dependent stretching (modulation) of the timeslot duration that may be used to mitigate frame-rate error.

FIG. 32 illustrates an embodiment of frame-rate correction logic 850 that may be implemented within the control circuitry of the various image sensor implementations disclosed herein. In the embodiment shown, frame-rate correction 850 includes a programmable leap event scheduler 851 and leap enforcement logic 853. In one embodiment, leap event scheduler 851 stores leap control information received from the image processor in a programming operation, with the leap control information including, for example and without limitation, a leap frequency value as discussed above and, optionally, a value indicating leap event type and/or duration. Leap event scheduler 851 applies the leap control information to define a sequence of event-timing windows in which respective leap events are to be enforced and, at an opportunistic time within each event-timing window, asserts a leap signal ("leap") to leap enforcement logic 853.

In another embodiment, leap event scheduler 851 includes a lookup table that is pre-programmed (e.g., at image sensor initialization) with subframe-policy-dependent leap scheduling information. In one implementation, shown for example at 855, leap scheduling information for each subframe policy includes a respective set of one or more index values (Leapindx) that indicate when to insert leap events relative to a timing reference and corresponding leap duration values (LeapDur) that indicate respective durations of the inserted leap events. In the specific example presented, the leap index values are expressed in units of pixel clock cycles since the start of the current frame, and the leap duration values similarly indicate leap durations in pixel clock cycles. As explained in further detail below, an additional value, "Stretch," indicates a number of pixel clock cycles appended to the minimum number of pixel clock cycles per time slot ($N_{CKR}$) to stretch the duration of individual timeslots in accordance with the frame-rate error resulting from a given subframe readout policy. Other parameters may be included in the table in alternative embodiments. Also, instead of supplying a subframe policy index (e.g., value from 0 to N-1 indicating one of N subframe policies) to a lookup table disposed within leap event scheduler 851 as shown, a set of leap event index values, leap durations and/or stretch value corresponding to a given subframe readout policy may be supplied to (or programmed within) the leap event scheduler by other logic within the image sensor or the image processor. For example, the lookup table may be indexed by the image processor (i.e., with the table being stored within volatile or non-volatile memory within or accessible by the image processor) to retrieve a policy-specific set of leap scheduling information, and that information supplied to the leap event scheduler.

Still referring to FIG. 32, an exemplary intra-frame leap scheduling sequence, executed by leap event scheduler 851, is shown at 856. At the start of each frame a pixel clock index ("index") is set to zero as shown at 857. At 858, the pixel clock index is compared with each of the leap indices (Leapindxi, where i ranges from 0 to the number of leap indices) and leap duration values to determine whether the current pixel clock cycle is one that falls within a leap interval (i.e., a time, in pixel clock cycles, that extends from $LeapIndx_i$ to $LeapIndx_i+LeapDur_i$). If the pixel clock index corresponds to a pixel clock cycle that does not fall within a leap interval, leap event scheduler 851 deasserts the leap signal at 859, thus refraining from effecting a leap event. Conversely, if the pixel clock index corresponds to a pixel clock cycle that does fall within a leap interval, leap event scheduler asserts the leap signal at 860 to trigger enforcement of the leap event. In either case, the pixel clock index is incremented at the next rising pixel clock edge as shown at 861, and at 862 the pixel clock index is compared with an end-of-frame value (i.e., number of timeslots ($N_{SF}*N_{loop}$) multiplied by the timeslot duration ($N_{CKR}$+Stretch)) and, if reached, reset to zero at 857. If the pixel clock index has not reached the end-of-frame value, the selective leap-event insertion is repeated starting at 858. At is mark offsets from the start of a frame at which leap events Leap enforcement logic 863 includes, e.g., circuitry to gate or otherwise suppress control and/or timing signals for a time corresponding to the leap duration and thereby effect (enforce) the leap event.

FIG. 33 illustrates an example of policy-dependent stretching (modulation) of the timeslot duration that may be used to mitigate frame-rate error. As shown, the total number of timeslots per frame is given by $N_{SF}*N_{loop}$, with both those parameters being policy dependent. That is, if the total number of unit subframes per frame ($Q_{USF}$) varies and/or the oversampling factor (NSF) changes in response to a new subframe policy selection, the number of timeslots per frame will also vary. Assuming a fixed pixel clock frequency ($1/t_{pck}$) and nominal (minimum) number of pixel clock cycles ($N_{CKR}$), the subframe-policy-dependent number of timeslots per frame will yield a varying, subframe-policy-dependent number of unused (spare) pixel clock cycles per frame. In one embodiment, if the number of spare pixel clock cycles per frame is greater than (or equal to) the number of timeslots per frame, then at least part of the excess end-of-frame time may be distributed evenly among the timeslots, by adding an integer number of pixel clock cycles to each timeslot. In the example shown in FIG. 33, the number of spare pixel clock cycles (i.e., floor ($t_{Frame}/t_{pck}$)−$N_{CKR}*N_{loop}*N_{SF}$) is slightly greater than the number of timeslots per frame ($N_{loop}*N_{SF}$), so that the pixel clock cycles within time interval "$t_{pck}*N_{loop}*N_{SF}$" may be allocated to individually to respective timeslots, stretching each of those timeslots by one pixel clock cycle as shown at 863. As shown, the "stretch" parameter (set to '1' in the illustrated example) is effectively used to set the number of spare pixel clock cycles per timeslot and thus may be used to implement a variable frequency timeslot clock (i.e., stretching the period of the timeslot clock) for controlling subframe readout timing operations. Note that the spare pixel cycles beyond those available for allocation to individual timeslots (by definition a number of pixel clock cycles less than $N_{SF}*N_{loop}$), including any fractional pixel clock cycle, may be compensated by leap event enforcement as described above.

Returning to FIG. 32, the exemplary leap enforcement diagrams at 864 and 865 illustrate instances of opportunistic scheduling with respect to timeslot or pixel clock leap events. In the examples shown, the leap event scheduler is provided with subframe policy information (e.g., leap index values as discussed above) that correspond to strategically selected leap scheduling intervals; in this case, an interval that follows three unused timeslots. As shown in the exemplary micro-operation diagram at 864, the leap enforcement logic may insert one or more leap pixel clock cycles (or an entire leap timeslot) simultaneously with respect to each subframe readout sequence at the conclusion of the last of the three unused timeslots (e.g., by gating the clock input to the state machines provided to execute those micro-operations for respective subframe readouts), thus limiting disruption of ongoing readout operations. More specifically, with respect to $subframe_0$, the leap event is enforced after completion of an A/D operation and prior to the subsequent partial-read operation, while in $subframe_1$ and $subframe_2$, the leap event is enforced after the full-read operation and after the partial-read operation, respectively. In the alternative embodiment shown at 865, leap event insertion is staggered by one pipestage interval with respect to each subframe readout so that leap event insertion occurs after the same micro-operation for each subframe (i.e., after the A/D operation in the example shown). While this approach requires more complex leap enforcement logic (e.g., to stagger the clock gating interval for each subframe readout state machine), any disruption in the subframe sequencing will be uniform across all subframes.

FIG. 34 illustrates an embodiment of a row sequence controller 875 that may be deployed in place of the row sequence controller 781 of FIG. 25A and programmed with parameters for controlling subframe readout. More specifically, row sequence controller 875 receives parameters that define the number of pixel clock cycles per timeslot ($N_{CK}$), the number of subframes per frame ($N_{SF}$—also referred to herein as the oversampling factor), the virtual row count ($N_{loop}$), the start-of-frame row address (SRA) for each of as many as N subframes (N representing the maximum value of $N_{SF}$), and the read-type (RT) for each subframe (e.g., conditional or unconditional). The $N_{CK}$ value is programmed as a terminal count value within a modulo timeslot counter 877 so that a terminal count signal is pulsed once every $N_{CK}$ cycles, thus producing a timeslot clock, $CK_{TS}$ (note that the counter may alternatively toggle the $CK_{TS}$ signal at every $N_{CK}/2$ pixel clock cycles to produce a 50% duty clock). Oversampling factor $N_{SF}$ is similarly programmed as a terminal count value within a modulo groupslot counter 878. As shown, groupslot counter 878 counts cycles of the $CK_{TS}$ signal, and thus yields a terminal count pulse (or cycles a 50% duty clock) every $N_{SF}$ subframes, thus producing a groupslot clock ($CK_{GS}$) that marks the start of each groupslot. The start-of-frame subframe row addresses ($SRA_0$-$SRA_{N-1}$) are programmed as the initial count values within modulo subframe read address counters $879_0$-$879_{N-1}$ and modulo subframe reset address counters $881_0$-$881_{N-1}$ for respective subframes and the virtual row count ($N_{loop}$) is programmed as the terminal count value within those counters. Each of the read address counters and reset address counters receives the groupslot clock and thus sequences through the count range, overflowing to zero upon reaching row address $N_{loop}-1$. The read type values are programmed within read-type registers $883_0$-$883_{N-1}$ for respective subframes to control the read operation performed by each subframe.

Still referring to FIG. 34, modulo groupslot counter 878 outputs a groupslot count ("gs-count") that sequences from zero to $N_{SF}-1$ and thus may be used to select, via multiplexers 880, 882 and 884, a subframe-indexed one of the read address counters, reset address counters and read type registers to output, respectively, a read address, reset address and read type to downstream logic (e.g., the read address decoder, reset address decoder and row line drivers as shown in FIG. 25A), thereby enabling subframe readouts to be sequenced in round-robin fashion within each groupslot interval before advancing the row address and reset address counters. As discussed above in reference to FIG. 25A, the read address decoder and reset address decoder may include logic that asserts read and reset control signals only in response to row address values within the physical row count of the sensor, thus effecting idle row times for read address values and reset address values between $N_{row}$ and $N_{loop}-1$. Also, while not specifically shown, row sequence controller may also output control signals to the column control logic to enable column operations (e.g., sample-and-hold operations, ADC operations, etc.) to be suspended during unused timeslots.

Partial Binning to Improve Low-Light SNR

As discussed above in reference to 4×1 and 2×2 quad pixel groups, individual pixels within an image sensor may share a floating diffusion and/or one or more sample-and-hold storage elements in a manner that enables charge from two or more photodiodes and/or read-out voltages corresponding to two or more photodiodes to be combined (e.g., added, averaged, aggregated, etc.) in a binned read-out. Such charge/voltage-based binning increases the effective pixel size and thus improves low-light sensitivity (i.e., in view of the increased light collection) at the cost of reduced spatial resolution. In a number of embodiments, an oversampled image sensor is read-out in both binned (reduced-resolution) and unbinned (full-resolution) modes in respective subframes of an image frame to enable improved low-light sensitivity without significant loss of spatial resolution. In one embodiment, for example, the subframe read-out results themselves are evaluated to decide between two or more reconstruction techniques, selecting a reconstruction that relies more heavily on the binned read-out if read-out results indicate a low-light condition and, conversely, selecting a reconstruction that omits the binned read-out (or generates and applies an estimate of full-resolution pixel contributions to the binned read-out) if read-out results indicate a nominal "bright-light" condition.

Figure 35:
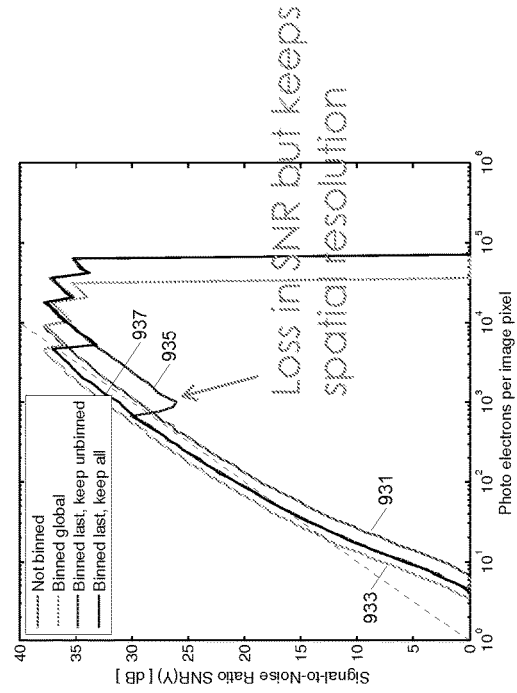
FIGS. 35 and 36 illustrate an exemplary "partial binning" imaging approach in which a pixel array is conditionally read/reset in an unbinned, full-resolution mode for all but the final subframe of a given image frame, and then unconditionally read/reset in a binned, reduced-resolution mode for the final subframe.
Figure 36:
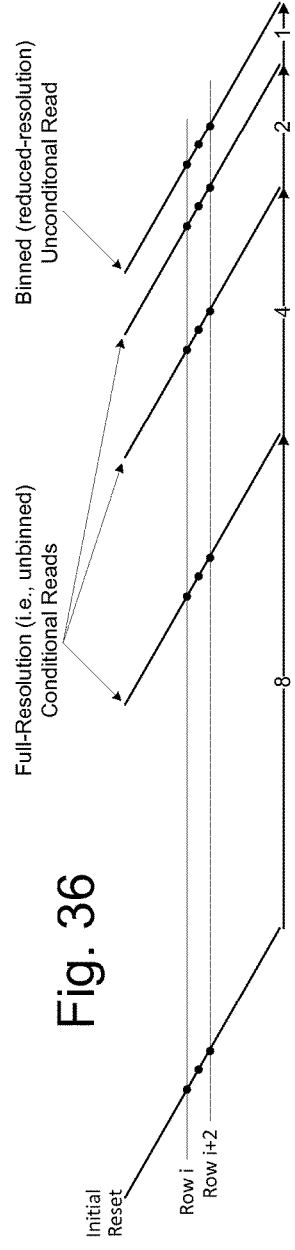

FIGS. 35 and 36 illustrate an exemplary "partial binning" imaging approach (or "hybrid subframe read-out") in which the pixel array is conditionally read/reset in an unbinned, full-resolution mode for all but the final subframe of a given image frame (i.e., operations 911 and 913) and then unconditionally read/reset in a binned, reduced-resolution mode for the final subframe 915. Referring specifically to the embodiment of FIG. 35, the binned and unbinned read-out results may be evaluated as shown at 917 to determine whether a low-light condition exists. If a low-light condition is detected, then a pixel value is generated at 919 for each full-resolution pixel based on values obtained for each binned group of pixels and, optionally, values obtained for neighboring binned groups of pixels. If a low-light condition does not exist (i.e., a bright-light condition exists), then a pixel value is generated for each full-resolution pixel at 921 based on unbinned read-out results and, optionally, values extracted from binned read-out results.

Figure 37:
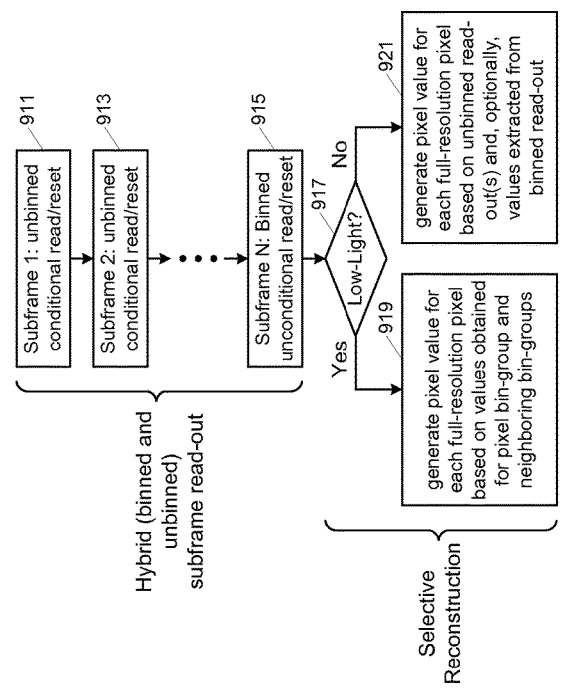
FIG. 37 illustrates qualitative differences between varying image frame read-out/reconstruction modes within a pixel array.

FIG. 37 illustrates qualitative differences between varying image frame read-out/reconstruction modes within a pixel array. As shown, in an unbinned frame read-out mode 931 (i.e., all subframes read out in unbinned mode), full resolution is maintained by definition, but low-light sensitivity is limited as indicated by the SNR (signal-to-noise ratio) below 10 until approximately 70 photon strikes per subframe interval. At the opposite end of the spectrum, in binned frame read-out mode 933 (i.e., all subframes read out in binned mode), spatial resolution is compromised (again, by definition), but the low-light sensitivity is significantly improved, as can be seen by the SNR exceeding 10 starting at approximately 22 photon strikes per image pixel.

In contrast to the fully binned and fully-unbinned image frame read-out modes, the partially-binned modes (935, 937) exhibit improved low-light sensitivity without significant loss of spatial resolution. As shown, SNR drops somewhat as light intensity reaches a crossover between low-light and bright-light conditions in a partial binning mode 935 in which only unbinned subframe read-outs are used for image reconstruction of bright-light scenes (i.e., as there is one fewer subframe worth of image data), while the SNR is maintained at a relatively steady trajectory in a partial binning mode 937 in which all subframe data is used for image reconstruction. Accordingly, while binned image data may be omitted from the reconstruction data set in some embodiments, a number of techniques discussed below seek to estimate full resolution pixel contributions to binned read-out results and apply those estimations in image reconstruction.

FIG. 38 illustrates an exemplary segment of a bin-enabled pixel array together with corresponding color filter array (CFA) elements—collectively, a "CFA fragment 170." In the embodiment shown, individual "full-resolution" pixels are implemented within 4-row by 1-column (4×1) groups of four pixels, with each such quad pixel group having a shared floating diffusion and every other column of quad pixel groups having a switchably shared set of sample and hold elements as generally described above in reference to FIGS. 5 and 6. For ease of reference, same-color pixels within CFA fragment 170 (and the larger pixel array) are referred to as belonging to the same color plane, with green pixels disposed in the same row as red pixels (i.e., green pixels "Gr") being distinguished from green pixels in the same row as blue pixels (i.e., green pixels "Gb") for purposes of binning and image reconstruction. That is, same-color-plane pixels in a given quad pixel group may be charge-binned by executing simultaneous row operations with respect to those pixels, and same-color-plane pixels in neighboring columns (i.e., two columns over in the example shown) may be voltage-binned by switchably coupling their above-mentioned column-shared sample and hold elements after voltage sampling each charge-binned pair to a respective sample and hold element. Altogether, the four charge/voltage bin-capable pixels form a pixel bin group 930 or "bin group" as shown at 927, with the individual pixels of the bin group being referred to as component or full-resolution pixels as shown at 925. A charge/voltage-binned read-out of a given bin group may be viewed as a read-out of a virtual pixel (or virtual binned pixel) centered between the component pixels of the bin group (i.e., "V-Bin Pixel" as shown at the center of bin group 930). Also, in a number of embodiments, each of four neighboring bin-groups 930 (16 full-resolution pixels) form a low-light decision kernel 932 that is evaluated to distinguish between low-light and bright-light conditions, with the interior four pixels of the low-light decision kernel forming a bin-group-bounded pixel set 933. Further, depending on the location of a given full-resolution pixel within the overall pixel array (i.e., at the edge of the array or within the interior of the array) the "color-plane neighbors" of the full-resolution pixel may include pixels within the same bin group and pixels from adjacent bin groups as shown at 928.

As mentioned above, final pixel values within a reconstructed image may be generated according to one of multiple reconstruction techniques, with the selection between different techniques being determined dynamically according to subframe read-out results. FIG. 39 illustrates an example of such selective image reconstruction with respect to a pixel bin group. Starting at 941, subframe read-out results for the full-resolution pixels within a low-light decision kernel (e.g., as shown at 932 in FIG. 38) are evaluated to distinguish between low-light and bright-light conditions. In the specific embodiment shown, for example, an overthreshold determination in a non-final subframe for any pixel within the low-light decision kernel yields a bright-light determination while, conversely, consistent underthreshold determination across all non-final subframe read-outs within the pixels of the low-light decision kernel yields a low-light determination. As shown, in the low-light case (negative determination at 941), the image sensor (or application processor) generates a pixel value for each full-resolution pixel through bi-linear interpolation between surrounding binned pixel values as shown at 943—an operation explained in greater detail in reference to FIG. 43. In the bright-light case, by contrast (i.e., affirmative determination at 941), at 945 the image sensor and/or application processor generates a pixel value for each full-resolution pixel based on unbinned read-out results and an estimated contribution from the subject full-resolution pixel to the corresponding binned read-out (i.e., read-out of bin group of which full-resolution pixel is a component). Note that this exemplary bright-light approach involves combining binned and unbinned read-out results as discussed briefly in reference to FIG. 37. In alternative embodiments or configurations (e.g., established by programmed settings), binned read-out results may be omitted from full-resolution pixel reconstruction.

FIG. 40 illustrates an exemplary approach to combining binned and unbinned read-out results in bright-light reconstruction of full-resolution pixel values. Starting at 951, a predicted (i.e., preliminary estimate) last-frame read-out for each full-resolution pixel in a bin group is generated based on subframe read-out results. In one embodiment, explained below in reference to FIGS. 41 and 42, such predicted values may be generated by determining or estimating a charge accumulation rate within the subject full-resolution pixel and then using that estimate to extrapolate an end-of-frame charge accumulation level. For example, if an overthreshold condition is detected with respect to a subject pixel in one or more subframes, the read-out values obtained for those subframes may be used to determine a charge accumulation rate and thus enable prediction (projection/forecasting) of the charge accumulation level that would have been reached within that pixel at the conclusion of the non-final subframe assuming that the charge accumulation rate remained constant (i.e., linear charge accumulation).

Still referring to FIG. 40, after generating predictions (preliminary estimates) of final-frame read-out values for each of the full-resolution pixels within the bin group, a pro-rata portion of the binned read-out may be allocated to each such full-resolution pixel according to its predicted value (i.e., as shown at 953) to yield an estimated full-resolution final-frame read-out value. That is, designating bin group pixels as A, B, C and D, then estimates of full-resolution final-frame read-outs (EstA-EstD) for those pixels may be determined from their predicted values (PredA-PredD) and the binned read-out value as follows:

$$\text{Est}A = \text{Binned Read-Out} * \text{Pred}A/(\text{Pred}A + \text{Pred}B + \text{Pred}C + \text{Pred}D)$$

$$\text{Est}B = \text{Binned Read-Out} * \text{Pred}B/(\text{Pred}A + \text{Pred}B + \text{Pred}C + \text{Pred}D)$$

$$\text{Est}C = \text{Binned Read-Out} * \text{Pred}C/(\text{Pred}A + \text{Pred}B + \text{Pred}C + \text{Pred}D)$$

$$\text{Est}D = \text{Binned Read-Out} * \text{Pred}D/(\text{Pred}A + \text{Pred}B + \text{Pred}C + \text{Pred}D)$$

Other approaches to estimating full-resolution final-frame read-outs may be applied in alternative embodiments.

FIGS. 41 and 42 illustrate a more detailed example of predicting end-of-frame charge accumulation states within bin group pixels for purposes of estimating full-resolution pixel contributions to binned read-outs. Referring to the exemplary per-pixel charge-accumulation profiles shown in the 8-4-2-1 subframe sequence of FIG. 41, for instance, the solitary pixel reset (overthreshold) event that occurs following the second (4-USF) subframe in profile 956 may be used to determine a charge-accumulation rate and thus extrapolate (predict) the charge-accumulation level that would have been reached over the final two subframes (i.e., 2-USF and 1-USF subframes and thus a net 3-USF exposure interval). Similarly, in the case of profile 955, either or both of the two overthreshold detections at the conclusions of the first and third subframes may be used to determine a charge-accumulation rate and thus a predicted charge accumulation over the final subframe. In one embodiment, for example, the charge accumulation rates indicated by the first and third subframe read-outs may be statistically combined (e.g., weighted averaged) to yield a blended charge accumulation rate for purposes of extrapolating the level of charge accumulated during the final subframe. Alternatively, all but the last of the conditional read-out results may be discarded in determining the charge accumulation rate for final charge prediction purposes (i.e., in this case, determining a charge accumulation rate solely on the basis of the third subframe read-out and the 6-USF interval over which that read-out value was accumulated). Still referring to FIG. 41, in the case of a pixel charge accumulation profile in which no overthreshold condition is detected, a number of different assumptions may be applied to establish a charge-accumulation rate for predicting end-of-frame charge accumulation. In an embodiment in which a bright-light determination requires at least one overthreshold detection within a given pixel set (e.g., low-light decision kernel as described above), it may be useful to assume that the full-resolution pixel for which an estimated final-subframe value is being estimated was at the brink of the conditional read/reset threshold at the conclusion of the penultimate subframe—that is, just below the threshold at the conclusion of the 2-USF subframe as shown by profile 957. In that case, a charge accumulation rate may be estimated based on the read-out value corresponding to the conditional read/reset threshold and collective duration of the non-final subframes and thereafter used to project a final subframe read-out that would have occurred, but for the binned read-out. In alternative embodiments, charge accumulation rates may be estimated based on other assumptions (e.g., charge accumulation has reached only 50% of the threshold level at the conclusion of the penultimate subframe).

FIG. 42 illustrates an exemplary sequence of operations carried out to predict end-of-frame charge accumulation states within the component pixels of a bin group. As shown at 961, if an overthreshold condition was detected during a conditional read/reset subframe (i.e., a non-final subframe in cases where all but the final subframe are subject to conditional read/reset), then at 963 a charge accumulation rate (CAR) is determined from the conditional read-out value or values and intervals over which those values were accumulated. Thereafter, at 967, predictions of full-resolution final-subframe read-out values may be generated by multiplying the charge accumulation rate and a charge accumulation interval that transpired between the read/reset operation and the binned read-out.

Still referring to the embodiment of FIG. 42, if no overthreshold condition was detected with respect to a subject full-resolution pixel during a conditional read/reset subframe (i.e., negative determination at 961), then the charge accumulation rate is estimated based on an assumed charge level at the conclusion of the penultimate subframe. As discussed above, this assumed charge level may be at the threshold (i.e., infinitesimally below the level needed to trigger a conditional read/reset), at 50% of the threshold or any other useful level. At 967, the estimated charge accumulation rate is applied to predict a full-resolution final-subframe readout value, for example by multiplying the charge accumulation rate by the time since the most recent pixel reset operation and thus by the frame interval (or a truncated version of the frame interval if dead-time exists within the subframe sequence).

FIG. 43 illustrates a bi-linear interpolation that may be applied to generate final full-resolution pixel values for the pixels of a bin-group-bounded pixel set following determination of a low-light condition (e.g., where no conditional reset occurred within the pixels of a low-light decision kernel as described in reference to FIG. 39). In the embodiment shown, the four virtual pixels (i.e., v0-v3, which represent binned read-outs for respective bin groups as shown in FIG. 38) that bound pixels $R_0$-$R_3$ of the bin-group-bounded pixel set may be viewed as contributing to each individual bounded pixel (e.g., $R_0$) according to their respective physical distances from that bounded pixel. In one embodiment, for example, virtual pixel v0 is offset from bounded pixel R0 by a unit-less distance {1,1} in each of the X and Y dimensions shown, while, virtual pixels V1 and V2 are offset from is offset R0 by distances [1,3], and {3,1}, respectively, and virtual pixel v3 is offset from R0 by distance {3,3}. Applying each distance as a product of its vector components (i.e., R0 offset from v0=1, from v1=3, from v2=3 and from v3=9), and then weighting the contribution of each virtual pixel to an estimated full-resolution value of $R_0$ in accordance with the inverse of the distance between the virtual pixel and $R_0$ (and normalizing to the smallest weighting) yields a bi-linear interpolation expression for $R_0$ as follows:

$$R_0=(9v0+3v1+3v2+1v3)/(9+3+3+1)$$

Bi-linear interpolation values for pixels $R_1$-$R_3$ may be expressed similarly as shown. Note that, in the embodiment shown in FIG. 43, charge binning is assumed to be additive with respect to binned read-out (while voltage-binning is assumed to effect an averaging of the two charge-binned column read-outs), so that the bi-linear interpolation result is divided by 2 to yield a final value of for a given full-resolution pixel.

Still referring to FIG. 43, in one embodiment, the bi-linear interpolation result is effected by dedicated logic circuitry within the data output path of the image sensor IC. For example, multiplication by three may be effected by a single-bit-left-shift-and-add logic circuit (i.e., effecting the operation (v1<<1)+v1), multiplication by nine may be effected by a two-bit-left-shift-and-add logic circuit (i.e., (v0<<2)+v2) and division by sixteen by a right-shift-by-four logic circuit. In alternative embodiments, a digital signal processor or general-purpose processor (e.g., within the application processor) may perform the bi-linear interpolation upon receiving the virtual pixel values from the image sensor.

Figure 44:
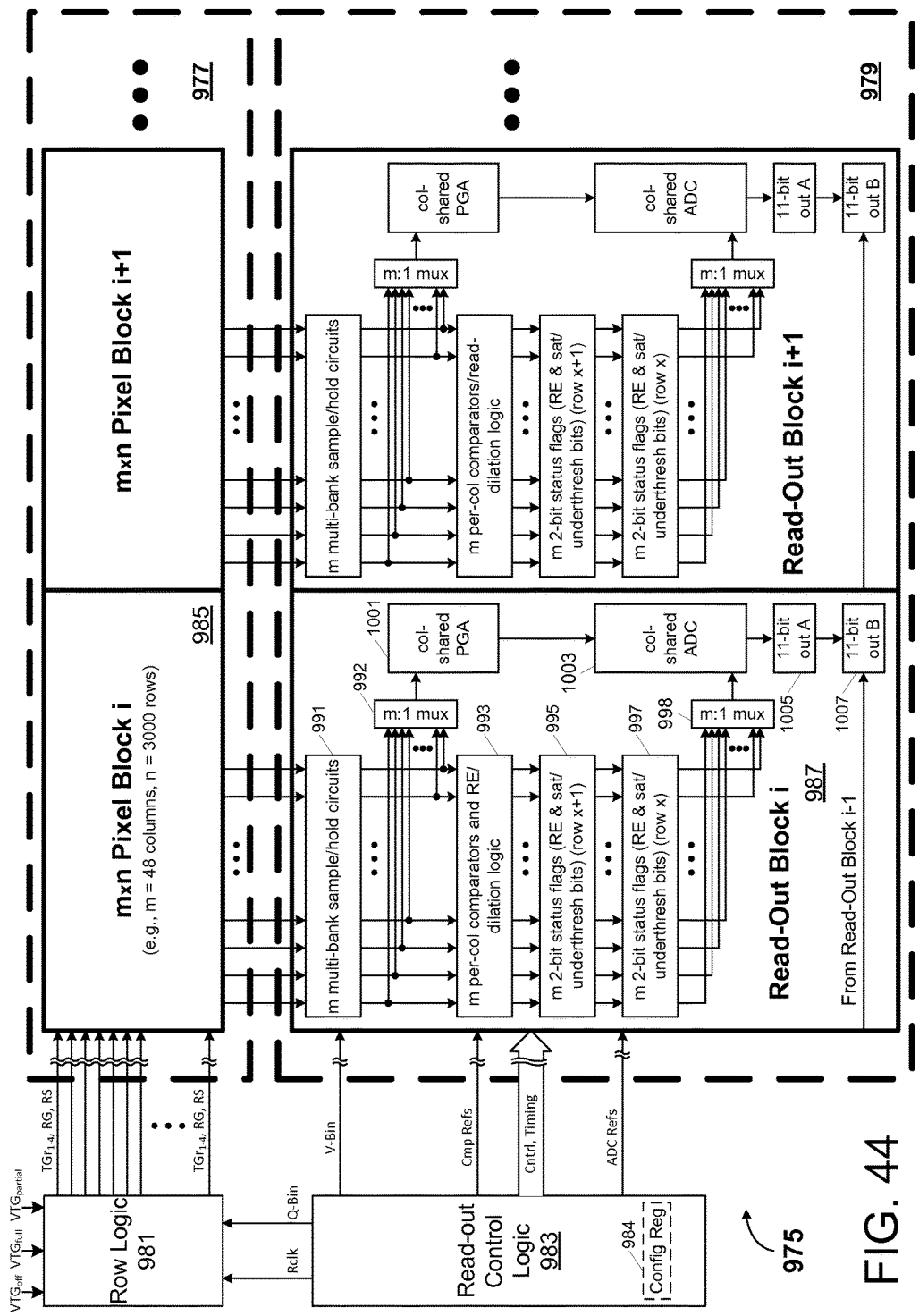
FIG. 44 illustrates an embodiment of an image sensor having a conditional read/reset pixel array, column read-out circuitry, row logic and read-out control logic.

FIG. 44 illustrates an embodiment of an image sensor 975 having a conditional read/reset pixel array 977, column read-out circuitry 979, row logic 981 and read-out control logic 983. In the example shown, pixel array 977 is organized in a number of pixel blocks 985, only two of which are depicted (i.e., pixel block 'i' and pixel block 'i+1'), with each pixel block containing m columns and n rows of pixels (e.g., m=48, n=3000, though other row/column dimensions may apply). Column read-out circuitry 979 is similarly organized in a number of read-out blocks 987 (only two of which are shown), each coupled to receive output signal lines (i.e., data lines) from a respective pixel block 985.

Though not specifically shown, each column of pixel array 977 is populated by shared-element pixels in which every four pixels form a quad pixel cell as described above, for example, in reference to FIGS. 5 and 6. Similarly, though not shown, sample and hold circuitry within each read-out block includes switching elements to enable voltage-binning of same-color-plane pixels in different pixel columns as described in reference to FIGS. 5 and 6. Thus, pixel array 977 may be selectively operated in charge-binned and/or voltage-binned read-out modes during all or selected subframes of an image frame interval in accordance with one or more binning control signals (e.g., "Q-Bin" and "V-Bin") from read-out control logic 983, thereby enabling partial binning operations as described above. In alternative embodiments, the disposition of shared floating diffusion and/or switchably shared sample and hold elements within the pixel and read-out blocks may be different from those shown in FIGS. 5 and 6 (e.g., 2×2 instead of 4×1 quad pixel groups).

Still referring to FIG. 44, row logic 981 outputs a shared row-select signal (RS) and reset-gate signal (RG) to each row of quad-pixel cells, and outputs independent row transfer-gate control signals ($TGr_1$-$TGr_4$) to drain terminals of respective transfer-enable transistors (or directly to transfer-gate terminals in a split-gate embodiment) within individual pixels. Thus, row logic 981 may be implemented generally as described in reference to FIG. 25 (i.e., with one row-select and reset-gate signal per each group of four rows per the bin-capable option described above). In an implementation in which row decoder/driver 305 sequences incrementally through the rows of pixel array 977 (e.g., pipelining reset, integration and progressive read-out operations with respect to the rows of pixel array 977 such that one row is read-out after another), row logic 981 may include circuitry to assert the RG, RS and TGr signals at the appropriate time for each row, for example, synthesizing those signals with respect to a row clock (Rclk) from read-out control logic 983. Alternatively, row logic 981 may receive individual timing signals corresponding to each or any of the RG, RS and TGr signals, multiplexing any individual enable pulse onto the corresponding RG, RS, or TGr lines of a selected row at the appropriate time.

In one embodiment, row logic 981 receives transfer-gate control voltages corresponding to the off, partially-on and fully-on states shown in FIGS. 2, 3 and 4 (i.e., $VTG_{off}$, $VTG_{partial}$, $VTG_{full}$) from an on-chip or off-chip programmable voltage source, switchably coupling each of the different control voltages to a given transfer-gate row line at a deterministic time, for example, as shown in FIGS. 2, 7, 11, 13 and 18A. The $VTG_{partial}$ voltage may be calibrated according to techniques described above in reference to FIGS. 36-42 (with a dark column of reference circuits as shown in FIG. 31 included within pixel array 977 in one implementation) thus compensating for control-voltage and/or performance variations (i.e., non-uniformity) across the pixel array.

Continuing with FIG. 44, each read-out block 987 includes a set of m (per-column) multi-bank sample and hold circuits 991, a corresponding set of m comparators and read-enable/dilation logic circuits 993, m:1 multiplexers 992 and 998, column-shared programmable gain amplifier 1001 and column-shared ADC circuit 1003, all of which operate generally as described above in reference to FIG. 10. In contrast to the double-buffered, column-parallel line memory shown in FIG. 10, however, separate pairs of buffers are provided to store read-out status flags and ADC output values. More specifically, a pair of flag buffers 995 and 997 are provided to double-buffer per-column read-out status flags (i.e., a read-enable bit and an above/below range bit, RE and AB, for each of m pixel columns), with flag buffer 995 storing the status flags for row x+1, and flag buffer 997 storing status flags for row x, thus enabling status flag generation (i.e., threshold-comparison operations) with respect a given row (x+1) while the status flags for the prior row (x) are delivered one after another (via multiplexer 998) to column-shared ADC 1003 to support selective ADC operations as discussed above. Read-out control logic 983 (which may include a configuration register 984 to enable programmable selection of configuration options) outputs comparator references (Cmp Refs), control and timing signals (Cntrl, Timing) and ADC refs (ADC Refs) to the read-out blocks 987, together with the voltage-bin mode signal (V-Bin) mentioned above. Read-out control logic 983 may also output the above-described row clock (Rclk), as well as a charge-bin mode signal (Q-Bin) to row logic 981, thus enabling the sequencing logic therein to assert TGr signals in parallel or staggered fashion according to the specified charge binning mode.

Instead of storing m column ADC outputs in respective storage locations within a line memory (i.e., as in the embodiment of FIG. 10), and then shifting out a sequence of ADC values corresponding to an entire pixel row, a single-column ADC output storage buffer pair 1005/1007 (i.e., an 11-bit storage element in this case to permit storage of a 10-bit ADC value and logic '1' read-enable flag or a logic '0' read-enable flag together with an AB flag) is provided to enable double-buffering of ADC values generated in succession for respective pixel columns. More specifically, output-stage buffer 1007 is provided to store the ADC value for a given pixel column and deliver that ADC value to downstream logic (including the PHY), concurrently with generation of the ADC value for a subsequent pixel column and storage of that subsequent-column ADC value in input-stage buffer 1005. In the embodiment shown, the output-stage buffers 1007 for respective read-out blocks 987 are coupled in an output shift register to enable sequential output of per-block ADC output values (e.g., at a rate of PB times the per-column ADC output rate, where PB is the number of pixel blocks in the pixel array) to downstream logic. Consequently, the stream of ADC output values delivered to downstream logic (including circuitry within an off-chip image processor) are column interleaved, with each set of K ADC output values including single value from each of K pixel blocks (with m sets of K ADC output values being output in sequence). In alternative embodiments, the output-stage buffers or any number of groups of output buffers may deliver output values in parallel to downstream logic instead of delivering one pixel column read-out result at a time.

Figure 45:
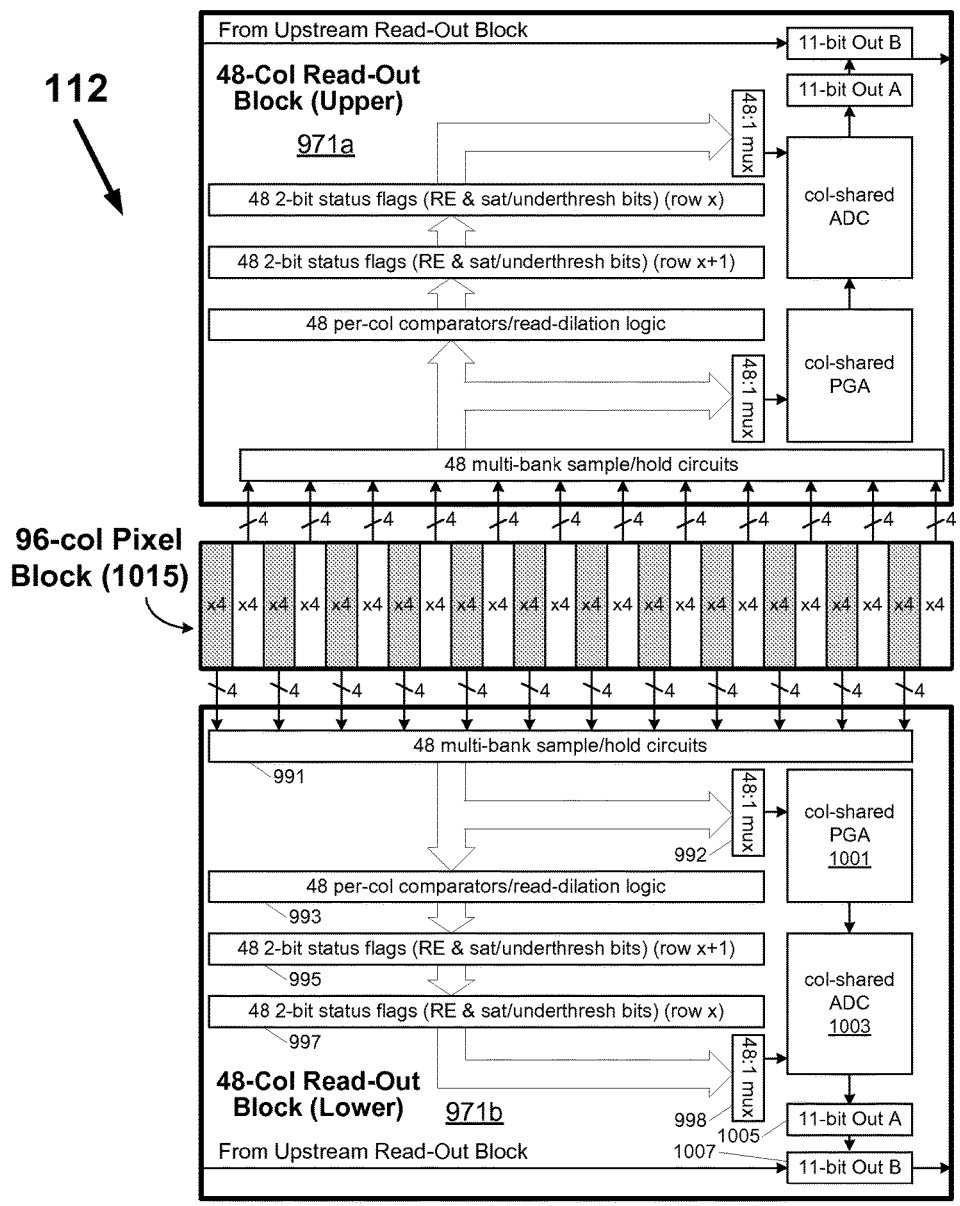
FIG. 45 illustrates an exemplary image sensor architecture in which each pixel block of a pixel array is sandwiched between upper and lower read-out blocks.

FIG. 45 illustrates an exemplary image sensor architecture 112 in which each pixel block 1015 of a pixel array is sandwiched between upper and lower read-out blocks 971a and 971b. In the embodiment shown, pixel block 1015 includes 96 pixel columns, alternately connected to upper and lower read-out blocks every four pixel columns (i.e., four-up, four-down) so that 48 pixel columns are coupled to each of the upper and lower read-out blocks 971a/971b. The four-up, four-down implementation is advantageous for at least some of the disclosed embodiments as it provides a relatively straightforward way to move from column read-outs at the pixel pitch to sample-and-hold elements, etc., laid out at twice the pixel pitch. Other implementations are possible, depending on binning layout, ADC sharing, etc. Each of the upper and lower read-out blocks 971a/971b is implemented generally as described in reference to FIG. 44, thus doubling the net data output rate (i.e., by virtue of the parallel operation of the read-out blocks) and also enabling disposition of PHY (physical interface circuitry) at opposite edges of an integrated circuit. Alternatively, the output buffer stages 1007 of the upper and lower read-out blocks may feed a shared physical output driver (PHY), for example, disposed to the left or right of the pixel array and coupled to receive data in parallel from each of the digital line memories. Additional circuitry (e.g., compression circuitry, reconstruction circuitry, etc.) may be disposed between the output buffer stages and shared or respective PHYs as generally described above. Also, while the upper and lower read-out blocks may be implemented on the same physical die as pixel block 1015 (e.g., at the periphery of the die (sandwiching the pixel block) or in the center of the die between respective halves of the pixel array, the read-out blocks may alternatively be located on another die (e.g., coupled to the pixel array die in a stacked configuration that may additionally include other imaging-related dies).

Dynamically Selected Subframe Sequencing

As discussed above, different subframe sequences may be selected to improve reconstructed image characteristics according to conditions at hand, including enhanced dynamic range for high-luminance scenes. In a number of embodiments, a conditional-read image sensor automatically transitions between subframe sequence profiles (also referred to herein as "scan profiles") having different over-sampling rates in response to imaging conditions, increasing the oversampling rate (i.e., number of subframes per frame) for scenes that require high dynamic range, and reducing the oversampling factor to save power in lower dynamic range scenes.

FIG. 46 illustrates an exemplary imaging sensor embodiment in which the oversampling factor is varied incrementally between a minimum of unity (i.e., "1×," and thus no oversampling) and a maximum of four (4×), though higher oversampling factors may apply. In a number of embodiments, subframe read-out data is evaluated, potentially with other factors (e.g., user input and/or inputs from other sensors, including light-meter, accelerometer, and power-level sensors, including battery-level status, power-source indication), to determine whether to increase or decrease the dynamic range for a given image capture and thus whether to increase or decrease the oversampling factor. In one implementation, for example, an exposure/dynamic-range controller constructs a luminance histogram or per-color histograms using the pixel data acquired for one or more subframes, with a selected number of the most significant bits (MSBs) of the pixel data used to generate a count of the numbers of pixel values at respective luminance/color levels. Thereafter, the histogram(s) is/are compared with selected (e.g., programmably specified) thresholds to determine whether to increase the oversampling factor for higher dynamic range or decrease the oversampling factor to conserve power.

In a conditional-read image sensor, the charge integration interval (or light accumulation period) corresponding to a given pixel value is independent of the subframe in which the pixel value is read-out for any subframe after the initial subframe. Accordingly, determining the net rate of charge accumulation (and thus the luminance) within the subexposure interval corresponding to a given subframe generally involves evaluation of the pixel state assessment for preceding subframes to determine if a read-out occurred and, if not, whether the subject pixel was reset due to saturation (with the eclipse state indicating a form of saturation)—information that may not be readily available at all points within the image capture/reconstruction process. Thus, each value read out of the pixel array during a given frame may be characterized by (i) the point in time at which the read-out event occurs ("read-out point"), generally denominated herein by the subframe in which (or at the conclusion of which) the pixel value is read-out, and (ii) the charge-integration interval for the read-out value. These two characterizing values are generally applied in image reconstruction to determine interpolated pixel values at points in time at which no read-out occurred and/or composite pixel values from multiple read-out events. In some cases, a single event deterministically marks both the read-out point and integration interval, as when a read-out occurs at the conclusion of the first subframe (i.e., integration interval is the subexposure interval accorded to the first subframe and read-out point is the point in time offset from the initial reset by that same subexposure interval), while in other cases determination of the integration interval for a given read-out event involves consideration of pixel state assessed in prior subframes.

FIG. 47A illustrates an exemplary set of pixel charge integration profiles that occur at various luminance levels and the corresponding read-out/reset events given an N:1:1:1 scan sequence (i.e., one long subexposure that spans N unit subframes (N-USF) and three single-USF subexposures). For purposes of explanation in this instance and various embodiments discussed below, the final (or last) subframe read-out in a given scan sequence is assumed to be unconditional, while all non-final subframe read-outs in the sequence are conditioned on read-threshold exceedance. The scan sequence will generally repeat in video or preview modes. In other embodiments, one or more non-final subframe read-outs may be unconditional and/or the last subframe read-out may be conditional (for video applications that can tolerate missing final subframe data on some frames). It should also be noted that these curves represent noiseless and constant luminance and are thus informative as to average behavior. In many actual scenarios, subject motion, operator handshake, and changes in scene illumination (strobes, moving lights, etc.) can cause underthreshold, readout, and saturation to be possible for all subframes for a given pixel, independent of the status of any previous subframe.

Continuing with FIG. 47A, the exemplary saturation and conditional-read thresholds shown ("Sat" and "Thresh," respectively) yield a total of eight luminance ranges, only the lowest seven of which are depicted. At the lowest luminance range (1), no threshold exceedance occurs prior to the final subframe so that only a single read-out is executed. More specifically, the read-out point occurs at the conclusion of the final subframe and the integration interval spans the net exposure time of the complete frame (i.e., the sum of the sub-frame integration intervals) and thus an interval of N+3 unit subframes (N+3 USF). Note that imaging results at this low luminance level remain unchanged as the oversampling factor drops from 4× to 3× to 2× to 1× as read-out data is captured in the final subframe only.

In a very narrow range of luminances (2), just above the lowest range, an exceedance occurs during the penultimate (third) subframe, thus yielding two read-out events during the image frame period: a conditional read at the conclusion of the third subframe for which the integration period is N+2 USF, and then an unconditional read at the conclusion of the final subframe, for which the integration period is 1 USF. A similar narrow range of luminances (3) occurs just above range (2) in which over-threshold detection during the second subframe yields a conditional read-out at the conclusion of that subframe (integration period=N+1 USF) and an unconditional read at the conclusion of the final subframe (integration period=2 USF). As discussed below, the brief charge integration intervals prior to the unconditional final-subframe read-out tend to yield noisy pixel values in the low-light conditions represented by ranges (2) and (3) (i.e., as the charge accumulation may be under or barely above the noise floor), so that, in some embodiments or configurations, it may be advantageous to temporarily raise the conditional-read threshold (e.g., either by changing a partial-read transfer gate voltage or shortening the duration of the partial-read pulse) during the pixel state assessments at the conclusions of the second and third subframes and thus eliminate ranges (2) and (3) in favor of an expanded range (1).

At the luminance range above range (3) or expanded range (1), a threshold exceedance occurs during the long sub exposure, thus yielding a conditional read-out at the conclusion of the first subframe (integration interval=N USF) as well as an unconditional read at the conclusion of the final subframe. In general, this range (4) represents midtone luminance values that predominate in reasonably bright but low dynamic range scenes, as well as many high dynamic range scenes. Note that, even as the luminance approaches the upper end of midtone range (4) (i.e., approaches saturation prior to conclusion of the initial N-USF subframe), exceedance within the next two short charge accumulation intervals is unlikely (i.e., unless the ratio of the saturation and conditional-read thresholds is significantly higher than that shown) so that power expended to conditionally read-out the second and third subframes yields little meaningful image data. Thus, if luminance values in this range predominate the imaging result, the oversampling factor may be reduced (gearing down) to conserve power without significantly impacting the resulting image.

As can be seen by the charge integration profile that occurs at the upper end of range (4), extensions of luminance beyond pixel reset points are represented by dashed lines to illustrate their extrapolated end-of-frame values and thus enable an appreciation of the ascending luminances encompassed by each range. Also, where pixel resets occur, initial-subframe charge integrations corresponding to specific luminances are, in some cases, adjoined to corresponding charge integrations during the subsequent short subexposures to identify the continuation of those profiles within the final short-subexposure subframes. Thus, the exemplary saturation and threshold levels shown enable a relatively narrow band of luminances (5) that yield pixel saturation during the first subframe, but no exceedance during the ensuing two short subframes. Thus, the only read-out for luminances in range (5) occurs at the conclusion of the final subframe (i.e., an unconditional read) following a 3-USF integration interval. It is instructive to note the distinction between ranges (5) and (1) at this point. Both ranges yield a single read-out at the same read point (i.e., conclusion of final subframe), but their integration intervals are significantly different, with range (1) yielding a full-frame (N+3 USF) integration interval and range (5) yielding fractional (3 USF) integration interval.

Luminance range (6) is characterized by pixel saturation during the initial subframe (i.e., no valid read-out at the conclusion of the N-USF subframe) and then a threshold exceedance during the penultimate (third) subframe, and thus encompasses luminance levels that yield threshold exceedance in charge-integration intervals of less than two (but not less than one) unit subframes. Accordingly, luminance range (6) yields a read-out at the conclusion of the third subframe following a 2 USF charge integration interval, as well as an unconditional read-out at the conclusion of the final subframe. Luminance range (7) is similarly characterized by saturation during the initial subframe and encompasses luminance levels that yield threshold exceedance (but do not saturate) in a single-USF charge integration interval. Thus, luminance range (7) yields read-outs at the conclusion of each of the final three (single-USF) subframes. Finally, though not specifically shown in FIG. 47A, luminances above range (7) (i.e., range (8)) yield pixel saturation within a single-USF charge integration interval and thus no valid read-out events.

FIG. 47B is a table illustrating exemplary pixel state assessment results and read-out events for each of the four subframes and eight luminance levels discussed in reference to FIG. 47A (note that other normally unlikely patterns may be possible with scene or camera motion/appearance of bright spots during the capture period). As shown, multiple read-out events occur for each luminance range in which a conditional-read threshold exceedance occurs without pixel saturation during a non-final subframe. Of particular note, are the shaded pixel-state-assessment/read-out events that occur during low-luminance ranges (1)-(3). In the lowest luminance range (1), the conditional-read operations for the initial three subframes yield no pixel values so that the image sensor may be transitioned to a 1× sampling mode without loss of image quality, at least from the standpoint of dynamic range. Similarly, as explained above, the read-out events at the conclusions of the second and third subframes in luminance ranges (3) and (2), respectively, may be suppressed in favor of a consolidated final-subframe read-out (i.e., in effect merging the charge accumulation intervals corresponding to the non-final and final subframe read-out events) to increase the overall low-light charge integration interval and at the same time avoid what would otherwise be a noisy final-subframe read-out. Thus, shifting from 4× to 1× oversampling (i.e., no oversampling) for luminance ranges (2) and (3) not only conserves power, but may improve overall low-light image quality.

Still referring to FIG. 47B, the shaded regions (i.e., mid sub-frame read-out events) during midtone luminance range (4) indicate that mid-subframe readouts may also be omitted without loss of image quality (i.e., shifting from 4× to 2× oversampling), as no pixel read-outs occur at the conclusion of those intervals. Additionally, as can be seen in FIG. 47A, luminance range (5) may be avoided altogether by increasing the relative ratio of the saturation and conditional-read threshold until a luminance that yields saturation during the N-USF subframe is ensured to yield a threshold crossing during a two-USF interval (i.e., collapsing range (5) into range (6)). Further, as the first short subframe yields no read-out in range (6), at least one short subframe read-out may be omitted (i.e., shifting from 4× to 3× oversampling) without loss of image quality. As discussed below, all these considerations are taken into account in an exemplary image sensor embodiment that dynamically shifts between different oversampling factors based on pixel state assessment and image luminance.

FIG. 47C illustrates the various charge integration periods corresponding to valid read-out events within the exemplary luminance ranges of FIG. 47A. As explained above, multiple read-out events occur in luminance ranges other than ranges (1) and (5), with the integration intervals for such ranges shaded (i.e., shown in gray) to emphasize that an additional read-out occurs at the end of the final subframe or, in the case of luminance range (7), at the end of each of the final two single-USF subframes. Also, as shown with respect to luminance range (4), an additional conditional read may occur following the penultimate subframe (following a 2-USF charge integration interval), or even after the first short subframe (following a 1-USF charge interval) in the case of a sufficiently low ratio of saturation to conditional-read threshold.

Figure 48A:
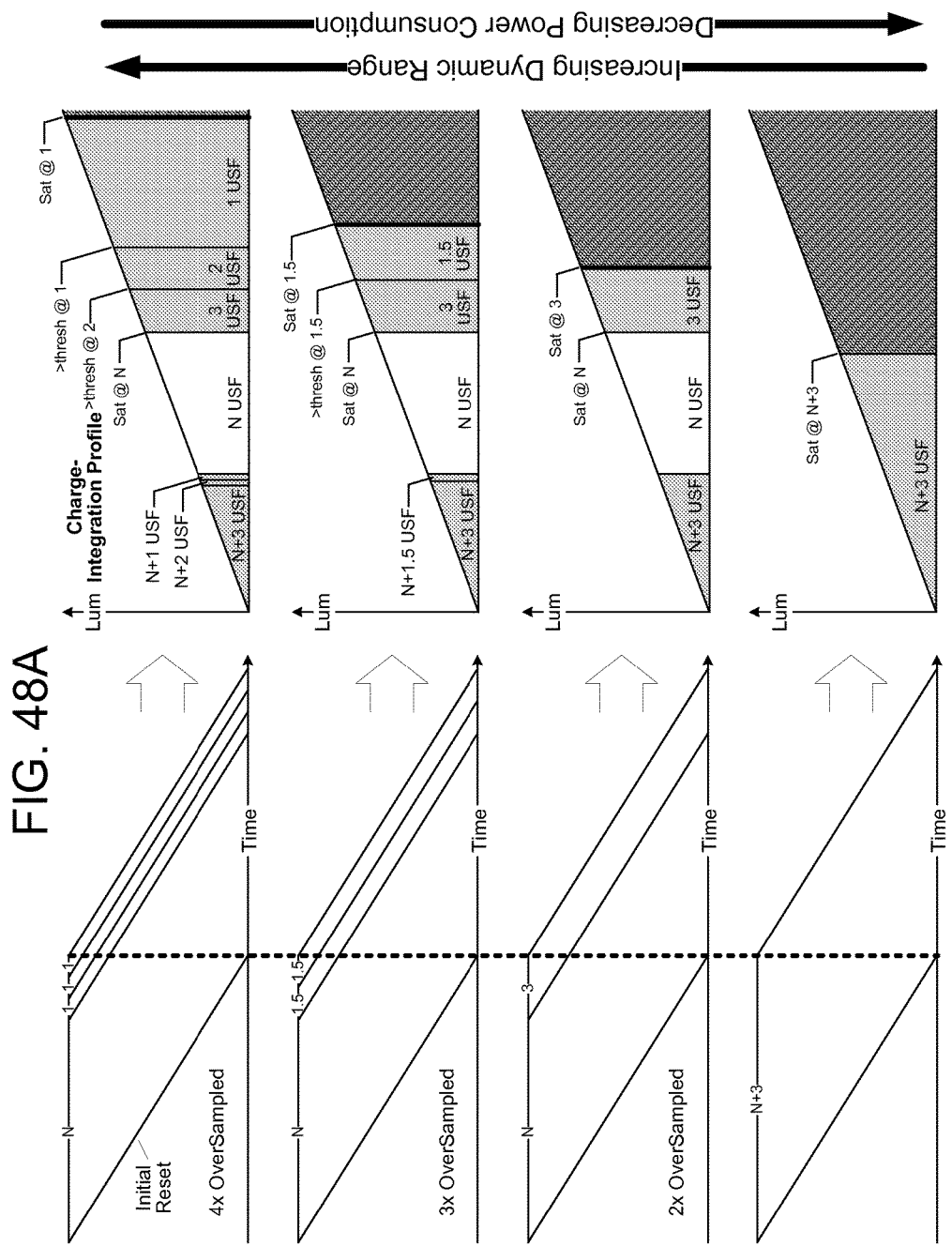
FIG. 48A illustrates the exemplary charge-integration profile of FIG. 47C adjacent an N:1:1:1 scan sequence together with corresponding charge-integration profiles that result as the oversampling factor is dropped from 4× to 1×, while maintaining the same long subframe duration and evenly splitting the remaining frame interval among one or more short subframes for each oversampled scan sequence.

FIG. 48A illustrates the exemplary charge-integration profile of FIG. 47C adjacent an N:1:1:1 scan sequence together with corresponding charge-integration profiles that result as the oversampling factor is changed between 4× and 1×, while maintaining the same long subframe duration and evenly splitting the remaining frame interval (i.e., total frame interval minus N-USF) among one or more short subframes for each oversampled scan sequence (i.e., 4×, 3× and 2× scan sequences). A set of scan sequences that observe these principles (i.e., oversampled sequences having a single-duration long subframe exposure with the remaining exposure interval distributed evenly among a varying number of short-duration subexposures) are referred to herein as a scan family or exposure family and have a number of useful properties including, for example and without limitation:

adjustable number of short subframes to capture highlights;
  midtone luminance range that yields a long subexposure read-out (i.e., after N-USF charge integration interval) remains constant across oversampled scan sequences, simplifying image reconstruction;
  uniform subframe intervals (i.e., 1:1:1 or 1.5:1.5) permit simple, unscaled summation of short subframe read-out values, further simplifying reconstruction; and
  ratio of long exposure duration to sum of short subexposure durations remains constant across oversampled scan sequences (N:3 in this example), simplifying image reconstruction by enabling similar time-based exposure balancing to be applied for each oversampled scan sequence.

Moreover, as can be seen by viewing the scan sequences in order of descending oversampling factor and thus reduced power consumption, low-end luminance ranges fall consistently within the same or similar integration intervals, with loss of sensitivity only at the upper luminance range. Conversely, dynamic range increases (i.e., valid read-out values obtained for wider range of luminances) with escalating oversampling factor and thus higher power consumption. Accordingly, by sliding back and forth along the oversampling scale (i.e., raising and lowering the oversampling factor) according to the dynamic range needed to capture the scene at hand, power consumption can be scaled without significant loss of image quality. This scene-adaptive dynamic range adjustment tends to be particularly beneficial for multi-frame or continuous-frame imaging modes (e.g., video capture, still image preview mode, rapid-sequence still image capture, etc.) as overall power consumption can be substantially reduced without compromising the high-dynamic-range capabilities of the image sensor.

Figure 48B:
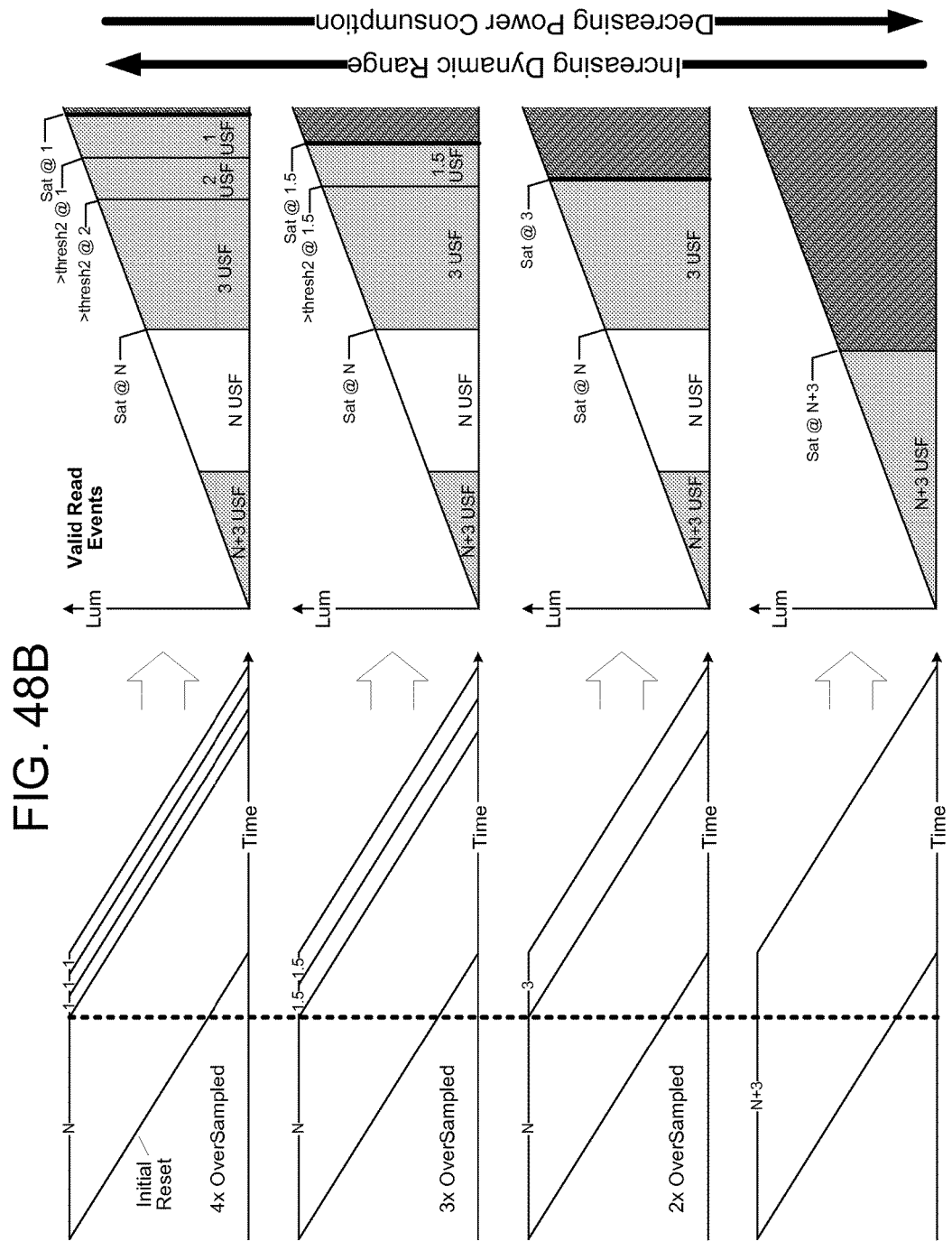
FIG. 48B illustrates charge integration profiles for the same scan sequence family shown in FIG. 48A, but with raised conditional-read thresholds applied at the conclusion of short subframes to avoid low-light conditional-read events.

FIG. 48B illustrates charge integration profiles for the same scan sequence family shown in FIG. 48A, but with higher conditional-read thresholds applied at the conclusion of short subframes (i.e., the second and third subframes in the 4× oversampled scan sequence, and the second subframe in the 3× oversampled scan sequence) to avoid low-collected-charge conditional-read events. By this arrangement luminances falling within ranges (2) and (3) of FIG. 47C are subsumed into range (1), thus avoiding a noisy end-of-frame (unconditional) read-out and extending the low-light integration interval to the full frame. From the perspective of image reconstruction, this arrangement provides the further benefit of homogenizing the low-light integration interval (i.e., to N+3) and read-out point (end of frame) across the oversampled scan sequences, thereby obviating any time-scaling that may otherwise be needed to compensate for read-outs that follow N+2, N+1 and N+1.5 charge integration intervals. As shown in the 4× charge integration profile, the increased conditional-read threshold applied during the second and third subframes extends the luminance ranges corresponding to the 3-USF and 2-USF integration intervals, which may further reduce noise relative to read-outs for single-USF charge-integration intervals, and reduce power by reducing conditional read events. Similarly, in the 3× charge integration profile, the increased conditional-read threshold applied during the second subframe extends the luminance range corresponding to the 3-USF interval which may reduce noise relative to read-outs for 1.5-USF integration intervals, and reduce power by reducing conditional read events.

FIG. 49 illustrates a set of operations that may be executed within a conditional-read image sensor or associated integrated circuit (e.g., reconstruction logic within an image processor or other integrated circuit device coupled to the image sensor) to dynamically scale the sensor's dynamic range and power consumption based, at least in part, on the scene being imaged. Starting at 1201, long and short subframe statistics are gathered in the form of a scene histogram (which can include in-range statistics as well as one or more of saturated, eclipsed, and below-threshold statistics). The histogram statistics are then applied by an exposure controller at 1203 to set the overall integration time (i.e., frame interval), ISO (or gain) and effective lens aperture (if adjustable) to achieve an optimized or otherwise superlative low-light (shadow) exposure. The exposure controller may also specify or define an exposure family (i.e., family of scan sequences) that may be parametrically or explicitly loaded into a register set (or table). Thereafter, at 1205, a scan-sequence controller dynamically switches between scan sequences of the exposure family according to dynamic range requirements and motion (including relative motion caused by camera shake) of the scene at hand, as indicated by the histogram statistics gathered at 1201, and possibly a 1/shutter speed program for motion-stopping ability of the long subframe, camera motion feedback from an accelerometer, the reconstruction processor, user inputs, battery status, etc. FIG. 50 presents an example of this final operation, with the scan-sequence controller increasing the oversampling factor from 1× to 2× (or possibly higher) upon detecting possible motion/shake or as needed to capture luminance values yielding saturation or near saturation in the solitary exposure interval, and decreasing the oversampling factor from 2× (or higher) to 1× upon detection of converse conditions—that is, no motion/shake concerns and determining that, in the shortest subframe, no or a negligible number of luminance values have been detected that would be beyond the dynamic range of the non-oversampled (single-scan) configuration. The scan-sequence controller similarly shifts the oversampling factor up or down between 2×, 3× and 4× oversampled scan sequences, for example, shifting to the next higher oversampling factor in response to luminance values that yield eclipsed or saturation or near saturation of a sufficient number of pixels (i.e., a number that exceeds a programmable setting) in the shortest subexposure, and shifting to the next lower oversampling factor (i.e., from M× to (M−1)×) upon determining that no or a negligible number of pixels would saturate and/or nearly saturate (which number may also be established by a programmed setting) in the lower dynamic-range scan profile. It should be noted that other systems may split the responsibilities of AE and ADR, e.g., a controlling system may determine AE settings and convey these to the image sensor. The image sensor may then, within the bounds of the commanded AE settings, automatically select ADR settings according to criteria such as how well the current dynamic range matches the scene dynamic range, motion, power, etc.

FIG. 51 illustrates an image sensor embodiment that carries out both the exposure-setting and dynamic range scaling operations as described in reference to FIGS. 49 and 50. As shown, the image sensor includes a conditional-read pixel array together with column-read-out logic, row-drivers (and/or sub-frame shift registers) and row sequencing control logic all of which generally operate as described above to enable oversampled (multiple subframe) read-out of pixel values and corresponding status flags. The image sensor additionally includes an auto-exposure/auto-dynamic-range (AE/ADR) controller to carry out exposure control and dynamic range scaling operations based, at least in part, on the pixel values and/or status flags (including eclipsed, saturated, and below threshold) generated by the column read-out logic. In the embodiment shown, the AE/ADR controller includes a control logic circuit that, among other things, outputs a set of scan family parameters to a scan-family register set. In one implementation, individual scan sequence registers within the scan family register set store parameters that, when supplied via multiplexer 1231 to a row sequence controller, enabling the row sequence controller to generate row control signals corresponding to respective scan sequences with escalating oversampling factors (i.e., ranging from 1× (no oversampling) to 4× in the example shown). Thereafter, the control logic generates histogram/status flag statistics that are used to auto-adjust the dynamic range, outputting a dynamic range-select signal to multiplexer 1231 to switch between scan sequences of the family as generally described in reference to FIGS. 49 and 50.

FIG. 52 illustrates an embodiment of a control logic circuit that may be used to implement the control logic of FIG. 51. As shown, pixel readout status flags ("Flags") and pixel values are supplied to a histogram constructor, which in turn supplies histogram statistics to an auto-exposure (AE) controller and to an auto-dynamic-range (ADR) controller. The AE controller generates control signals based at least in part on the incoming histogram statistics to set the overall exposure time, aperture (i.e., for camera's that have a controllable aperture) and ISO gain, and outputs a corresponding set of scan family parameters to be loaded into the scan family register set. The ADR controller similarly evaluates the incoming histogram statistics (which may include the same and/or different sets of statistics than those relied upon by the AE controller) to generate the dynamic range selection signal (DR Sel) and thus enable run-time, scene-responsive scaling of the dynamic range, switching to lower oversampling-factor scan sequences when the histogram statistics indicate relatively low-light scenes (thus conserving power) and to higher over-sampling scan sequences when the histogram statistics indicate higher luminance conditions and thus a need for higher dynamic range. The rules for adjusting AE/ADR can be controlled by programmable parameters such as threshold levels for defined comparison operation, e.g., as can be stored in a register set accessible to the control logic.

Figure 53:
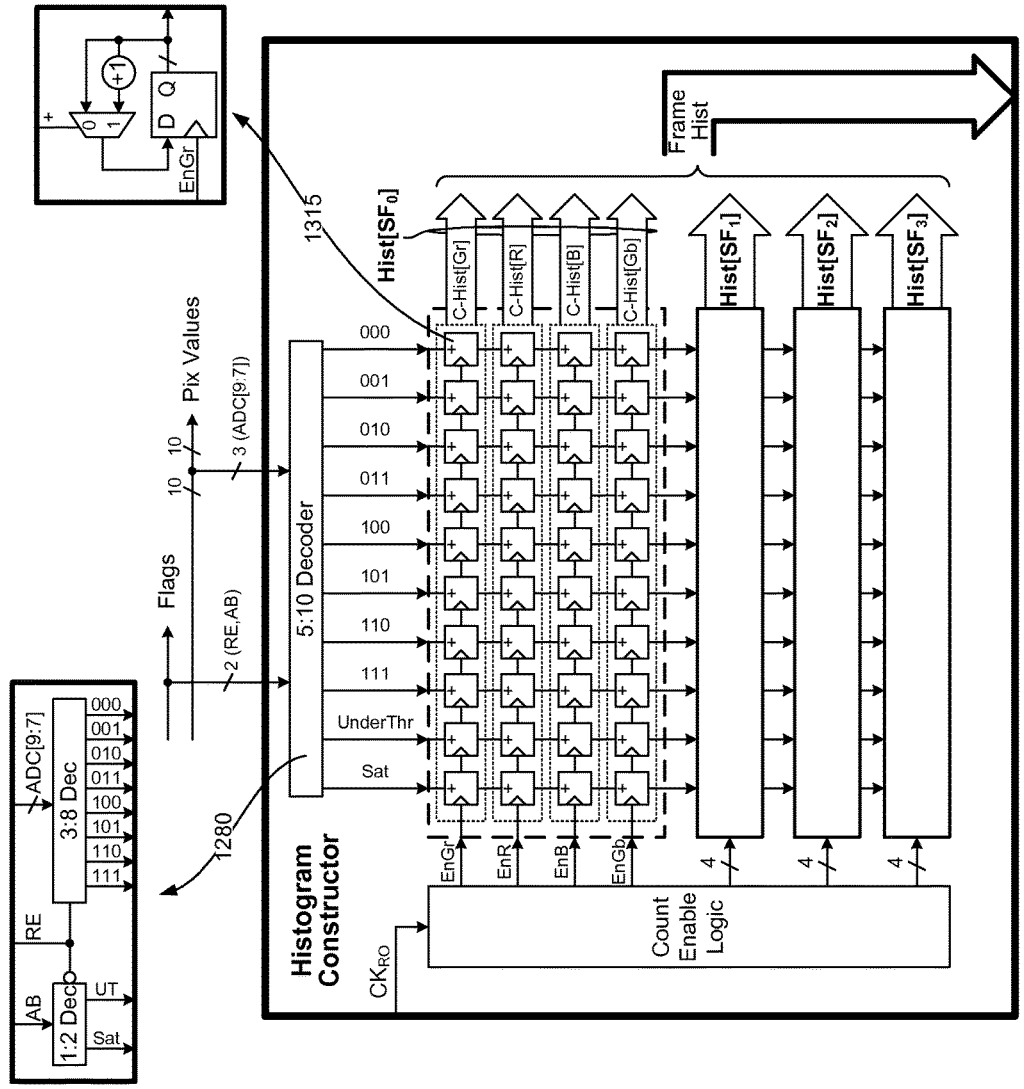
FIG. 53 illustrates an embodiment of a histogram constructor that may be used to implement the histogram constructor of FIG. 52.

FIG. 53 illustrates an embodiment of a histogram constructor that may be used to implement the histogram constructor of FIG. 52. In the implementation shown, the histogram constructor receives a number of the most significant bits (MSBs) of each pixel value (i.e., ADC[9:7] and thus the three most significant bits of a 10-bit pixel value in this example), together with a corresponding pair of pixel-state flags, including a read-enable bit (RE) and above/below-range bit (AB) having the meanings discussed above. The histogram constructor also receives a read-out clock signal ($CK_{RO}$) that marks the delivery of each new pixel value (i.e., the MSBs thereof) and status flag pair, thus enabling deterministic association of each incoming pixel value and flag pair with a given pixel row and column (and thus with a given color plane) and subframe.

Still referring to FIG. 53, each incoming 3-bit pixel value and status flag pair collectively form a 5-bit tuple which is provided to a 5:10 decoder. In one embodiment, the 5:10 decoder is implemented by a 1:2 AB-bit decoder and 3:8 pixel value decoder as shown in detail view 1280. As shown, if the incoming RE bit indicates a valid pixel read-out (i.e., RE=1 in the example depicted), then the 3:8 decoder is enabled to raise one of eight count-enable outputs according to the luminance level indicated by the three-bit pixel value. Conversely, if the RE bit indicates that the pixel read-out is invalid (i.e., RE=0), the 1:2 decoder asserts either an under-threshold count-enable signal (UT or UnderThr) or saturation count-enable signal according to the state of the AB bit. Thus, for each incoming 5-bit tuple, 5:10 decoder asserts one of ten count-enable outputs to enable the specified luminance level, saturation event or underthreshold event to be counted within an appropriate event counter within color-plane and subframe distinguished histogram counter banks. Note that more or fewer MSBs of the sensor-generated pixel values may be supplied to the histogram constructor in alternative embodiments to effect finer or coarser statistics gathering. Also, the saturation and/or underthreshold counts may be omitted in alternative embodiments, or supplemented with a dedicated eclipse-event counter.

In the embodiment shown, count-enable logic enables a selected histogram counter bank according to the subframe and color plane association indicated by a read-out clock count. For example, if a row of alternating green and red pixel values is streaming into the histogram constructor, the count enable logic alternately asserts the EnGr and EnR signals to increment the appropriate event counter (i.e., as selected by the one-hot one of the ten count-enable signals) within the Gr (green/red) and red histogram counter banks. When the read-out clock count indicates that the end of the Gr/R row has been reached for a given subframe, the count enable logic begins alternately asserting the EnB and EnGb signals to increment the appropriate event counter within the blue and green/blue histogram counter banks the next time that subframe is revisited. Similarly, when the read-out clock count indicates that the end of a subframe row has been reached, the count-enable logic begins asserting the select signals for the histogram counter banks of the subsequent subframe for the next row's worth of pixel values. At the conclusion of an image frame, the histogram results may be transferred to an output buffer to free the histogram counter banks to generate statistics for a subsequent frame. Individual event counter elements within a given histogram counter bank may be implemented as shown in detail view 1315, though other implementations may also be used, including implementations in which a shared incrementing element is used for event counters within two or more histogram counter banks. Also, while not specifically shown, the output buffer may include accumulation circuitry to add frame statistics to those from one or more preceding frames, or to add selected bins together for threshold comparisons.

Motion Detection and Blur Mitigation

Figure 54:
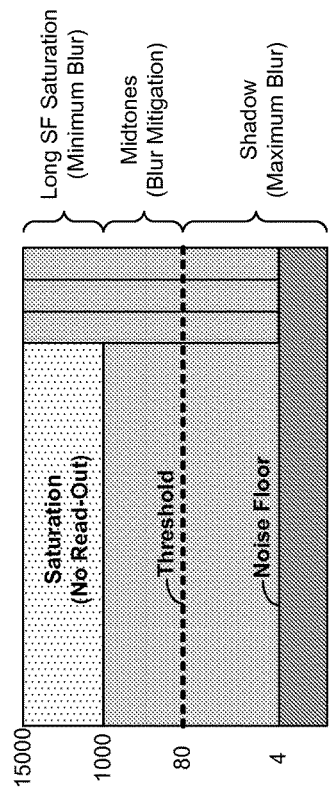
FIG. 54 illustrates a photoelectric charge-integration range in log scale, showing an exemplary noise floor, conditional-read threshold, and saturation threshold.

FIG. 54 illustrates a photoelectric charge-integration range in log scale, showing an exemplary noise floor (a data number of 4, representing a total noise figure due to shot noise, read noise, ADC noise, etc.), conditional-read threshold (80 data number), and saturation threshold (1000 data number). In terms of motion in a scene, image blur becomes more pronounced as the charge-integration interval (i.e., net exposure interval) increases, so that the maximum blur occurs in low-light conditions that yield valid read-out values only after the entire frame interval has transpired (e.g., luminance level (1) in diagram 55A, though luminance levels (2) and (3) may yield even worse results due to the unconditional read near the noise floor). Conversely, the minimum blur occurs when the long subframe saturates (i.e., pixels saturate during the N-USF subexposure), as the only available image data is drawn from relatively short subexposures which mitigate blur by definition relative to the blur of the long subexposure. While the image blur within the extreme low-light conditions could be mitigated through introduction of forced shorter-exposure reads, the image quality enhancement may be limited, as such forced short-exposure reads will generally involve sacrifice of already limited charge accumulation data. Similarly, except for further shortening the short-exposure subframes (which is an option through scan family definition as described above), blur mitigation options are limited with respect to the bright-light conditions that saturate the long-exposure subframe. For the midtone luminance range, however, both long and short subframe read-out values are available, thus making it possible to detect object motion (including relative motion caused by camera movement) that occurs during the frame interval and to mitigate blur that would otherwise be caused by that motion in a single-capture (single-shot) image.

Building on the exposure family (scan family) principles described above, in a number of embodiments, pixel values read-out during two or more uniform short subexposure intervals are summed to yield a composite short-exposure, with the composite short exposure combined in turn with pixel values from a long subexposure in a two-subframe (or two-frame) reconstruction. This approach is shown generally in FIG. 55 in the context of a family of scan sequences each of which includes, respectively, a single 3-USF subexposure, two 1.5-USF subexposures or three 1-USF subexposures such that the net fraction of the frame interval devoted to short subexposures remains constant (i.e., 3/(N+3)) across the exemplary set of scan sequences shown. As shown, a summation logic circuit sums the pixel values read-out following each of the three 1-USF subframes when the N:1:1:1 scan sequence is selected, and sums the pixel values read-out following each of the two 1.5-USF subframes when the N:1.5:1.5 scan sequence is selected. No summation is required when the N:3 scan sequence is selected, with the pixel-values read-out following the 3-USF subframe being passed directly to the two-frame reconstruction module. As explained, the net duration of the short-exposure subframe output from the summation block is 3-USF or N+3-USF regardless of the specific scan-sequence selected. In the case of a non-oversampled scan sequence, the two-frame reconstruction may be bypassed altogether.

Figure 55:
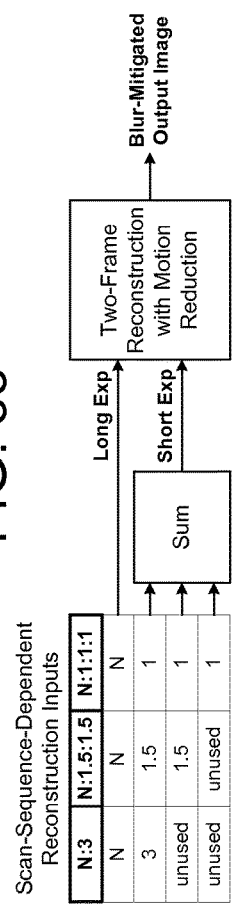
FIG. 55 illustrates summation of short-exposure pixel values in the context of a family of scan sequences each of which includes, respectively one, two or three short subexposures.

Still referring to FIG. 55, one challenge presented within the two-frame reconstruction block stems from the variability of the time interval over which pixel values sampled at the end of the incoming short exposure subframe (i.e., the composite output from the summing logic) were accumulated. That is, as explained above, the read-out point and charge integration interval within the conditional-read image sensor are independent of one another for all but the initial subframe, so that combining the long exposure and short exposure images based on fixed exposure time ratios may lead to erroneous results in the finalized output image, in other than static image regions. On the other hand, the presence of both long and short exposure values and/or associated status flags, may be used to guide reconstruction of the finalized image and also to detect and compensate for motion in the scene. In the embodiment of FIG. 55, for example, the two-frame reconstruction module balances the incoming long and short exposure values, and then merges the balanced exposure values in accordance with a luminance-indexed difference (or closeness) parameter to mitigate blur within the finalized output image.

Figure 56:
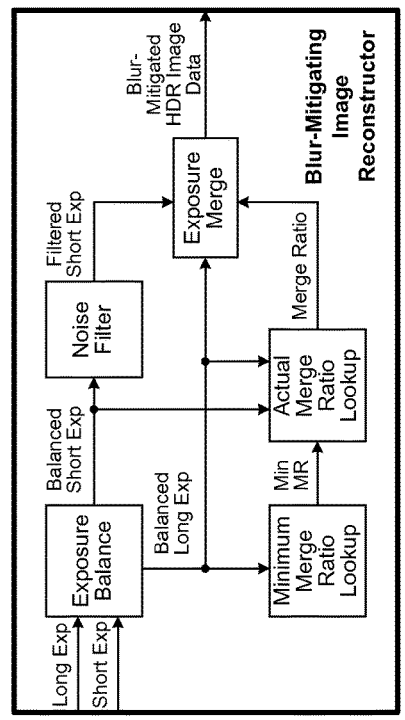
FIG. 56 illustrates an embodiment of a blur-mitigating image reconstructor that may be used to implement the two-frame reconstruction module of FIG. 55.

FIG. 56 illustrates an embodiment of a blur-mitigating image reconstructor that may be used to implement the two-frame reconstruction module of FIG. 55. As shown, the image reconstructor receives pixel values corresponding to a long exposure (e.g., values read-out and accumulated after an initial N-USF subexposure) and a "short" exposure (e.g., values read-out after one, two or three relatively brief subexposures and, in the case of plural subexposures, summed to yield a composite short exposure value) and thus constitutes a "two-frame" reconstruction module as the pixel values from each of the long and short exposures may be viewed as individual frames, despite their acquisition within respective subframes of a single frame interval. As discussed previously, with an N:3 conditional subexposure sequence (with the 3 USF interval spanning, for example, a single subexposure of 3 USF duration, two subexposures of 1.5 USF duration or three subexposures of 1 USF duration), the summed short exposure potentially contains pixels integrated for a net N+3 USF duration (i.e., the entire frame interval) as well as pixels integrated for only a 3 USF duration, whereas the long exposure only has valid pixels integrated for an N duration.

Initially pixel values and status flags for the long and short exposures (or other information from which valid, under-threshold, and saturated pixel status may be determined) are supplied to an exposure balancing unit which, in turn, outputs balanced pixel values for the long and short exposures (i.e., "balanced long exposure" and "balanced short exposure") to downstream logic components, including a short-exposure noise filter, a minimum-difference lookup unit, an actual-difference lookup unit and exposure merging logic. The functions of each of these components are described in further detail below with respect to FIGS. 57-61.

FIG. 57 illustrates an exemplary exposure balancing operation carried out within the exposure balancing unit of FIG. 56. In the embodiment shown, the exposure balancing logic identifies long exposure pixels for which no read-out value was obtained (i.e., RE=0 or pixel value is zero) and shifts a portion of the corresponding short-exposure pixel value from the short exposure pixel value to the long-exposure pixel value, thus estimating the values that would have occurred within the long and short exposures if an unconditional read-out had been executed following the long (N-USF) subexposure. Thus, for each pixel T, the pixel value from the long exposure ("long_exp[i]") is evaluated at 1419 to determine if an under-threshold condition was detected at the conclusion of the long subexposure. In the example shown, zero-valued pixel values are assumed to indicate under-threshold determination, though underthreshold status can also be determined by evaluating the RE and AB flag bits, if available. If a valid or saturated pixel value was obtained for the long-exposure (i.e., negative determination at 1419), then no estimation of the long-exposure pixel value is necessary (actual data is available) so that the incoming long and short exposure values are output as the balanced long and short exposure values, respectively (i.e., as indicated by the assignments in operations 1421 and 1423). By contrast, if no valid pixel value was obtained for the long-exposure value (affirmative determination at 1419), then a transfer ratio ("xfer_ratio") indicative of the proportion of the pixel value to be transferred from the short exposure pixel value to the long exposure pixel value (i.e., the transfer ratio indicating the desired ratio between the long and short pixel values) is determined in operations 1431, 1433, 1435 and 1437, and then multiplied with the short exposure pixel value at 1439 to yield the balanced long exposure. The proportion of short exposure pixel value allocated to the balanced long exposure is then subtracted from the short exposure pixel value at 1441 to yield a balanced short exposure pixel value and complete the transfer for that pixel.

Still referring to FIG. 57, in the absence of motion, non-constant lighting, or other distortion effect, the proportion of the short exposure pixel value to be transferred to the long exposure pixel value may be determined as a ratio of the long exposure duration to the overall frame time—a time ratio determined as shown in operation 1433 (note that this value may be constant for a given scan family and thus may be available as a fixed parameter instead of being repeatedly calculated). Where motion occurs, however, it is possible that the luminance level has increased at some point during the frame so that applying the time ratio will yield an estimated long exposure pixel value greater than the conditional-read threshold; an unduly high estimate in view of the fact that no conditional read took place in fact. Thus, in the embodiment of FIG. 57, if the time ratio is greater than a threshold ratio that would yield the conditional-read threshold (i.e., greater than thr_ratio, which is the conditional-read maximum-below-threshold value divided by the short exposure pixel value as shown at 1431), then the threshold ratio is selected as a local transfer ratio in operation 1435 (i.e., the minimum of the two ratios is selected as shown). Thereafter, at 1437, the finalized transfer ratio is determined as the minimum of the local ratios for a 3×3 neighborhood of adjacent pixels centered about the subject pixel (i.e., subject pixel at location $p_5$ within the 9-pixel neighborhood as shown at 1438), a function referred to herein as an "erode" as it serves to smooth the pixel values within a locale. Note that in an exposure program that forces an unconditional read at the end of a long subexposure, exposure balancing is unnecessary. Also, in such a case it may be possible to reduce the minimum blur ratio to zero and forego the minimum merge ratio lookup as well.

FIG. 58 illustrates an exemplary embodiment of the noise filter applied to the balanced short exposure within the two-frame reconstruction logic of FIG. 56. As shown, balanced short-exposure values corresponding to a same-color-plane neighborhood of nine pixels (which span a 5×5 multi-color-plane pixel region, as opposed to the immediate nine pixel neighborhood shown in FIG. 57 element 1438 and FIG. 59 element 1472) are applied as the filter input, with all input pixel values except those that differ from the subject pixel by more than a predetermined (or dynamically calculated) sigma value being averaged to produce a final filtered pixel output. More specifically, as shown in exemplary pseudocode listing 1460, count and sum values (each of which is initialized to zero in line 10) are incremented and accumulated at lines 40 and 50, respectively, for each pixel value that differs from the subject pixel (p5) by not more than sigma (a determination established by 'if' statement 30), thus producing a sum of all pixel values within sigma of the subject pixel and a count of the number of such pixels. As shown at line 80, the sum is divided by the count to produce the sigma-filtered average. In one embodiment, sigma is determined as a function of the value of the subject pixel, though sigma may alternatively be determined without regard to the value of the subject pixel or based on values of one or more neighboring pixels in addition to or instead of the value of the subject pixel.

FIG. 59 illustrates an embodiment of the minimum merge ratio lookup of FIG. 56. This lookup operation is also referred to herein as a luminance-indexed lookup as the luminance indicated by the balanced long exposure value for the subject pixel and possibly for neighboring pixels is used to determine a minimum expected merge ratio between balanced long and short exposure values. Thus, in the particular embodiment shown, luminance is approximated for a 3×3 neighborhood of balanced long-exposure pixel values at 1471 using the following luminance calculation:

Approximated Luminance=0.5*$G$+0.25*$R$+0.25*$B$=$Gr$/4+$Gb$/4+$R$/4+$B$/4

The spatial application of the foregoing calculation is illustrated at 1472 and applies for each position within a Bayer pattern. As shown at 1473 and 1474, the approximated luminance value is applied to a minimum merge ratio table to lookup a minimum merge ratio value for the subject pixel.

FIG. 60 illustrates an exemplary actual-difference lookup operation carried out using the balanced short and long exposure values and the luminance-indexed minimum merge ratio value output from the minimum merge ratio lookup unit. As shown, for each subject pixel 'i', a local merge ratio value is initialized to zero at 1801. If the balanced long exposure pixel value exceeds the saturation threshold (as may be indicated by an encoding of the pixel value itself and/or from the AB status flag), then the local merge ratio value remains zero and is applied within a 3×3 erode function at 1815 (i.e., a local minimum determination as discussed in reference to FIG. 57) to yield a final, output merge ratio value (thus saturated long exposure pixels result in a 3×3 surround where only short exposure values will contribute to the final image). Otherwise, at 1805, the long exposure value is scaled by the ratio of long and short exposure durations to yield a scaled long exposure value (sc_long_exp). At 1807, an actual difference table is indexed with the balanced short exposure to retrieve an allowed difference value for that pixel intensity and, at 1809, the absolute value of the difference (i.e., difference magnitude) between the balanced short exposure and scaled long exposure is determined. Preferably, noise filtering is performed on both the balanced short exposure and scaled long exposure values prior to calculation in order to better the comparison. For instance, a local 3×3 neighborhood of like-color pixels in each image can have a blur filter applied (with similar weights as those shown in FIG. 59) prior to calculation. At 1811, a raw difference value is generated based on the ratio of the difference magnitude and the allowed difference value, and at 1813, the raw difference value is clipped to a range between unity (1) and the minimum difference value to yield a finalized local difference value. Thereafter, at 1815, the 3×3 erode function is applied as described above to yield the output difference value.

FIG. 61 illustrates an exemplary exposure merge operation carried out using the filtered short exposure value, balanced long exposure value and merge ratio value output from the actual merge ratio lookup unit. As shown, the exposure merge sums the filtered short exposure value with the balanced long exposure scaled by the incoming merge ratio value, with the exposure value sum being further scaled by the ratio of the frame duration (i.e., sum of short and long exposure durations) and a sum of the short exposure duration and a difference-scaled long exposure duration. Various other exposure merging functions may be implemented in alternative embodiments. The conceptual result of this merging approach is to rely more heavily on the long exposure when the short exposure is noisy, while relying less on the long exposure when the difference in scaled intensity between the two exposures is more than would be expected for random noise effects.

FIG. 62 illustrates an alternative scan sequence family in which the long subexposure may be split into medium-duration subexposures, in this case transitioning from a relatively long 10-USF subexposure to two 5-USF subexposure durations. As shown, the two 5-USF subexposures may be summed in a summing module (e.g., in generally the same manner as described for short subexposures in reference to FIG. 55) thus enabling the two-frame reconstruction logic to remain intact.

In an alternative embodiment, the summing block for the medium-duration subexposures is omitted (or bypassed) and two separate sets of merge tables (i.e., to enable minimum merge ratio and actual merge ratio lookups for purposes of blur mitigation) are provided, one set for the last-captured 5-USF subframe (i.e., subframe 2 in the 5:5:1:1 and 5:5:2 cases) and another set for the first-captured 5-USF subframe. The two-frame reconstruction module may then merge the short-subexposure data and last-captured medium-subexposure data as generally described above if the corresponding merge ratio lookups indicate sufficiently close image values and then repeat the merging operation for the first-captured medium subexposure based on the merge ratio lookups in the tables for that subframe. Alternatively, each of the merges may be carried out with respect to the short subframe (or sum of short subframes), either sequentially or in parallel. As in embodiments described above, the final subframe read-out in each of the scan family members shown in FIG. 62 is assumed to be unconditional, while all non-final subframe read-outs are conditional. As in all embodiments described herein, any or all of the conditional read-outs may be unconditional in alternative implementations or selected operating modes.

Figure 63:
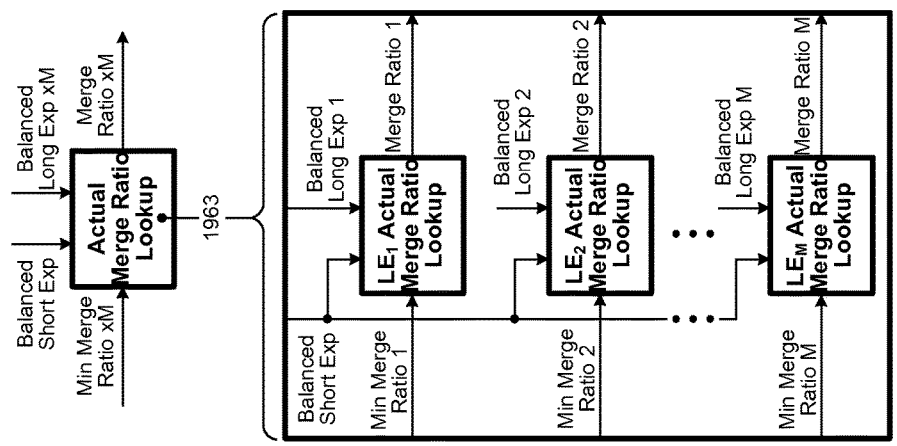
FIG. 63 illustrates an alternative implementation of the actual merge ratio lookup function in an embodiment or configuration that includes multiple long or medium exposure subframes.

FIG. 63 illustrates an alternative implementation of the actual merge ratio lookup function in an embodiment or configuration that includes multiple long or medium exposure subframes (e.g., 5:5:1:1 as discussed above, or 1:4:4:4, 6:6:1:1, etc., in which the individual subframes may be conditionally or unconditionally read). As shown, the actual merge ratio lookup module receives the balanced short exposure as in the embodiment of FIG. 60, but receives multiple (M) balanced long exposures (i.e., the pixel values therefor) and a corresponding number (M) of minimum merge ratio values, each of which may be generated as shown in FIG. 59 for a respective one of the M balanced long exposures. As shown in detail view 1963, the actual merge ratio lookup includes a set of component merge ratio lookups, each to carry out an actual merge ratio lookup with respect to the balanced short exposure based on a respective balanced long exposure/minimum merge ratio pair. Each component lookup operation may be performed generally as shown in FIG. 60, though a different actual-merge-ratio lookup table may be applied with respect to each balanced long exposure (i.e., a first lookup table $LE_1$ for balanced long exposure 1, a second and different lookup table $LE_2$ for balanced long exposure 2 and so forth). Though depicted as being carried out in parallel, the component merge ratio lookup operations or any subgroup thereof may be instead executed sequentially in alternative embodiments or configurations.

Figure 64:
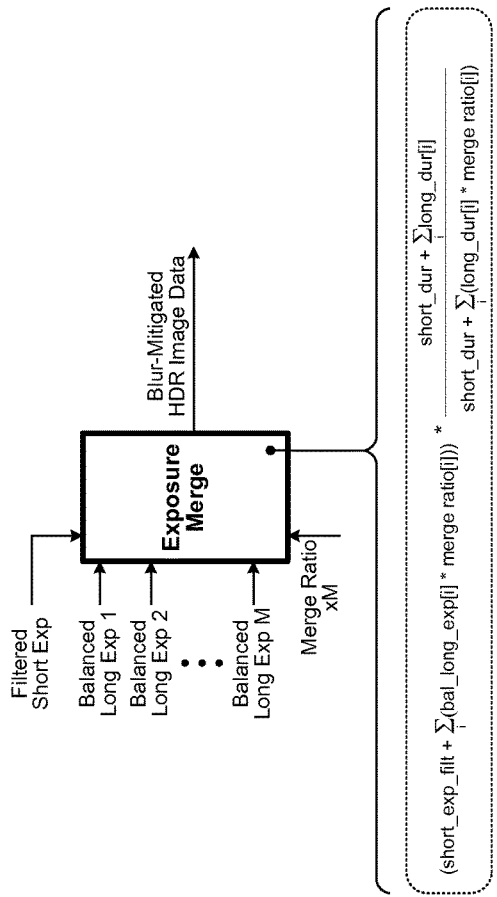
FIG. 64 illustrates an embodiment of an exposure merge function to be applied in combination with the multi-component actual merge ratio lookup of FIG. 63.

FIG. 64 illustrates an embodiment of an exposure merge function to be applied in combination with the multi-component actual merge ratio lookup of FIG. 63. The exposure merge function receives pixel values for the filtered short exposure and the M balanced long exposures, and also receives M merge ratio values, one for each of the balanced long exposures. In the embodiment shown, the exposure merge function generates a sum of the products of the balanced long exposures and their respective merge ratios (e.g., a multiply-and-accumulate operation carried out for each balanced long exposure and corresponding merge ratio) and adds that sum of products to the pixel values for the filtered short exposure to produce a net pixel value sum. The exposure merge function scales the net pixel value sum according to the ratio of the overall frame time (i.e., the short duration (which itself may be a sum of short durations) added to the sum of the long durations divided by the sum of the short duration and a merge-ratio-scaled sum of long durations. Other merge functions may be applied in alternative embodiments.

Balancing Noise and Motion-Blur Mitigation

Figure 65:
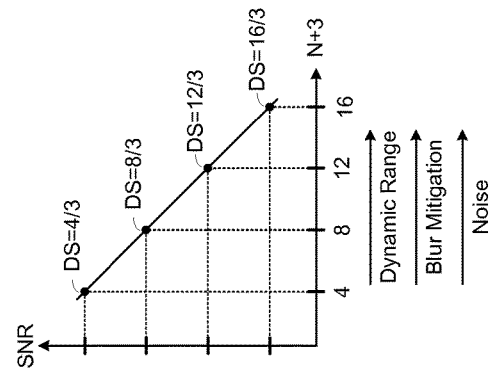
FIG. 65 illustrates an exemplary relationship between SNR and scene luminance.

In a number of image sensor embodiments, ISO-gain is increased as scene luminance drops so that full-scale (or near full-scale) ADC output is maintained despite the lower light level—in effect, increasing low-light sensitivity. The increased gain comes with a cost, however, as noise is also amplified, reducing signal-to-noise ratio (SNR) as scene luminance drops (and ISO gain is increased) as shown in FIG. 65. This inverse proportionality between SNR and ISO gain has implications for blur-mitigation choices in the two-frame reconstruction approach described above.

Figure 66:
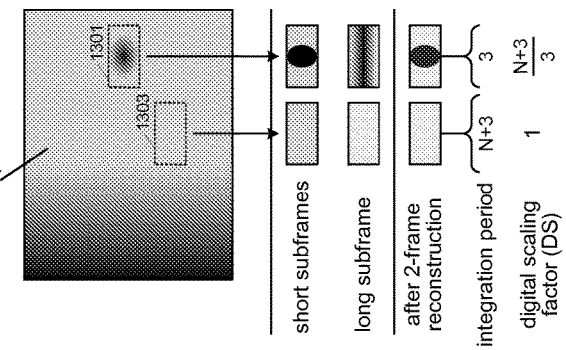
FIG. 66 illustrates a scene to be captured in an N-1-1-1 subframe sequence, showing regions and with and without object motion.

FIG. 66 illustrates a scene to be captured in an N-1-1-1 subframe sequence, showing regions with and without object motion at 1301 and 1303, respectively. Referring first to region 1303 (no object motion during capture interval), the composited short subframes (i.e., 1+1+1 and thus 3 USF) yield a result substantially similar to that of the long (N USF) subframe, so that the short and long subframe results may be summed to produce reconstructed output pixels having a net integration period of N+3 (i.e., light is collected for the entire frame interval). By contrast, in object-motion region 1301, the composited short subframes yield a stop-motion effect relative to the more blurred result in the long subframe (i.e., by virtue of the shorter 3-USF time interval over which the scene is observed) so that a pronounced difference between the short and long subframe results is detected in the two-frame reconstruction, with the difference being attributed to object motion and, consequently, the long subframe data being omitted from the reconstructed output. As a result, the raw image data combined to produce the reconstructed output of the object-motion region is collected over a 3 USF integration period instead of the full N+3 USF integration period and, as explained above, is digitally scaled by the ratio of the full integration period to the shortened integration period (N+3/3) to equalize the effective integration periods of the regions with and without object motion. In low-light conditions, this digital scaling further amplifies noise levels already amplified by increased ISO-gain (yielding, as the effective gain, the product of the ISO-gain and digital scaling factor) potentially rendering a result so noisy as to be worse than the simple combined result of the short and long subframes. Moreover, the brevity of the 3-USF integration interval itself adds to the noise level in the composite result, making motion detection increasingly error prone as light levels drop and ISO-gain is ratcheted up.

Figure 67:
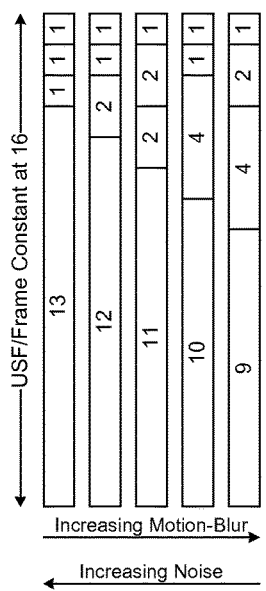
FIG. 67 illustrates exemplary relationships between dynamic range, blur mitigation and noise in the context of an N-1-1-1 subframe policy.

FIG. 67 illustrates the foregoing in the context of an N-1-1-1 subframe policy, showing an exemplary relationship between dynamic range, blur mitigation and noise. As the frame duration in unit-subframes, N+3, is increased from 4 to 16 (i.e., N increased from 1 to 13), dynamic range and motion-blur mitigation increase, but so does noise, with the digital scaling factor increasing four-fold over that range.

Figure 68:
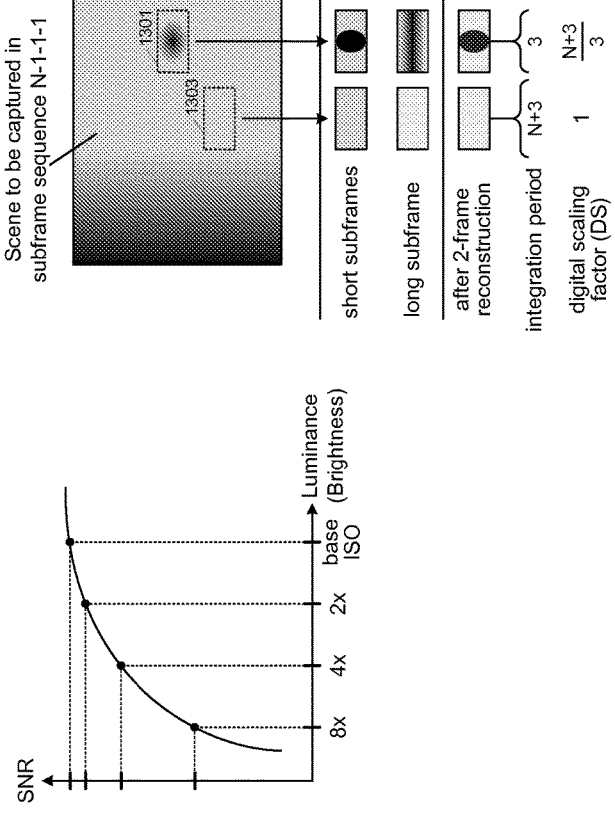
FIG. 68 illustrates a set of subframe policies that may be selectively applied to balance motion-blur mitigation and noise reduction in accordance with scene luminance.

Reflecting on the diagrams of FIGS. 65-67, it can be seen that the dynamic range corresponds to the ratio of the shortest subframe and the frame duration, while, by contrast, motion-blur mitigation and noise resulting from digital-scaling are more heavily dependent on the ratio of the composite subframe duration and the frame duration. These dependency differences are exploited in embodiments described below to trade motion-blur mitigation for noise reduction without sacrificing dynamic range. That is, dynamic range may be maintained by holding the shortest subframe duration steady while the composite subframe duration is increased to obtain a luminance-dependent balance point between motion-blur and noise. FIG. 68 illustrates this approach in a sequence of subframe readout policies that exhibit a uniform 4-stop dynamic range (i.e., 16:1 ratio between frame time and duration of shortest subframe), while the duration of the composite subframe is increased, policy-to-policy, from 3 to 7 unit-subframes. That is, instead of an N-1-1-1 subframe policy, an a-b-c-1 subframe policy, is applied, where a+b+c=N+2, and the duration of the composite subframe (b+c+1 in this example) is progressively increased at the expense of the longest subframe (i.e., b+c+1 expands, while 'a' contracts). As shown, as the composite subframe duration increases, the digital scaling factor (DS) and blur-mitigation ratio (BMR), both expressed by the ratio of the frame duration to the composite subframe duration, drops from 16/3 to 16/7, while the ratio of the frame duration to that of the shortest subframe (and hence the dynamic range) remains at 16:1. Thus, at the shortest composite subframe duration, b+c+1=3 (i.e., the special case, N-1-1-1), noise amplification due to digital scaling and motion-blur mitigation are both at a maximum, while at the longest composite subframe duration, b+c+1=7, noise and motion-blur mitigation are both at a minimum.

Accordingly, by switching from subframe readout policies with fixed composite-subframe duration (N-1-1-1) to policies with variable composite subframe durations, it becomes possible to trade motion-blur mitigation for noise reduction without sacrificing dynamic range. Because noise amplification due to digital scaling is more pronounced in low-light conditions where the ISO gain is already higher, the balance point between noise and blur-mitigation may be selected based on scene luminance. For example, the imaging system may shift up and down between the subframe policies shown in FIG. 68 in response to changes in scene luminance, thus dynamically trading motion-blur mitigation for noise reduction.

FIG. 69 illustrates an additional consideration that applies when dynamically scaling the composite subframe duration while holding the shortest subframe duration constant (i.e., to maintain a fixed dynamic range). As shown, because one or both of the 'b' and 'c' subframes (i.e., in an a-b-c-1 subframe readout policy) will exceed the unit subframe duration in some cases, readout results for those subframes may saturate at different luminance levels than for the shortest (unit) subframe, yielding a luminance-dependent nonlinearity if the subframe readout values are composited in a simple summation as shown at 1375 (and as described above in reference to FIG. 55). And, while saturated results could be discarded in the compositing operation, such composited pixels value would have luminance-dependent composite durations as shown at 1378. Aside from the additional complexity required to account for non-uniform composite subframe durations, the increased digital gain applied to pixel values composited from shorter-duration intervals (e.g., c+1 or even just '1' instead of b+c+1) during two-frame reconstruction at 1377 would likely frustrate the noise-reduction goal of composite subframe duration scaling.

In a number of embodiments, compositing complexity that results from non-uniform short subframe durations is largely avoided by scaling subframe ISO gains to equalize saturation luminances. An example of this approach is shown at 1380 in FIG. 69, showing that the ISO gains applied during the 'b' and 'c' subframes are scaled according to the durations of those subframes in relation to the shortest subframe (i.e., reduced by factors 1/b and 1/c to G/b and G/c, respectively) so that all three of the 'b', 'c' and '1' subframes will saturate at the same luminance despite their potentially different durations. By this operation, nonlinear compositing (and saturated subframe dropping) is avoided as either all short subframes will be saturated (an extreme brightness condition at the edge of the dynamic range of the image sensor) or none will. As shown at 1379, digital scaling (i.e., by factors 'Kb' and 'Kc') is applied to counteract the ISO gain scaling, thus yielding gain-equalized short subframe results that may be summed in summation block 1375 to yield a composite exposure value as generally discussed above. The ISO gain applied to the long subframe, to the extent different from that of the unit subframe, may also be digitally scaled as shown at 1381 to establish a uniform net gain across the image data supplied to two-frame reconstruction logic 1377.

FIG. 70 illustrates an exemplary sequence of luminance-dependent programming (or configuration) operations that may be executed, for example, by an auto-exposure controller of an image sensor in view of the various considerations presented above. Starting at operations 1401 and 1403, the exposure controller sets a target ISO and selects one of a number of available a-b-c-1 subframe policies, both according to scene luminance. At 1405, the exposure controller sets the ISO gain of the unit subframe ($IG_1$) to the highest available ISO gain that will yield an ISO equal to or below the target ISO, and, at 1407, the exposure controller sets the ISO gains of the 'b' and 'c' subframes to scaled values of the unit subframe gain in accordance to the relative durations of those subframes (i.e., $IG_b=IG_1/b$ and $IG_c=IG_1/c$). At 1409, the exposure controller sets the ISO gain of the long subframe to yield saturation at a brightness equal to or less than the saturation brightness for the unit subframe. Finally, at 1411, the exposure controller sets the digital scaling factors for the 'a', 'b' and 'c' subframe readouts to equalize the net subframe gains as described in reference to FIG. 69 (i.e., $Ka=IG_1/IG_a$, $Kb=b$, $Kc=c$). As shown at 1415, after programming/configuration operations 1401-1411 are completed by the auto-exposure controller, the image sensor generates an output image by applying two-frame reconstruction to readout data generated in accordance with the programmed/selected subframe readout policy, ISO gains and digital scaling factors.

Reflecting on FIGS. 65-70, it should be noted that the various approaches to trading-motion blur for noise reduction while maintaining dynamic range may be combined with dynamic range scaling as described, for example, in reference to FIGS. 55 and 62. More specifically, the larger subframe policy selection criteria may involve an initial selection of the oversampling factor (i.e., number of subframes per frame, $N_{SF}$) according to, for example and without limitation, the range of luminances in the scene to be captured and/or a target dynamic range. Once the oversampling factor has been determined, a subset of subframe policies corresponding to that oversampling factor may be selected from a larger overall set, and a specific subframe policy may be selected from the subset of subframe policies as generally described in FIGS. 68-70, adjusting the relative subframe durations to trade motion-blur mitigation for noise reduction.

Figure 71:
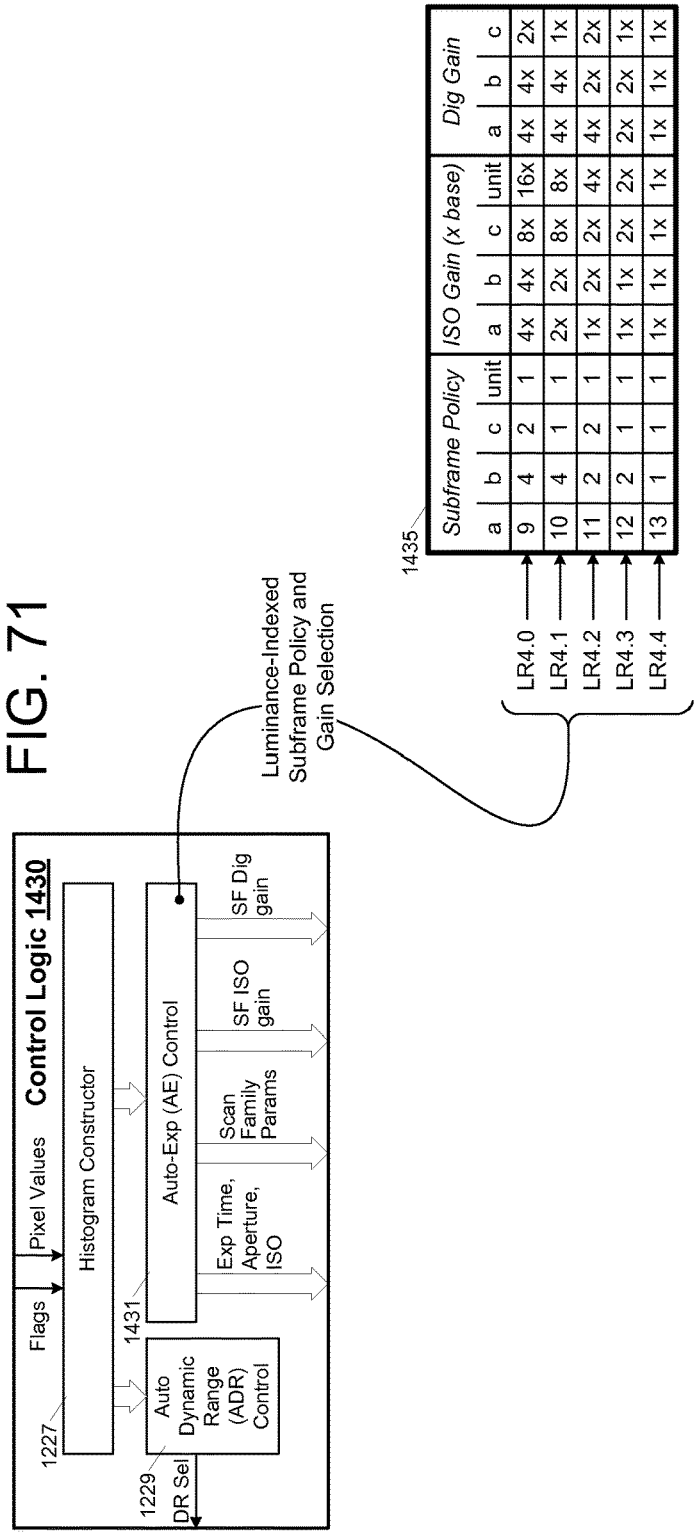
FIG. 71 illustrates an embodiment of a control logic circuit that may be used to implement the control logic circuit of FIG. 51, and that supports dynamically scaled composite subframe durations and corresponding gain settings.

FIG. 71 illustrates another embodiment of a control logic circuit 1430 that may be used to implement control logic circuit 1220 of FIG. 51, in this case supporting dynamically scaled composite subframe durations and corresponding gain settings. As shown, control logic 1430 includes a histogram constructor 1227 and ADR controller 1229, both of which operate generally as described above in reference to FIG. 52, as well as a modified auto-exposure controller 1431. More specifically, in addition to outputting scan family parameters (and exposure time, aperture and base ISO settings) as discussed above, autoexposure controller 1431 performs a luminance-indexed subframe policy selection to output a selected one of multiple subframe policies (i.e., consistent with the scan family parameters and as part of that parametric information) having a shared dynamic range but different composite subframe durations together with corresponding subframe ISO gain settings and subframe digital gains (i.e., digital scaling factors). In the embodiment shown, for example, scene luminance is resolved to one of N luminance ranges in accordance with the subframe count (e.g., five different luminances for the 4-subframe arrangement shown, and thus LR4.0-LR4.4), with the luminance range applied to index a subframe-policy/ISO-gain/digital-gain lookup table 1435. Thus, in the highest luminance range, LR4.4, a 13-1-1-1 subframe policy is selected, with unity ISO gains and unity digital scaling factors (i.e., the special N-1-1-1 case described above), while in the lowest luminance range, LR4.0, a 9-4-2-1 subframe policy is selected, with a 16×ISO gain applied in the unit subframe readout, saturation-equalizing 4× and 8×ISO gains applied in the 'b' and 'c' subframe readouts (i.e., 16×/b and 16×/c) and a 4×ISO gain applied in the long 'a' subframe readout. The digital scaling factors in the lowest luminance range table entry are chosen to yield equalized net gains at 16× and thus are 4×, 4× and 2× for subframes 'a', 'b' and 'c', respectively. In view of the determinism between the ISO gain and digital gain settings, the digital gain settings may be synthesized from the ISO gain settings in alternative embodiments, and thus omitted from the lookup table. Similarly, both the ISO gains and digital gains for subframes 'b' and 'c' may be synthesized (i.e., computed or generated by dedicated logic) based on the subframe policy and the unit subframe gain. Further, all ISO gains and digital gains, or any subset thereof, may be generated algorithmically and/or heuristically instead of being retrieved from a lookup table in alternative embodiments. Note also that specific ISO gains and subframe polices are shown for purposes of example only. Different subframe policies (including those corresponding to larger or smaller oversampling factors) and/or different ISO gains may be employed in alternative embodiments or configurations.

Figure 72:
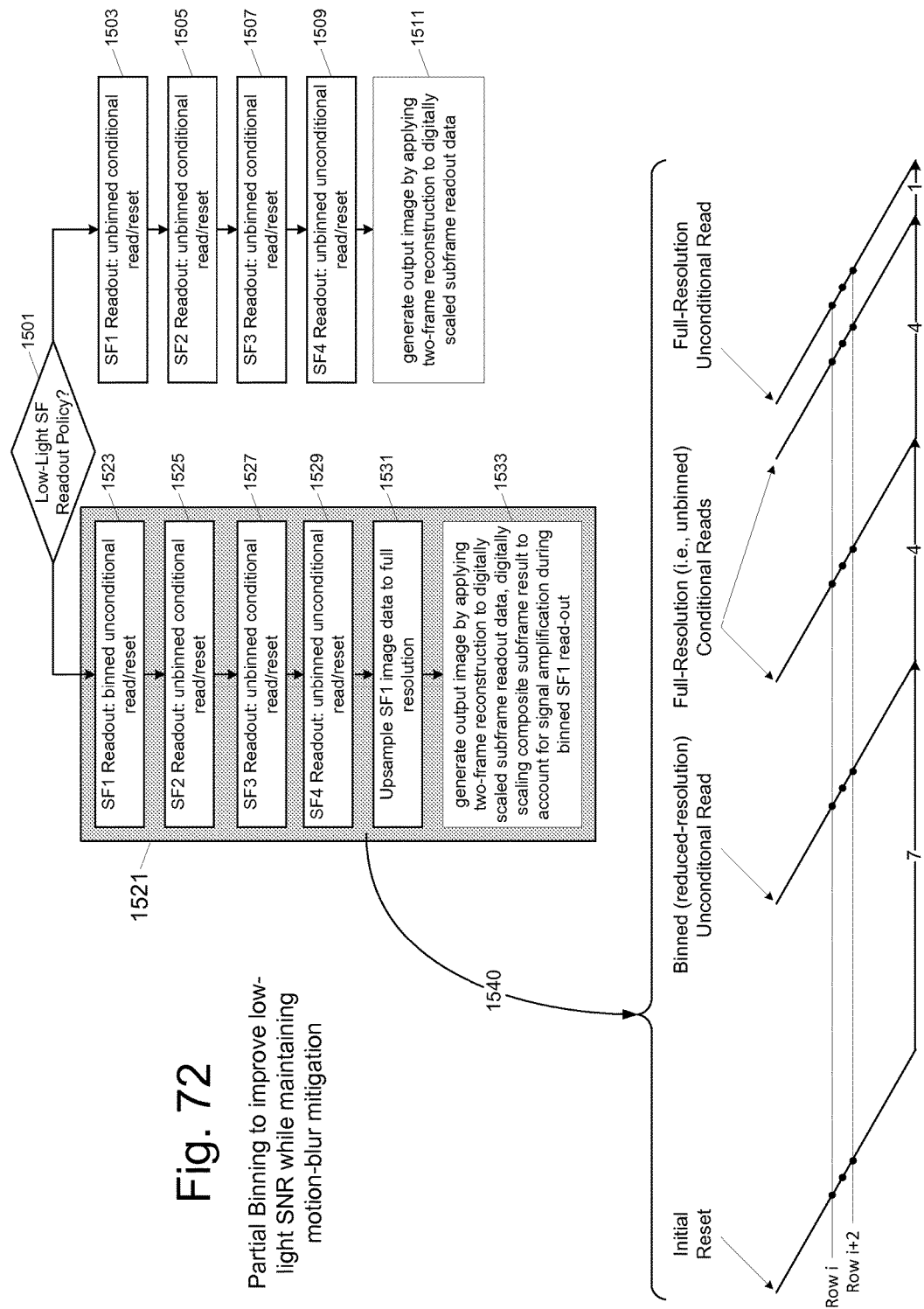
FIG. 72 illustrates a partial-binning subframe readout sequence=in which an initial, relatively long subframe is read out unconditionally in binned mode, while each of the ensuing short subframes is read out with full spatial resolution (unbinned).

In a number of embodiments, partial binning is executed in combination with the low-light SNR/motion-blur mitigation balancing described above to further improve low-light SNR. FIG. 72, for example, shows a partial-binning approach 1540 in which a relatively long subframe (the initial 7-USF subframe in the example shown) is read out unconditionally in binned mode (i.e., reduced spatial resolution), while each of the ensuing short subframes (4-USF, 4-USF, 1-USF) is read out with full spatial resolution (unbinned), with each short subframe being conditionally read out except the last. As shown in the operational sequence starting at 1501, depending on whether the specified subframe readout policy is a low-light readout policy (i.e., affirmative or negative determination at 1501, which may depend, for example, on the duration of the long subframe), read-out operations are executed with or without binning. In the non-binning case, readout operations are executed at full spatial resolution at 1503, 1505, 1507 and 1509 (the final subframe readout being unconditional, though the first subframe readout and/or any other subframe readouts may also be unconditional), with the short subframes being composited and then combined with the long subframe at 1511 using the two-frame reconstruction logic shown in FIG. 69. In the partial-binning case shown at 1521, the long subframe is readout unconditionally in binned mode (e.g., voltage binning and charge binning as described above in reference to FIG. 38) at 1523, while the short subframes are read-out with full spatial resolution at 1525, 1527 and 1529 (i.e., all short subframes except the last being read out unconditionally). At some point prior to reconstruction (e.g., immediately after read-out of the long subframe or after readout of all subframes), the long subframe readout results are upsampled to full spatial resolution as shown at 1531, for example, using bilinear interpolation or any other practicable upsampling technique. By this approach, the effective light accumulation interval for the long subframe is scaled according to the binning factor, thus trading reduced spatial resolution for increased low-light sensitivity. Applying the 4:1 binned read out architecture referenced in FIGS. 6 and 38, for example, in combination with the 7-4-4-1 subframe policy shown at 1540 yields an effective light accumulation interval of 7×4=28 unit subframes for the long subframe. As shown at 1533, the upsampled long subframe and composited short-subframe read out data are combined in a two-frame reconstruction as discussed above after digitally scaling the composite subframe image data to account for signal amplification that results during the binned long-subframe readout. In the charge-binned and voltage-binned example described in FIGS. 6 and 38, for example, charge binning results in a 2× signal amplification that is compensated by digitally scaling the composite subframe result by 2× before combining the composite subframe and long subframe data in the blur-mitigating image reconstructor.

It should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits can be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image can thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the disclosed embodiments. In some instances, the terminology and symbols may imply specific details that are not required to practice those embodiments. For example, any of the specific numbers of bits, signal path widths, signaling or operating frequencies, component circuits or devices and the like can be different from those described above in alternative embodiments. Additionally, links or other interconnection between integrated circuit devices or internal circuit elements or blocks may be shown as buses or as single signal lines. Each of the buses can alternatively be a single signal line, and each of the single signal lines can alternatively be buses. Signals and signaling links, however shown or described, can be single-ended or differential. A signal driving circuit is said to "output" a signal to a signal receiving circuit when the signal driving circuit asserts (or de-asserts, if explicitly stated or indicated by context) the signal on a signal line coupled between the signal driving and signal receiving circuits. The term "coupled" is used herein to express a direct connection as well as a connection through one or more intervening circuits or structures. Integrated circuit device "programming" can include, for example and without limitation, loading a control value into a register or other storage circuit within the integrated circuit device in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "light" as used to apply to radiation is not limited to visible light, and when used to describe sensor function is intended to apply to the wavelength band or bands to which a particular pixel construction (including any corresponding filters) is sensitive. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

The section headings in the above detailed description have been provided for convenience of reference only and in no way define, limit, construe or describe the scope or extent of the corresponding sections or any of the embodiments presented herein. Also, various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. A method of operation within an integrated-circuit image sensor having a pixel array, the method comprising:
   selecting, as a readout policy of the integrated-circuit image sensor, a first subframe readout policy from among a plurality of subframe readout policies, each of the subframe readout policies specifying a first number of subframes of image data to be readout from the pixel array for each output image frame and respective exposure durations for each of the first number of subframes of image data, wherein a shortest one of the exposure durations is uniform for each of the subframe readout policies; and
   reading out each of the first number of subframes of image data from the pixel array following the respective exposure durations thereof and while applying a respective analog readout gain, including scaling the analog readout gain applied during readout of at least a first subframe of the first number of subframes according to a ratio of the shortest one of the exposure durations to the exposure duration of the first subframe.

2. The method of claim 1 further comprising summing image data read out of the pixel array for all but a second subframe of the first number of subframes to produce a composite subframe.

3. The method of claim 2 further comprising comparing the summed image data of the composite subframe with image data read out of the pixel array for the second subframe to identify object motion within a scene represented by the summed image data and the image data read out for the second subframe.

4. The method of claim 3 further comprising, summing the summed image data of the composite subframe with the image data read out for the second subframe to produce reconstructed image data corresponding to regions of the scene for which image data from the second subframe is below saturation and determined to lack object motion, and producing reconstructed image data corresponding to regions of the scene in which image data from the second subframe is saturated or object motion was identified without including the image data read out for the second subframe.

5. The method of claim 2 wherein summing the image data read out of the pixel array for all but the second subframe comprises digitally scaling image data read out for the first subframe by a scaling factor based on the analog readout gain applied during readout of the first subframe.

6. The method of claim 5 wherein digitally scaling the image data read out for the first subframe by a scaling factor based on the analog readout gain applied during readout of the first subframe comprises digitally scaling the image data read out for the first subframe by a scaling factor that is an inverse of the ratio of the shortest one of the exposure durations to the exposure duration of the first subframe.

7. The method of claim 1 wherein selecting the first subframe readout policy from among the plurality of subframe readout policies comprises determining a brightness level of a scene to be captured by the integrated-circuit image sensor and selecting from among the plurality of subframe readout policies based at least in part on the brightness level.

8. The method of claim 1 wherein, for each of the plurality of subframe readout policies, the respective exposure durations for each of the first number of subframes of image data transpire sequentially over a uniform frame interval.

9. An integrated-circuit image sensor to generate one or more output images corresponding to a scene, the integrated-circuit image sensor comprising:
   a pixel array;
   subframe policy selection circuitry to select, as a readout policy of the image sensor, a first subframe readout policy from among a plurality of subframe readout policies, each of the subframe readout policies specifying a first number of subframes of image data to be readout from the pixel array for each of the output images and respective exposure durations for each of the first number of subframes of image data, wherein a shortest one of the exposure durations is uniform for each of the subframe readout policies; and
   readout circuitry to read out each of the first number of subframes of image data from the pixel array following the respective exposure durations thereof and while applying a respective analog readout gain, the readout circuitry including gain control circuitry to scale the analog readout gain applied during readout of at least a first subframe of the first number of subframes according to a ratio of the shortest one of the exposure durations to the exposure duration of the first subframe.

10. The integrated-circuit image sensor of claim 9 further comprising reconstruction circuitry to sum image data read out of the pixel array for all but a second subframe of the first number of subframes to produce a composite subframe.

11. The integrated-circuit image sensor of claim 10 further wherein the reconstruction circuitry comprises logic to compare the summed image data of the composite subframe with image data read out of the pixel array for the second subframe to identify object motion within a scene represented by the summed image data and the image data read out for the second subframe.

12. The integrated-circuit image sensor of claim 11 wherein the reconstruction circuitry further comprises logic to (i) sum the summed image data of the composite subframe with the image data read out for the second subframe to produce reconstructed image data corresponding to regions of the scene for which image data from the second subframe is below saturation and determined to lack object motion and (ii) produce reconstructed image data corresponding to regions of the scene in which image data from the second subframe is saturated or object motion was identified without including the image data read out for the second subframe.

13. The integrated-circuit image sensor of claim 10 wherein the reconstruction circuitry to sum the image data read out of the pixel array for all but the second subframe comprises digital gain circuitry to digitally scale image data read out for the first subframe by a scaling factor based on the analog readout gain applied during readout of the first subframe.

14. The integrated-circuit image sensor of claim 13 wherein the digital gain circuitry to digitally scale the image data read out for the first subframe by a scaling factor based on the analog readout gain applied during readout of the first subframe comprises circuitry to digitally scale the image data read out for the first subframe by a scaling factor that is an inverse of the ratio of the shortest one of the exposure durations to the exposure duration of the first subframe.

15. The integrated-circuit image sensor of claim 9 wherein the subframe policy selection circuitry to select the first subframe readout policy from among the plurality of subframe readout policies comprises circuitry to select from among the plurality of subframe readout policies based at least in part on a brightness level determine a brightness level of the scene.

16. The integrated-circuit image sensor of claim 9 wherein, for each of the plurality of subframe readout policies, the respective exposure durations for each of the first number of subframes of image data are to transpire sequentially over a uniform frame interval.

17. A method of operation within an integrated-circuit image sensor having a pixel array comprising multiple rows, the method comprising:

for a first image frame, operating each pixel array row in at least a subset of the multiple rows for an overall exposure comprising at least first and second temporally contiguous sub-exposures, wherein the first and second sub-exposures have respective first and second sub-exposure durations that are different;

at the end of each of the first and second sub-exposures for each row in the subset, performing an analog-to-digital conversion for output signals of pixels to be read in that row, wherein an effective signal gain applied for the conversion is related to the sub-exposure duration such that the product of the first sub-exposure duration and the effective signal gain applied at the end of the first sub-exposure duration is substantially equal to the product of the second sub-exposure duration and the effective signal gain applied at the end of the second sub-exposure duration.

18. The method of claim 17, further comprising performing at least a partial frame reconstruction by:

scaling the converted pixel output signals of at least one of the first and second sub-exposures by a respective digital gain such that the product of the digital gain and the effective signal gain is substantially equal for each sub-exposure; and for each pixel in the subexposures, adding the scaled converted pixel output signals together to produce a combined exposure value.

19. The method of claim 17, wherein the first sub-exposure is a conditional-read sub-exposure and the second sub-exposure is an unconditional-read sub-exposure.

20. The method of claim 17, the first image frame further comprising at least a third sub-exposure that is temporally contiguous with one or more other sub-exposures in the first image frame.

* * * * *